US008099328B2

(12) United States Patent
Protheroe et al.

(10) Patent No.: US 8,099,328 B2
(45) Date of Patent: Jan. 17, 2012

(54) SYSTEM AND METHOD FOR BROKERING THE SALE OF INTERNET ADVERTISEMENT INVENTORY AS DISCRETE TRAFFIC BLOCKS OF SEGMENTED INTERNET TRAFFIC

(75) Inventors: Robert Llewellyn Protheroe, Falls Church, VA (US); Sung Hyun Shin, Germantown, MD (US); Wesley Edward Eugene Swogger, Fairfax Station, VA (US); Mark Edward Kahn, New York, NY (US); Dean Craig Vegliante, New York, NY (US); Jay Phillip Hirschson, New York, NY (US); Brian James McNamee, Harrington Park, NJ (US); Jarod Reed Caporino, River Edge, NJ (US); Daniel Jeffrey Ballister, New York, NY (US); Scott David Reinke, Brick, NJ (US)

(73) Assignee: Traffiq, Inc., New York, NY (US)

( * ) Notice: Subject to any disclaimer, the term of this patent is extended or adjusted under 35 U.S.C. 154(b) by 935 days.

(21) Appl. No.: 12/150,320

(22) Filed: Apr. 26, 2008

(65) Prior Publication Data
US 2008/0275753 A1 Nov. 6, 2008

Related U.S. Application Data

(63) Continuation-in-part of application No. 11/893,976, filed on Aug. 18, 2007, now Pat. No. 8,073,738.

(60) Provisional application No. 60/915,433, filed on May 1, 2007.

(51) Int. Cl.
*G06Q 30/00* (2012.01)

(52) U.S. Cl. .................. 705/14.71; 705/14.4; 705/14.69

(58) Field of Classification Search ............... 705/14
See application file for complete search history.

(56) References Cited

U.S. PATENT DOCUMENTS

| 6,907,566 B1* | 6/2005 | McElfresh et al. ............ 715/210 |
| 7,346,615 B2* | 3/2008 | Bem ..................................... 1/1 |
| 2001/0047297 A1* | 11/2001 | Wen ................................. 705/14 |
| 2002/0010623 A1* | 1/2002 | McCollom et al. ............. 705/14 |
| 2002/0194215 A1* | 12/2002 | Cantrell et al. ............... 707/500 |

(Continued)

OTHER PUBLICATIONS

"www.MarketGainer.com: Market Gainer Releases Profile for AuctionCities.com, Inc." M2 Presswire, Oct. 25, 2005.*

(Continued)

*Primary Examiner* — Michelle Tarae
(74) *Attorney, Agent, or Firm* — Timothy P. O'Hagan

(57) ABSTRACT

A management system brokers, between a seller and a buyer, at least a portion of the seller's inventory of advertisement impressions that the seller can render within a web page of internet traffic. The management system comprises a traffic block definition tool adapted to define traffic block parameters for at least two discrete traffic blocks of the advertisement placement. The traffic block parameters for each discrete traffic block comprise a volume parameter and a duration parameter. A sales management tool is adapted to associate advertisement content and a buyer compensation parameter to each salable event. An order fulfillment system: i) directs placement of highest yielding advertisement content if, for each discrete traffic block, a delivered volume of sales events is higher than its minimum fulfillment threshold; and ii) if, for any discrete traffic block, delivered volume of saleable events lower than its minimum fulfillment threshold, directs placement of the advertisement content associated with that discrete traffic block.

43 Claims, 47 Drawing Sheets

U.S. PATENT DOCUMENTS

| | | | |
|---|---|---|---|
| 2003/0023489 A1* | 1/2003 | McGuire et al. | 705/14 |
| 2003/0171990 A1* | 9/2003 | Rao et al. | 705/14 |
| 2004/0225562 A1* | 11/2004 | Turner | 705/14 |
| 2005/0027587 A1* | 2/2005 | Latona et al. | 705/10 |
| 2005/0027594 A1 | 2/2005 | Yasnovsky | |
| 2005/0028188 A1* | 2/2005 | Latona et al. | 725/13 |
| 2005/0216547 A1 | 9/2005 | Fortz-Smith | |
| 2006/0080171 A1* | 4/2006 | Jardins et al. | 705/14 |
| 2007/0027762 A1* | 2/2007 | Collins et al. | 705/14 |
| 2007/0067214 A1* | 3/2007 | Caprio et al. | 705/11 |
| 2007/0174114 A1* | 7/2007 | Bigby et al. | 705/14 |
| 2007/0244760 A1* | 10/2007 | Bodnar et al. | 705/14 |
| 2007/0271145 A1* | 11/2007 | Vest | 705/14 |
| 2008/0103898 A1* | 5/2008 | Flake et al. | 705/14 |
| 2008/0103952 A1* | 5/2008 | Flake et al. | 705/37 |

OTHER PUBLICATIONS

"ExperTelligence Subsidiary, ExperClick.com Inc., Advertising Hub Application in Operational Beta Test," PR Newswire, Jan. 9, 2001.*

"What it costs: ads online," Profit, May 1, 2000.*

"Capturing Seniors Online: They're Wired and Ready for Health Info." Healthcare PR & Marketing News. Nov. 13, 1997.*

Sheikh, Fawzia. "Online media planning and buying primer," Marketing Magazine, Dec. 11, 2000.*

* cited by examiner

| PPG ID 232a | | | |
|---|---|---|---|
| AP ID 93 | URL(s) | Size 88 | Position 90 |
| 001 | 13a | Banner (12a) | Banner |
| 002 | 13a | Pop-Over (14b) | Pop-Over |
| 003 | 13a | X * Y (16a) | RT Side |
| 003 | 13a | X * Y (16b) | RT Side |

| PPG ID 232b | | | |
|---|---|---|---|
| AP ID 93 | URL(s) | Size 88 | Position 90 |
| 004 | 13b,13c,13d | Banner 12b | Banner |
| 005 | 13b | Pop-Over 14b | Pop-Over |
| 006 | 13c,13d | Pop-Over 14c | Pop-Over |

Figure 5B

Discrete Traffic Block Table 98

| DBT ID | Duration 96 | | Volume 98 | | Status 102 | End Time 103 | Fulfillment 104 | | Group ID 106 |
|---|---|---|---|---|---|---|---|---|---|
| | Start 96a | End 96b | Click 98a | Imp. 98b | | | Click 104a | Imp. 104b | |
| 20c | 1 June 07 | 5 June 07 | | 500 | Open | | | 500 | |
| 20d | 3 June 07 | 7 June 07 | 500 | | Open | | 500 | | |
| 20e | 5 June 07 | 9 June 07 | | 1000 | Unsold | | | 1000 | |

Bid Table 110

| Buyer ID 34 | Content ID 19 | Compensation Parameters | | Content and Website 114 |
|---|---|---|---|---|
| | | Raw Bid 112 | Effective Value of Bid 122 | |
| 001 | | $100.00 | $0.20/1,000 Impressions | |
| 002 | | $150.00 | $0.15/1,000 Impressions | |

Figure 5D

| Attribute Library 70 | |
|---|---|
| INDX | Attribute Description 72 |
| 1 | US |
| 2 | UK |
| ... | ... |
| 10 | New England (MA, RI, NH, VT, ME) |
| 11 | Mid-Atlantic |
| 12 | South East |
| 13 | Mid-West |
| 14 | Mountain |
| 15 | South West |
| 16 | North West |
| ... | ... |
| 100 | Male |
| 101 | Female |
| 102 | < 18 |
| 103 | 18 - 30 |
| 104 | 30 - 40 |
| 105 | 40 - 50 |
| 106 | 50 + |
| ... | |
| 207 | Income < 30K |
| 208 | Income 30 - 60K |
| 209 | Income 60 - 100K |
| 210 | Income 100K - 250K |
| 211 | Income 250K + |
| ... | ... |

Figure 6

| Traffic Template 76a | | Segments and Corresponding Blueprints 28 | | | | | | |
|---|---|---|---|---|---|---|---|---|
| | | Seg. 11a | Seg. 11b | Seg. 11c | Seg. 11d | Seg. 11e | Seg. 11f | Seg. 11g |
| Bit Location | Attribute 80 | TABP 28a | TABP 28b | TABP 28c | TABP 28d | TABP 28e | TABP 28f | TABP 28g |
| 1 | US | X | X | X | X | X | X | |
| 2 | New England (RI, MA, NH, VT, ME) | X | | | | | | |
| 3 | Mid-Atlantic | | X | | | | | |
| 4 | South East | | | X | | | | |
| 5 | Mid-West | | | | X | | | |
| 6 | Mountain | | | | | X | | |
| 7 | South West | | | | | | X | |

Figure 7A

| Traffic Template 76b | | Segment Blueprints 28 | | | | | | |
|---|---|---|---|---|---|---|---|---|
| | | Seg. 11a | Seg. 11b | Seg. 11c | Seg. 11d | Seg. 11e | Seg. 11f | |
| Bit Location | Attribute 80 | TABP 28a | TABP 28b | TABP 28c | TABP 28d | TABP 28e | TABP 28f | |
| 1 | Male | | X | X | | | X | |
| 2 | Female | X | | | | | | |
| 3 | < 18 | | X | | | | | |
| 4 | 18 - 29 | | | X | | | | |
| 5 | 30 - 39 | | | | X | | | |
| 6 | 40 - 49 | | | | | X | | |
| 7 | 50 + | | | | | | X | |

Figure 7B

Inventory Listing 95

| Inventory Report 376 | | | | | |
|---|---|---|---|---|---|
| Date DD/MM/YYYY 378 | Delivered Orders 380 (thousands) | On Order (undelivered) 382 (thousands) | Committed Inventory 384 (thousands) | Listed, Not Yet Committed 386 (thousands) | Projected Unsold 388 (thousands) |
| 07/07/2008 | 0 | 1,071 | 0 | 0 | 595 |
| 08/07/2008 | 0 | 1,071 | 0 | 0 | 595 |
| 09/07/2008 | 0 | 1,071 | 0 | 0 | 595 |
| 10/07/2008 | 0 | 1,071 | 0 | 0 | 595 |
| 11/07/2008 | 0 | 1,071 | 0 | 0 | 595 |
| 12/07/2008 | 0 | 1,071 | 0 | 0 | 595 |
| 13/07/2008 | 0 | 1,071 | 0 | 0 | 595 |
| 14/07/2008 | 0 | 1,071 | 0 | 71 | 524 |
| 15/07/2008 | 0 | 1,071 | 0 | 71 | 524 |
| 16/07/2008 | 0 | 1,071 | 0 | 71 | 524 |
| 17/07/2008 | 0 | 1,071 | 0 | 71 | 524 |
| 18/07/2008 | 0 | 1,071 | 0 | 71 | 524 |
| 19/07/2008 | 0 | 1,071 | 0 | 71 | 524 |
| 20/07/2008 | 0 | 1,071 | 0 | 71 | 524 |
| 21/07/2008 | 0 | 1,071 | 0 | 71 | 524 |
| Totals | 0 | 16,065 | 0 | 568 | 8,357 |
| Averages | 0 | 1,071 | 0 | 38 | 557 |

Figure 16A

Branding / Logolink to Main Home

Dashboard | Listings | Research | My Account
Log In to Buyer Account | Log Out | Help
Selling Activity | Manage Ad Placement | Reports | Message Center | Traffic Profile Wizard Welcome [username]

Listings | Orders

Active Listings | Pending Listings | Expired Listings

Create New Listing —282

| Ad Placement | Traffic | Contract Start/End | Current Top Bid | # of Bids/ Watchers | Auction Time Remaining |
|---|---|---|---|---|---|
| URL: http://www.wonderfulworld.com/home.html | | | | | |
| Listing Name 1 Ad Placement 1 | 1,000 Clicks° (Traffice Segment Group 1) | 5/1/07-5/8/07 | $10,000° Username/Rating | 11/43 | 30 min. |
| Listing Name 2 Ad Placement 1 | 1,000 Clicks° (Traffice Segment Group 1) | 5/1/07-5/8/07 | $10,000° Username/Rating | 12/53 | 33 min. |
| URL: http://www.wonderfulworld.com/events.html | | | | | |
| Listing Name 3 Ad Placement 1 | 1,000 Clicks° (Traffice Segment Group 1) | 5/1/07-5/8/07 | $10,000° Username/Rating | 14/43 | 3 hours |
| Listing Name 4 Ad Placement 1 | 1,000 Clicks° (Traffice Segment Group 1) | 5/1/07-5/8/07 | $10,000° Username/Rating | 11/44 | 30min |

$$Yfao = \frac{\text{Total Clicks on Ad Content within Order (Ad Placement)}}{\text{Total Impressions of Ad Content within Order (Ad Placement)}}$$

Figure 22a

$$Yfa = \frac{\text{Total Clicks on Ad Content Across All Orders (Ad Placement)}}{\text{Total Impressions of Ad Content Across All Orders (Ad Placement)}}$$

Figure 22b

$$Yfco = \frac{\text{Total Clicks on All Ad Content within Campaign within Order (Ad Placement)}}{\text{Total Impressions of All Ad Content within Campaign within Order (Ad Placement)}}$$

Figure 22c

$$Yfc = \frac{\text{Total Clicks on All Ad Content within Campaign}}{\text{Total Impressions of All Ad Content within Campaign}}$$

Figure 22d

| Financial Analysis 454 | | | | | | |
|---|---|---|---|---|---|---|
| DTB ID | Match 304 | Current Bid Amount 112 | Volume 98 | | Expected Target Event Yield 500 | Current Bid/Target Event 502 | Max Bid 504 |
| | | | Click 98a | Imp. 98b | | | |
| 20c | 98% | | | 500 | | | |
| 20d | 93% | | 500 | | | | |
| 20e | 95% | | | 1,000 | | | |

Figure 24

| Dashboard | Listings | IQ | My Account | | |
|---|---|---|---|---|---|
| Selling Activity \| Manage Ad Placement \| Reports \| Message Center \| Traffic Profile Wizard | | | | | |
| Match 340 | RFL End Date 341 | | | | |
| 89% | 5/15/2007 | Campaign Start/End: 5/15/07 - 7/1/07<br>Traffic Requested: 1,000,000 Impressions | Campaign ID: 123450<br>342 — Request More Information<br>344 — Respond | | |
| 82% | 5/15/2007 | Campaign Start/End: 6/15/07 - 7/1/07<br>Traffic Requested: 2,000,000 Impressions | Campaign ID: 123450<br>342 — Request More Information<br>344 — Respond | | |
| 79% | 5/15/2007 | Campaign Start/End: 6/15/07 - 7/1/07<br>Traffic Requested: 1,000 Clicks | Campaign ID: 123450<br>342 — Request More Information<br>344 — Respond | | |

| Expected Revenue Model Table 469 | Open Orders 20 | | | Filler Options 471 | | |
|---|---|---|---|---|---|---|
| | Open Order 1 (DTB) | Open Order 2 (DTB) | Open Order 3 (DTB) | Filler 1 (Non-Paced DTB) | Filler 2 (System Bid) | Filler 3 (Ad Network) |
| Delivered Quantity | | | | ☒ | ☒ | ☒ |
| Pace 472 | | | | ☒ | ☒ | ☒ |
| % Below Low Threshold 474 | | | | | ☒ | ☒ |
| CPM 476 (Impression Based Transaction) | | | | | | |
| Event 478 (Other Transactional Unit) | | | | | | |
| E.R. 480 | | | | | | |

| Requested Discrete Traffic Block(s) 620 | | | | | | | | |
|---|---|---|---|---|---|---|---|---|
| Buyer ID 34 | Seller ID 86 | AP ID 93 | Segment ID 11 | Requested Volume 636 | | Duration 638 | | Price 640 | Accept 646 |
| | | | | IMP 636a | Clicks 636b | Start Time 638a | End Time 638b | | |
| | | | | | | | | | |
| | | | | | | | | | |
| | | | | | | | | | |
| | | | | | | | | | |
| | | | | | | | | | |

SYSTEM AND METHOD FOR BROKERING THE SALE OF INTERNET ADVERTISEMENT INVENTORY AS DISCRETE TRAFFIC BLOCKS OF SEGMENTED INTERNET TRAFFIC

TECHNICAL FIELD

The present invention relates to a network based system and method for brokering, between a seller and a buyer, the sale of Internet advertisement inventory as a discrete traffic block of segmented Internet traffic and, more particularly to a system and method for facilitating seller segmentation of its Internet traffic, definition of a discrete traffic block, buyer selection thereof, and advertisement impression delivery in response to a buyer purchase thereof.

BACKGROUND OF THE INVENTION

Users of the Internet are frequently presented with display advertisements within web pages. These advertisements may be in the form of banner advertisements, pop up ads, pop under ads, or other static or dynamic display advertisements within (or associated with) a web publisher's web site.

The goal of each of these advertisements is to entice the user to link to the advertiser's web site for additional information and/or ultimately to solicit the sale of a product or service to the user. As such, displayed advertisements may be associated with a link such that if the advertisement is clicked, the user's web browser is redirected to the advertiser's designated web page.

Because of the above described dynamics of Internet advertising, certain terminology has evolved in the Internet advertising industry. For example: i) the event of rendering an advertisement to an end user within a web publisher's web site is generally referred to as an advertisement "impression"; ii) the event of a user selecting an advertisement, or clicking on the advertisement, such that his/her browser is redirected to the advertiser's website is generally referred to as a "click" or "click-through"; iii) web publishers may be referred to as sellers of advertisement space, sellers of Internet traffic, or sellers; iv) advertisers may be referred to as buyers; v) the quantity of impressions that a web publisher is able to deliver during a period of time may be referred to as its inventory or inventory of Internet traffic, or traffic available for buyers to purchase; and vi) the distinct portions of a web publisher's inventory that can be delivered to end users distinguishable based on end user attributes such as geography, demographics, and/or behavioral patterns may be referred to as segmented inventory, traffic segments, or targeted traffic.

For example, a web publisher which has traffic of 10,000 "hits" per day has the ability to deliver 10,000 banner advertisements per day. Therefore the publisher has an inventory of 10,000 banner advertisement impressions per day which can be sold.

Further, if the impression is delivered on a web page where user registration is required to access the web page, and such registration requires the user to disclose his/her gender, then the inventory of 10,000 banner advertisements can be segmented into a male segment and a female segment. If, on average, the 10,000 hits are 50% male and 50% female, the publisher has segmented inventory of 5,000 banner advertisement impressions per day as its male traffic segment and 5,000 banner advertisement impressions per day as its female traffic segment.

Advertisement inventory is generally priced and sold utilizing transactional units based on a per-impression transactional model or on a per-click transactional model. An advertiser purchasing placement within a web site utilizing the per-impression transactional model will pay a fee to the publisher (or a broker) that is calculated based on the quantity of impressions rendered. An advertiser purchasing placement within a web site utilizing the per-click transactional model will pay a fee to the publisher (or a broker) calculated on the number of end users that "click through" the advertisement impression to the advertiser's website.

In more detail, the most common transactional units are Cost-Per-Thousand-Impressions (CPM) and Cost-Per-Click (CPC). Other transactional units which require at least user interaction with the advertisement impression and click through to the advertiser's web site include Cost-Per-Lead (CPL), Cost-Per-Acquisition/Action (CPA).

Website owners generally sell their inventory utilizing one of two dominant business models. The first dominant business model includes a buyer initiating a request for proposal (RFP) process. The buyer's RFP may describe the advertising campaign in terms of its overall objectives for advertising a particular product or service over a distinct period of time. Further, the RFP may typically specify proposed sales goals, conversion goals and branding goals, and target user attributes likely to improve the campaign's success. As is typical of any RFP process, the buyer will distribute the RFP, particularly to those web publishers (or brokers) known to have inventory, or segmented inventory, suited to meet the goals and objectives of the campaign.

Each seller receiving the RFP may determine whether it has available inventory, or segmented inventory that meets the buyer's stated goals. If a seller has available inventory, or segmented inventory, that meets the stated goals in the RFP, the seller may submit a proposal for the delivery of inventory that meets all or part of the buyer's volume requirements. The proposal typically is a firm offer that remains open for the buyer to accept during a defined period of time.

The buyer then reviews those submitted proposals and selects/accepts those responses that the buyer determines provide the inventory most suitable for meeting the campaign objectives.

The second dominant business model includes use of an ad network. An ad network aggregates web publishers with available inventory and sells such inventory to buyers—which it also aggregates. Such inventory is often sold in a continuous auction meaning that an available impression may be sold, at least in part, to the advertiser with the highest yielding advertisement (e.g. the highest remuneration expected to be received for the lowest quantity of inventory to be delivered at such time as the impression is to be rendered to the end user viewing the publisher's web page.

For example, an ad network may categorize the web sites of several publishers within a topical category for purposes of defining available inventory associated with such topic. Advertisers would then place bids associated with such topic. As such, so long as the advertiser remains the highest bidder for such topical category, its advertisement content will be rendered over that of other advertisers placing lower bids. Further, the highest bidder may be determined utilizing relative yield between multiple bids.

The primary advantage of the RFP process is that the advertiser maintains control over: i) in which web publisher's websites its advertisement content appears; and ii) to which end user segments its advertisement content is rendered. This control enables buyers to select what it perceives to be the highest value inventory, or inventory segments, and makes it economically feasible for the buyer to pay a premium for such highest value inventory, or inventory segments.

An advertiser purchasing inventory through an ad network may only control the topical category on which the advertiser is bidding—but will have limited control over which web publisher's websites within the topical category will deliver its advertisement content to end users—and little control over the end user segments to which its advertisement content will be delivered.

As such, from the perspective of an advertiser, inventory purchased through an ad network is generally "less targeted" than inventory purchased through the RFP method because the ad network inventory is defined by the ad network categorization—not the buyer's campaign specific objectives. Therefore, from the perspective of an advertiser, the inventory within the topical category likely contains a composition of inventory that the advertiser would perceive as high value inventory and inventory that the advertiser would prefer not to purchase. A rational advertiser considers these factors when purchasing through an ad network and will therefore typically pay less per impression, per click, or other action performed for such less targeted inventory.

Further yet, because ad networks often operate in an auction environment that is continuous, there is little predictability as to the quantity of impressions that will be delivered on a certain budget—as a buyer may be outbid at any time.

There are also disadvantages of use of an ad network from the seller's perspective. Because the seller's inventory is aggregated with inventory of other sellers within a topical category—and is generally purchased as a composition by a buyer, it is difficult for a seller to promote the value of its website or its traffic, or traffic segments, over other sellers within the topical category. As such, it may be difficult for a seller to realize the maximum value of the traffic, or traffic segments, that it could deliver on a more targeted basis.

Secondly, because of the continuous auction system, there is little predictability of the revenue a seller will receive for delivering inventory through the ad network—or even if there will be buyer bidding any minimum price at the time the seller is to deliver an impression—leaving what may be referred to as unsold inventory.

On the other hand, some disadvantages of the RFP process include the fact that the entire RFP process is very time consuming and labor intensive process for all parties. The RFP process also fails to create a true open-market environment for the sale and purchase of inventory because: i) buyers are limited in their available options for the purchase of inventory by the RFPs it sends out; and ii) sellers are limited in their opportunities to sell their available inventory to RFPs received and the efforts of its sales staff to directly sell their inventory to buyers, which may or may not result in the initiation of the RFP process, outlined above.

In view of the foregoing, what is needed is a system and method for brokering the sale of Internet advertisement inventory as a discrete traffic block of segmented inventory in a manner that does not suffer the disadvantage of the present business models used for selling/purchasing Internet advertising inventory.

SUMMARY OF THE INVENTION

A first aspect of the present invention comprises a management system for brokering, between a seller (web site operator) and a buyer (advertisement placement purchaser), the sale of at least a portion of the seller's inventory of advertisement impressions that the seller can render within a web page of internet traffic; and, as applicable, order balancing between multiple sales to multiple buyers and maximizing yield of available advertisement impressions.

The management system may comprise a traffic block definition tool adapted to define traffic block parameters for at least two discrete traffic blocks of the advertisement placement. The traffic block parameters for each discrete traffic block may comprise at least: i) a volume parameter defining a volume of salable events included in the discrete traffic block; and ii) at least one duration parameter defining an active time period during which the volume of salable events included in the discrete traffic block will be provided.

A sales management tool may be adapted to: i) associate, for each discrete traffic block, a buyer compensation parameter for the salable events included in the discrete traffic block; and ii) associate buyer defined advertisement content with each discrete traffic block. The sales management tool may operate by any of: i) means of an auction sale of one or more discrete traffic blocks to the buyer; ii) means of sale of one or more of the discrete traffic blocks by way of a buyer request for a proposal or listing, a seller proposal of a discrete traffic block in response thereto, and a buyer selection process of all such responses; and iii) other means for sale of a discrete traffic block to a buyer.

An order fulfillment system may be adapted to direct placement of selected advertisement content within the advertisement placement. For such purposes, the order fulfillment system may comprise an advertisement content threshold module adapted to determine, for at least a portion of the active discrete traffic blocks, a minimum fulfillment threshold. The minimum fulfillment threshold may be a function of the volume of salable events included in the discrete traffic block divided by the active time period of the discrete traffic block and multiplied by a portion of the active time period that has elapsed.

An effective revenue module may be adapted to: i) determine, for each discrete traffic block, expected revenue associated with placement of the buyer defined advertisement content within the advertisement placement; and ii) the highest yielding advertisement content. The expected revenue for a discrete traffic block may be the buyer compensation parameter (on a "per salable event" basis) multiplied by a probability that placement of the buyer defined advertisement content will yield a salable event. The highest yielding advertisement content may be the buyer defined advertisement content of the discrete traffic block that is associated with the highest expected revenue.

A placement direction module may be adapted to: i) direct placement of the highest yielding advertisement content within the advertisement placement if, for each discrete traffic block, a delivered volume of sales events is higher than the minimum fulfillment threshold; and ii) if, for any discrete traffic block, delivered volume of saleable events is lower than a minimum fulfillment threshold (e.g. a below minimum threshold discrete traffic block), direct placement of the buyer defined advertisement content associated with that below minimum threshold discrete traffic block within the advertisement placement.

In one embodiment, the minimum fulfillment threshold may be less than an even fulfillment pace threshold (e.g. volume divided by the duration of active time period and multiplied by the portion of the active time period that elapsed) at the beginning of the active time period and approaching the even fulfillment pace threshold at the end of the active time period. As such, in this aspect, the minimum fulfillment threshold may be a function of: i) the volume of salable events included in the discrete traffic block divided by the active time period of the discrete traffic block; ii) multiplied by a portion of the active time period that has elapsed; and iii) multiplied by a function of the portion of the active time period that has elapsed that yields a value between zero and one for the entire duration of the active time period and approaches one at termination of the active time period.

In another embodiment, expected revenue can be calculated and compared for at least two discrete traffic blocks sold utilizing different salable events. For example, a first discrete traffic block may include a first buyer compensation parameter based on a price per impression (e.g. placement of the buyer defined advertisement content as an impression within the advertisement placement) and a second discrete traffic block may include a second buyer compensation parameter based on a price per click (e.g. an end user, to which the buyer defined advertisement content is rendered, selecting the buyer defined advertisement content for linking to a separate web page associated with the buyer defined advertisement content (i.e. landing page)).

In this embodiment, the expected revenue for the first discrete traffic block comprises the first buyer compensation parameter and the expected revenue for the second discrete traffic block comprises the second buyer compensation parameter multiplied by an expected portion of the end users that click through to the landing page—meaning the portion of end users, to which the buyer defined advertisement content is rendered, that select the buyer defined advertisement content for linking to the landing page associated with the buyer defined advertisement content.

In another embodiment, the effective revenue module may be further adapted to determine, for each of a plurality of filler advertisement content options, filler expected revenue associated with placement of filler advertisement content within the advertisement placement.

The filler expected revenue may be a filler advertisement compensation value multiplied by a probability that placement of the filler advertisement content will yield an event generating revenue of the filler advertisement compensation value. In this embodiment, the highest yielding advertisement content is the one of: i) the highest yielding buyer defined advertisement content; and ii) if greater, the filler advertisement content that is associated with the highest expected revenue. As such, the placement direction module, placing the highest yielding advertisement content, may place filler advertisement content even if open orders (e.g. active discrete traffic blocks) exist—so long as all are at least ahead of the minimum fulfillment threshold.

For further support of this embodiment, the management system may further comprise an ad network interface adapted to, if for each discrete traffic block a delivered volume of sales events is higher than its minimum fulfillment threshold: i) generate a request to at least one remote ad network, and ii) receive, in response to each request, an indication of a placement fee.

The request may comprise at least one text tag associated with the web page within which the advertisement placement exists. The placement fee may be the filler advertisement compensation value for placement of filler advertisement content provided by the ad network within the advertisement placement. As such, for at least one filler advertisement content option: i) the filler advertisement content comprises ad content provided by the remote ad network; and ii) the expected revenue associated with the filler advertisement content comprises the placement fee.

In yet another embodiment, the management system may further comprise a historical data structure adapted to associate each of a plurality of advertisement campaign classes with at least one responsive attribute. Each responsive attribute may be an attribute of users that have favorably responded to advertisement content within the advertisement campaign class.

In this embodiment, the effective revenue module may be further adapted to select advertisement content, from available advertisement content options (open discrete traffic block orders and filler advertisement content options), the advertisement content most likely to be effective with a particular end user. More specifically, the effective revenue module, in response to receipt of at least one end user attribute value associated with an end user to which the advertisement impression will be rendered, determine a probability that placement of the buyer defined advertisement content will yield a salable event by looking up, in the historical data structure, whether the advertisement content is of an advertisement campaign class with a responsive attribute corresponding to the end user attribute value.

The at least one responsive attribute may be a geographic location of users that have responded favorably to advertisement content within the advertisement campaign class and the end user attribute value may designate a geographic location of the end user.

Alternatively, the at least one responsive attribute may be a demographic or behavioral parameter of users that have responded favorably to advertisement content within the advertisement campaign class and the end user attribute value a demographic or behavioral attribute of the end user.

A second aspect of the present invention relates to contextual segmentation of a seller's inventory of advertisement impressions and is directed to a management system for brokering, between a seller and each of at least a first buyer and a second buyer, the sale of at least a portion of the seller's inventory of advertisement impressions that the seller is able to render within an advertisement placement within a web page of internet traffic—wherein a portion of the content of the web page is periodically altered between a first classification of web content and a second classification of web content.

The management system may comprise a traffic block definition tool adapted to define traffic block parameters for at least two discrete traffic blocks of the advertisement placement. The traffic block parameters for the first discrete traffic block comprise at least a first context parameter associating the first discrete traffic block with the first classification of web content. The traffic block parameters for the second discrete traffic block comprise at least a second context parameter associating the second discrete traffic block with the second classification of web content.

An order fulfillment system may be adapted to direct placement of selected advertisement content within the advertisement placement based on the then current classification of content. More specifically, the order fulfillment system: i) may place the first buyer advertisement content (designated by the first buyer) within the advertisement placement when the content of the web page is the first classification; and ii) may place the second buyer defined advertisement content (designated by the second buyer) within the advertisement placement when the content of the web page is the second classification.

To effectuate such operation, the order fulfillment system may further comprise a content determination system, the content determination system may be adapted to: i) periodically establish a connection to a URL associated with the web page and obtain the portion of the content of the web page that is periodically altered; ii) determine that the portion of the content of the web page that is periodically altered is the first classification of web content when words within the portion of the content that is periodically altered associates with a first recognition criteria; and iii) determine that the portion of the content of the web page that is periodically altered is the second classification of web content when words within the portion of the content that is periodically altered associates with a second recognition criteria.

As such, the selected advertisement content may be: i) the first buyer defined advertisement content during a time period following when the content determination system determines that the portion of the content of the web page that is periodically altered is the first classification of web content and before a subsequent determination that the portion of the content of the web page that is periodically altered is the second classification of web content; and ii) the second buyer defined advertisement content during a time period following when the content determination system determines that the portion of the content of the web page that is periodically altered is the second classification of web content and before a subsequent determination that the portion of the content of the web page that is periodically altered is the first classification of web content.

In one embodiment, the traffic block parameters for the first discrete traffic block further comprise at least: i) a first volume parameter defining a volume of salable events included in the first discrete traffic block; and ii) at least one first duration parameter defining an active time period during which the volume of salable events included in the first discrete traffic block will be provided. Similarly, the traffic block parameters for the second discrete traffic block further comprise at least: i) a second volume parameter defining a volume of salable events included in the second discrete traffic block; and ii) at least one second duration parameter defining an active time period during which the volume of salable events included in the second discrete traffic block will be provided.

A sales management tool may be adapted to: i) associate a first buyer compensation parameter with salable events included in the first discrete traffic block; and ii) associate a second buyer compensation parameter with salable events included in the second discrete traffic block.

In this embodiment, the order fulfillment system may be further adapted to direct placement of selected filler advertisement content within the advertisement placement if, during the time period following determining that the portion of the content of the web page that is periodically altered is the first classification of web content, the placement of first buyer defined advertisement content: i) is at a first fulfillment pace that is ahead of a first minimum fulfillment threshold; and ii) is expected to yield less than placement of the filler advertisement content.

Similarly, the order fulfillment system may be further adapted to direct placement of selected filler advertisement content within the advertisement placement if, during the time period following determining that the portion of the content of the web page that is periodically altered is the second classification of web content, the placement of second buyer defined advertisement content: i) is at a second fulfillment pace that is ahead of a second minimum fulfillment threshold; and ii) is expected to yield less than placement of the filler advertisement content.

The first fulfillment pace may be the aggregate quantity of salable events generated by placement of the first buyer defined advertisement content and the first minimum fulfillment threshold may be a function of the total quantity of salable events included in the first discrete traffic block divided by the active time period of the discrete block and multiplied by the portion of the active time period that has elapsed.

Similarly, the second fulfillment pace may be the aggregate quantity of salable events generated by placement of the second buyer defined advertisement content and the second minimum fulfillment threshold may be a function of the total quantity of salable events included in the second discrete traffic block divided by the active time period of the discrete block and multiplied by the portion of the active time period that has elapsed.

To support such operation, the management system may further comprise an ad network interface adapted to, if placement of first buyer defined advertisement content is at fulfillment pace that is ahead of the first minimum fulfillment threshold, i) generate a request to at least two remote ad networks, each request comprising at least one text tag associated with the first classification of web content; and ii) receive, in response to each request, an indication of a placement fee. The selected filler advertisement content may be the filler advertisement content associated with a greatest of the placement fees.

A third aspect of the present invention relates to determining optimal traffic block size and duration for maximizing revenue and is directed to a management system for brokering, between a seller and a plurality of buyers, sale of at least a portion of the seller's inventory of advertisement impressions that the seller is able to render within an advertisement placement within a web page of the seller's internet traffic.

The management system may comprise an inventory data structure identifying, for the portion of the seller's inventory of advertisement impressions, projected available inventory for each of a plurality of sequential days.

A listing tool may be adapted to, if both: i) projected available inventory is greater than a minimum daily pace threshold for each of a predetermined number of sequential days; and ii) the predetermined number of sequential days is greater than a minimum duration, define a discrete traffic block of the portion of the seller's inventory by generating traffic block parameters.

The traffic block parameters may comprise at least: i) a volume parameter defining a volume of salable events included in the discrete traffic block; and ii) at least one duration parameter defining an active time period during which the volume of salable events included in the discrete traffic block will be provided.

In one embodiment, the management system may further comprise a historical data structure associating, for each of a plurality of previously sold discrete traffic blocks: i) a sales price; ii) an indication of a volume of salable events included in the previously sold discrete traffic block; and ii) an indication of the duration of the previously sold discrete traffic block.

In this embodiment, the listing tool is further adapted to: i) determine a portion of the previously sold discrete traffic blocks that are optimal; ii) set the volume parameter of the discrete traffic block to a volume that is a function of the volume of salable events included in the portion of the previously sold discrete traffic blocks that are optimal; and iii) set the duration parameter to a duration of time that is a function of the duration of the portion of the previously sold discrete traffic blocks that are optimal.

The portion of the previously sold discrete traffic blocks that are optimal may be a group of the previously sold discrete traffic blocks with the highest ratio of sales price divided by the volume of salable events.

In a second embodiment, the management system may further comprise a data structure associating, for each of a plurality of currently listed discrete traffic blocks: i) a current auction bid price; ii) an indication of a volume of salable events included in the currently listed discrete traffic block; and ii) an indication of the duration of the currently listed discrete traffic block.

In this embodiment, the listing tool may be further adapted to: i) determine a portion of the currently listed discrete traffic blocks that are optimal; ii) set the volume parameter to a volume that is a function of the volume of salable events included in the portion of the currently listed discrete traffic blocks that are optimal; and iii) set the duration parameter to a duration of time that is a function of the duration of the portion of the currently listed discrete traffic blocks that optimal.

The portion of the currently listed discrete traffic blocks that are optimal may be a group of the currently listed discrete traffic blocks with the highest ratio of current auction bid price divided by the volume of salable events;

In a third embodiment, the management system may further include a data structure associating, for each of a plurality of open advertisement campaigns: i) a target volume; and ii) a target duration. In this embodiment, the listing tool may be further adapted to: i) set the volume parameter to a volume that is a function of the target volume of at least a portion of the plurality of open advertisement campaigns; and ii) set the duration parameter to a duration of time that is a function of the target volume of at least a portion of the plurality of open advertisement campaigns.

A fourth aspect of the present invention relates to automatic bidding for discrete traffic blocks to fulfill a buyer's advertising campaign objectives and is directed to a management system for brokering, between a seller and a plurality of buyers, sale of at least a portion of the seller's inventory of advertisement impressions that the seller is able to render within an advertisement placement within a web page of the seller's internet traffic.

The management system may comprise an inventory data structure recording a plurality of listed discrete traffic blocks, each listed discrete traffic block comprising at least: i) an identification of the advertisement placement; ii) a volume parameter defining a volume of salable events included in the discrete traffic block; iii) at least one duration parameter defining an active time period during which the volume of traffic included in the discrete traffic block will be provided; iv) an auction parameter defining an expiration time before which buyers submit offers to purchase the discrete traffic block; and v) a bid parameter defining a high bid for the discrete traffic block.

A buyer management tool may be adapted to determine, for a designated buyer, a target event budget and determine, for each listed discrete traffic block: i) an expected target event yield; ii) a current target event price; and iii) a maximum bid.

The expected target event yield may represent the portion of impressions of the advertisement content rendered within the advertisement placement that are expected to yield the target event.

The current target event price may be the high bid divided by both: i) the quantity of salable events included in the discrete traffic block; and ii) portion of salable events that are expected to yield the target event.

The maximum bid may be the target event budget multiplied by both: i) the quantity of salable events included in the discrete traffic block; and ii) the portion of salable events expected to yield the target event.

The buyer management tool may then, for at least one selected discrete traffic block where the high bid of another buyer is less than the maximum bid, enter a bid for the buyer. The at least one selected discrete traffic block may be a listed discrete traffic block that includes a current target event price that is lower than remaining listed discrete traffic blocks.

In one embodiment, the buyer management tool may be further adapted to determine, for the designated buyer: i) a campaign budget; and ii) the aggregate bid price on all discrete traffic blocks for which the management system has entered a bid for the buyer and for which the buyer remains high bidder. In this embodiment, the buy management tool may only enter a new bid on a new selected discrete traffic block if the aggregate bid price plus a price of the new bid is less than the campaign budget.

A fifth aspect of the present invention relates to linking potential buyers of advertisement impression inventory from a web page on which an advertisement placement exists to a management system which brokers the sale of such an inventory of impressions within such advertisement placement. More specifically, the fifth aspect of the present invention is directed to a management system for brokering, between a seller and a plurality of buyers, sale of at least a portion of the seller's inventory of advertisement impressions that the seller is able to render within an advertisement placement within a web page of the seller's internet traffic.

The management system may comprise an inventory data structure recording a plurality of listed discrete traffic blocks. Each listed discrete traffic block may comprise at least: i) an identification of the advertisement placement within web pages of the seller; ii) a volume parameter defining the volume of traffic included in the discrete traffic block; iii) at least one duration parameter defining an active time period during which the volume of traffic included in the discrete traffic block will be provided; iv) an auction parameter defining an expiration time before which buyers submit offers to purchase the discrete traffic block; and v) a bid parameter defining a high bid for the discrete traffic block.

An advertisement inquiry object, installable for rendering with at least one web page of the seller, may be installed and rendered on the web page. The advertisement inquiry object may be adapted to, upon selection by an end user, redirect a browser of the end user to the management system and identify to the management system, at least one of the seller and the web page of the seller.

A listing search tool may be adapted to provide, in response to the redirect of the browser to the management system, a web page comprising a listing of at least one selected discrete traffic block. The selected discrete traffic block may be one of the plurality of discrete traffic blocks that includes an advertisement placement on the web page of the seller—as identified by the advertisement inquiry object.

A sixth aspect of the present invention relates to notifying publishers of website content of a potential buyer's advertising needs for which the publisher may have availability of relevant advertisement impression inventory and is directed to a listing system for brokering, between a seller and a buyer, a discrete traffic block of an advertisement placement.

The listing system may comprise a request for listing tool providing web pages to the buyer for obtaining campaign parameters defining an advertising campaign of the buyer and, if applicable, a request for listing. The campaign parameters may comprise: i) at least one target traffic attribute defining at least one attribute of a target discrete traffic block in which the buyer desires buyer advertisement content to be rendered; and ii) at least one target duration parameter defining a time period during which the buyer desires to have buyer advertisement content rendered.

An inventory data structure may record a plurality of listed discrete traffic blocks, each listed discrete traffic block comprising at least: i) an identification of web pages of a seller; ii)

a traffic profile associated with the web pages; iii) an identification of the advertisement placement within web pages; iv) a volume parameter defining the volume of traffic included in the discrete traffic block; and v) at least one duration parameter defining an active time period during which the volume of traffic included in the discrete traffic block will be provided.

A listing response tool may be adapted to, in response to the traffic profile associated with the web pages of a discrete traffic block matching the target traffic attributes of an advertising campaign, generate a notice message for transfer to a representative of the seller associated with the discrete traffic block.

The listing response tool may further be adapted to provide web pages to the seller for: i) displaying the campaign parameters of the advertising campaign and/or request for listing with which the traffic profile of the web pages matched; and ii) obtaining traffic block parameters associated with a seller proposed discrete traffic block. The seller proposed traffic block parameters may comprise at least: i) a volume parameter defining the volume of traffic included in the discrete traffic block; and ii) at least one duration parameter defining a time period during which the volume of traffic included in the discrete traffic block will be delivered.

The request for listing tool may be further adapted to provide web pages to the buyer for: i) displaying the traffic block parameters associated with each proposed traffic block; and ii) obtaining selection of at least one selected traffic block, the at least one selected traffic block being one of the proposed traffic blocks.

An order fulfillment system may be adapted to direct placement of buyer advertisement content designated by the buyer within an advertisement placement of the at least one selected traffic block for the volume of traffic defined by the volume parameter and during the time period defined by the duration parameter.

For a better understanding of the present invention and the above described aspects thereof, together with other and further aspects thereof, reference is made to the following description, taken in conjunction with the accompanying drawings. The scope of the present invention is set forth in the appended claims.

BRIEF DESCRIPTION OF THE DRAWINGS

FIG. 5b represents exemplary data structure recording a seller's advertisement placements within web pages of the seller's website in accordance with an embodiment of the present invention;

FIG. 5d represents further exemplary data structure recording information related to the sale of a seller's salable inventory of advertisement impressions in accordance with an embodiment of the present invention;

FIG. 6 is a table representing a global attribute library in accordance with an exemplary embodiment of the present invention;

FIG. 7a is a table representing a first traffic template for segmenting a publisher's Internet traffic in accordance with an exemplary embodiment of the present invention;

FIG. 7b is a table representing a second traffic template for segmenting a publisher's Internet traffic in accordance with an exemplary embodiment of the present invention;

FIG. 16a is a web page diagram representing a first embodiment of an inventory report in accordance with an exemplary embodiment of the present invention;

FIG. 17 is a web page diagram representing a web page useful for obtaining a seller's management of discrete traffic block listings in accordance with an exemplary embodiment of the present invention;

FIG. 21 is a web page diagram representing a web page depicting discrete traffic blocks corresponding to objectives of a buyer's campaign in accordance with an embodiment of the present invention;

FIG. 22a represents a calculation of a yield factor in accordance with a first embodiment of the present invention;

FIG. 22b represents a calculation of a yield factor in accordance with a second embodiment of the present invention;

FIG. 22c represents a calculation of a yield factor in accordance with a third embodiment of the present invention;

FIG. 22d represents a calculation of a yield factor in accordance with a fourth embodiment of the present invention;

FIG. 24 is a table representing data relationships useful for implementing automated bidding on discrete traffic blocks in fulfillment of a buyer's advertising campaign blocks in accordance with an embodiment of the present invention;

FIG. 28 is a web page diagram representing a web page displaying request for listings matching a seller's segmented traffic in accordance with an embodiment of the present invention;

FIG. 29 is a web page diagram representing a web page useful for obtaining a seller's proposal of a discrete traffic block in response to a buyer's request for listing in accordance with an embodiment of the present invention;

FIG. 34 is a table depicting an exemplary data structure useful for load balancing and maximizing yield in accordance with an embodiment of the present invention;

FIG. 37 is a diagram depicting exemplary operation of an advertisement inquiry object installable on a seller's web site in accordance with an embodiment of the present invention;

FIG. 44 is a table diagram representing exemplary relationships related to a buyer request to purchase a discrete traffic block.

DETAILED DESCRIPTION OF THE EXEMPLARY EMBODIMENTS

Figure 1:
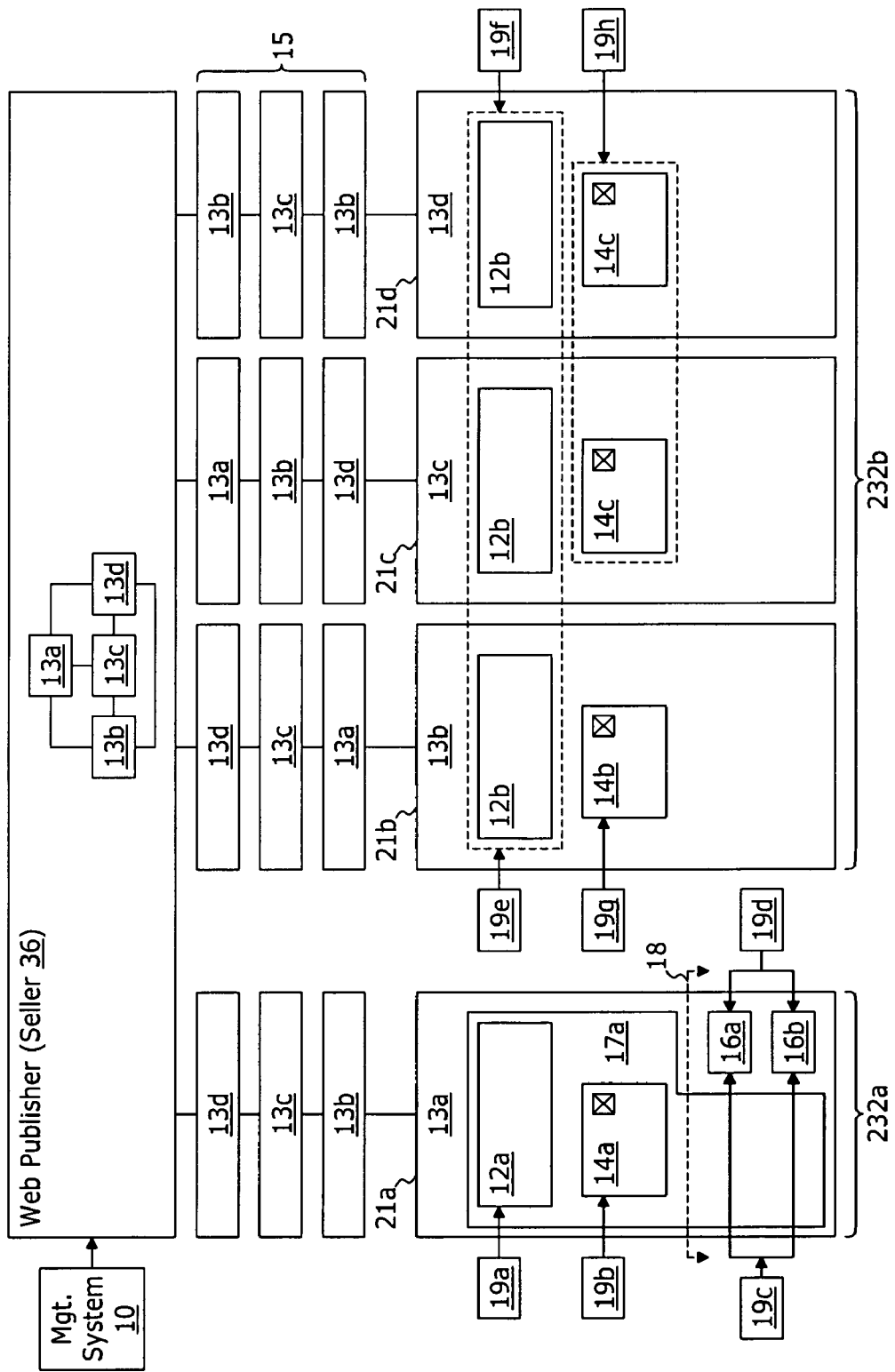
FIG. 1 is a block diagram representing exemplary architecture for implementing a network based system and method for brokering, between a seller and a buyer, sale of at least a portion of the seller's inventory of advertisement impressions that the seller can render within its web pages of internet traffic in accordance with an embodiment of the present invention.

The present invention will now be described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

It should also be appreciated that many of the elements discussed in this specification may be implemented in a hardware circuit(s), a processor executing software code, or a combination of a hardware circuit(s) and a processor or control block of an integrated circuit executing machine readable code. As such, the term circuit, module, server, or other equivalent description of an element as used throughout this specification is intended to encompass a hardware circuit (whether discrete elements or an integrated circuit block), a processor or control block executing code, or a combination of a hardware circuit(s) and a processor and/or control block executing code.

It should also be appreciated that table structures represented in this application are exemplary only and intended to show the mapping of relationships between various data elements. Other table structures may store similar data elements in a manner that maintains the relationships useful for the practice of the present invention. Further, the applicant's use of the term "plurality" is intended to indicate not just "at least one", but one, two, three, or any other quantity.

FIG. 1 represents a management system 10 for brokering the sale of at least a portion of a publisher's (e.g. a seller 36) inventory of advertisement impressions that the seller 36 is able to render within advertisement placements to end user browser systems 21a, 21b within web pages 13 of the internet traffic 15 of the seller 36.

In more detail, the seller 36 may operate a web site comprising a plurality of web page(s) 13a-13d which may be delivered to those end user browser systems 21a, 21b which establish a connection to the seller's web server.

Each web page (for example web page 13a rendered on end user browser system 21a) may include informational or other published content 17a which attracts or draws the end user to the website of the seller 36. Each web page (again, for example web page 13a rendered on end user browser system 21a may include one or more advertisement placement regions (also referred to as advertisement placements) 12a, 14a, 16a, and 16b into which a buyer's advertisement content (for example advertisement content 19a, 19b, and 19c) may be rendered to the end user as an advertisement impression. Similarly, web page 13b rendered on end user browser system 21b may include advertisement placements 12b, and 14b, web page 13c rendered on end user browser system 21c may include advertisement placements 12b, and 14c, and web page 13d rendered on end user browser system 21d may include advertisement placements 12b, and 14c.

Each exemplary advertisement placement 12, 14, and 16 within the web page(s) 13 may be a banner advertisement placement 12, a pop-up advertisement placement 14 which displays over the published content 17 until closed by the end user, and other advertisement placement(s) which are positioned for display on the web page(s) 13 above or below a fold line 18—for example advertisement placements 16a and 16b are rendered below the fold line 18. The fold line 18 distinguishes the portions of the web page 13a which are visible upon loading by the web browser (e.g. portions above the fold line 18) from portions that are only visible when the end user manually scrolls towards the bottom of the web page 13a (e.g. portions below the fold line 18).

The aggregate of all web pages 13 delivered to all end user browser systems 17 may be referred to as the seller's internet traffic 15. The aggregate of all advertisement impressions that the seller 36 is able to render through the advertisement placements 12, 14, 16 within internet traffic 15 may be referred to as the seller's inventory of advertisement impressions, or impression inventory.

Unlike conventional continuous auction systems which broker placement of advertisement content as an advertisement impression on a single impression basis, the management system 10 may be adapted to: i) define groups of one, two, or more web pages 13 with similar traffic patterns (e.g. a page profile group); ii) segment each page profile group into one, two, or more traffic attribute segments based on end user attributes (i.e. known attributes of the end user to which the advertisement impression will be rendered, including such attributes as geographic, demographic, behavioral) and/or classification of published content (in a web page where the published content is periodically altered between one, two, or more classifications); iv) define advertisement placements within one or more web pages of each page profile group; v) associate advertisement placements with one or more segments of the page profile group to develop a salable inventory of advertisement impressions; and v) define and list discrete traffic blocks of such inventory.

For example a seller 36 may define a first page profile group (page profile group ID 232a) to include a single web page 13a (for example the web sites landing page) and a second page profile group (page profile group ID 232b) which includes web pages 13b, 13c and 13d.

The inclusion of multiple web pages within a single page profile group is useful when the end user traffic patterns (i.e. attributes of end users linking to such pages) are consistent across all of those pages. As an example, it may be useful for a seller operating a web site with multiple groupings of web pages—with each grouping being dedicated to a distinct topic such as finance, sports, or entertainment, etcetera—to group all pages related to a particular distinct topic into a single page profile group. For example, all pages relating to finance may be grouped to form a first page profile group while all pages related to sports may be grouped to form a second page profile group. Each advertisement placement 12, 14, and 16 may be rendered in permutations of one or more of the web pages 13 associated with the page profile group 232.

Figure 2:
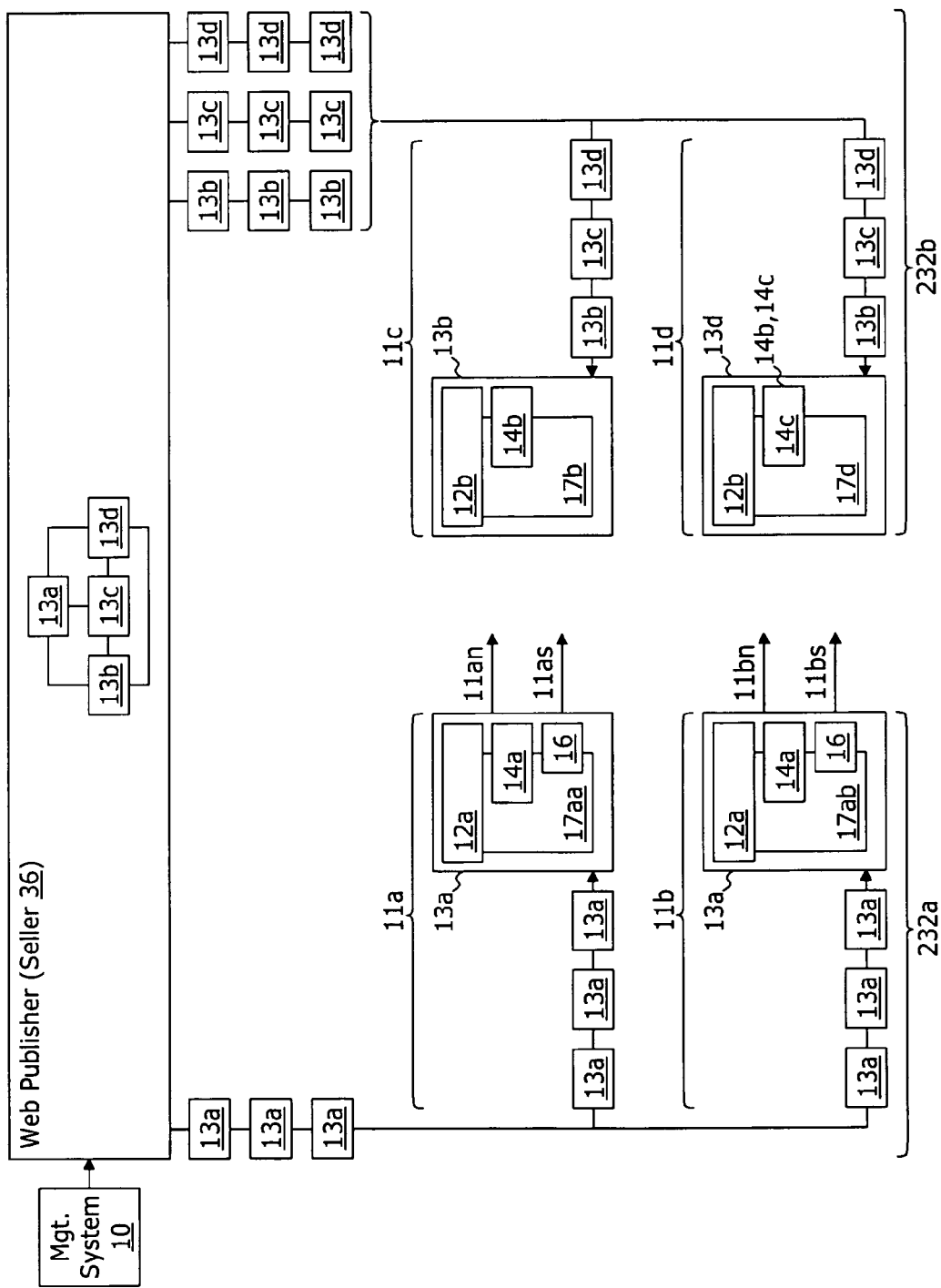
FIG. 2 is a block diagram representing exemplary architecture for implementing a network based system and method for brokering, between a seller and a buyer, sale of at least a portion of the seller's inventory of advertisement impressions that the seller can render within its web pages of internet traffic in accordance with an embodiment of the present invention.

Turning briefly to FIG. 2 in conjunction with FIG. 1, each page profile group 232a and 232b may be segmented into one or more traffic attribute segments, 11a, 11b, 11c, and 11d utilizing, for example, combinations of end user (or traffic) attribute segmentation and/or contextual attribute segmentation.

In general, if total web site traffic 15 for any page profile group includes a significantly large quantity of "hits" per day from diverse end users, it is reasonable to expect that certain advertisement content that would appeal to, or be effective with, one segment of those end users (for example male end users) may not be as appealing to, or effective with, another segment of those end users (for example female end users). Therefore, if end user attribute information is available, it may be beneficial for the seller to segment the page profile group into multiple distinct end user attribute segments to allow for the sale of discrete traffic blocks targeting distinct end user attribute segments for purposes of maximizing the aggregate value of the traffic 15 (i.e. impression inventory).

As an example of end user attribute segmentation, page profile group 232b may be attribute segmented to yield traffic segments 11c (corresponding to instances of the web page 13b, 13c, or 13d rendered to female end users) and traffic segment 11d (corresponding to instances of the web page 13b, 13c, or 13d rendered to male end users).

Such exemplary segmentation may be beneficial to the seller 36 because it can be reasonably expected that aggregate revenue from the sale of discrete traffic blocks to the two segments independently (for example a male segment being sold to the highest bidder willing to pay for the male segment and a female segment being sold to the highest bidder willing to pay for the female segment) will be greater than revenue from the sale of the entire traffic block 15 as single segment including both male and female end users.

It should be appreciated that the exemplary segmentation based on male/female end users is an example only. Page profile group 232b may be segmented into attribute segments 11c and 11d. Segments may be defined based on end user attributes. It is useful to define segments based on end user attributes that can be determined about an end user at the time the advertisement impression is to be rendered within web page 13 provided to the end user. Examples include the end user's: i) geographic location, ii) demographic information such as end user's gender, age, and income bracket; and iii) behavioral patterns.

The end user's geographic location which may be determined based on the end user's IP address and/or registration information provided by the end user. Demographic information may be determined by data input by the end user on a registration page. Behavioral information (or other demographic information) may be obtained from information stored on the end user's computer, for example "cookies", which indicates user activity.

Similarly, it is reasonable to expect that certain advertisement content that would appeal to, or be effective with, end user readers selecting certain published content (for example users selecting to read a sports article) may not be as appealing to, or effective with, end users selecting different published content (for example end users selecting to read a political news article). Therefore, if web content is periodically changed for a particular web page, it may be beneficial for the seller to segment the page profile group into multiple distinct contextual attribute segments to allow for the sale of discrete traffic blocks targeting distinct contextual attribute segments for purposes of maximizing the aggregate value of the traffic 15.

As an example of contextual attribute segmentation, assume that the content of the seller's published content 17a within web page 13a is periodically changed (for example it's a news story) between content of a first classification 17aa (a sports related news story for example) and content of a second classification 17ab (a weather related news story for example), the page profile group 232a may be contextually segmented to yield traffic segments 11a (corresponding to instances of the web page 13a rendered with content of the first classification 17aa) and traffic segment 11b (corresponding to instances of the web page 13a rendered with content of the second classification 17ab).

Again, it should be appreciated that these examples of end user attribute segmentation and contextual segmentation are exemplary only. It is envisioned that any page profile group 232 may be segmented into one, two, or more traffic attribute segments based on many permutations of both context and end user attributes to yield multiple traffic segments.

As an example, page profile group 232a may be contextually segmented based on content and further segmented based on known end user geographical attributes such that segments may be: i) instances of the web page with content of the first classification 17aa rendered to end users from the northeast United States (represented by arrow 11an); ii) instances of the web page with content of the first classification 17aa rendered to end users from the southeast United States (represented by arrow 11as); iii) instances of the web page with the second classification 17ab rendered to end users from the northeast United States (represented by arrow 11bn); and iv) instances of the web page with the second classification 17ab rendered to end users from the southeast United States (represented by arrow 11bs).

Returning to FIG. 1, the management system 10 may be further adapted to define, for each page profile group 232, one or more advertisement placements 12, 14, and 16 within one or more web pages 13 of the page profile group 232, and define an inventory listing (e.g. a segmented advertisement placement) by associating such advertisement placement 12, 14, 16 with one or more traffic attribute segments 11 (FIG. 2) of the page profile group 232.

For example, referring briefly to FIG. 5b in conjunction with FIG. 1, with respect to page profile group 232a, a first advertisement placement (with an advertisement placement ID 93 of "001") may be the banner advertisement placement 12a, a second advertisement placement (with an advertisement placement ID 93 of "002") may be the pop over advertisement placement 14a, and a third advertisement placement (with an advertisement placement ID 93 of "003") may be a combination of both of the advertisement placements 16a and 16b, in each case, of the page profile group 232a (consisting of web page 13a).

With respect to page profile group 232b, a fourth advertisement placement (with an advertisement placement ID 93 of "004") may be the banner advertisement placement 12b on each of pages 13b, 13c and 13d of the page profile group 232b, a fifth advertisement placement (with an advertisement placement ID 93 of "005") may be the pop over advertisement placement 14b on only web page 13b of the page profile group 232b while a sixth advertisement placement (with an advertisement placement ID 93 of "006") may be the pop over advertisement placement 14c on the remaining web pages 13c and 13d of the page profile group 232b.

Figure 3:
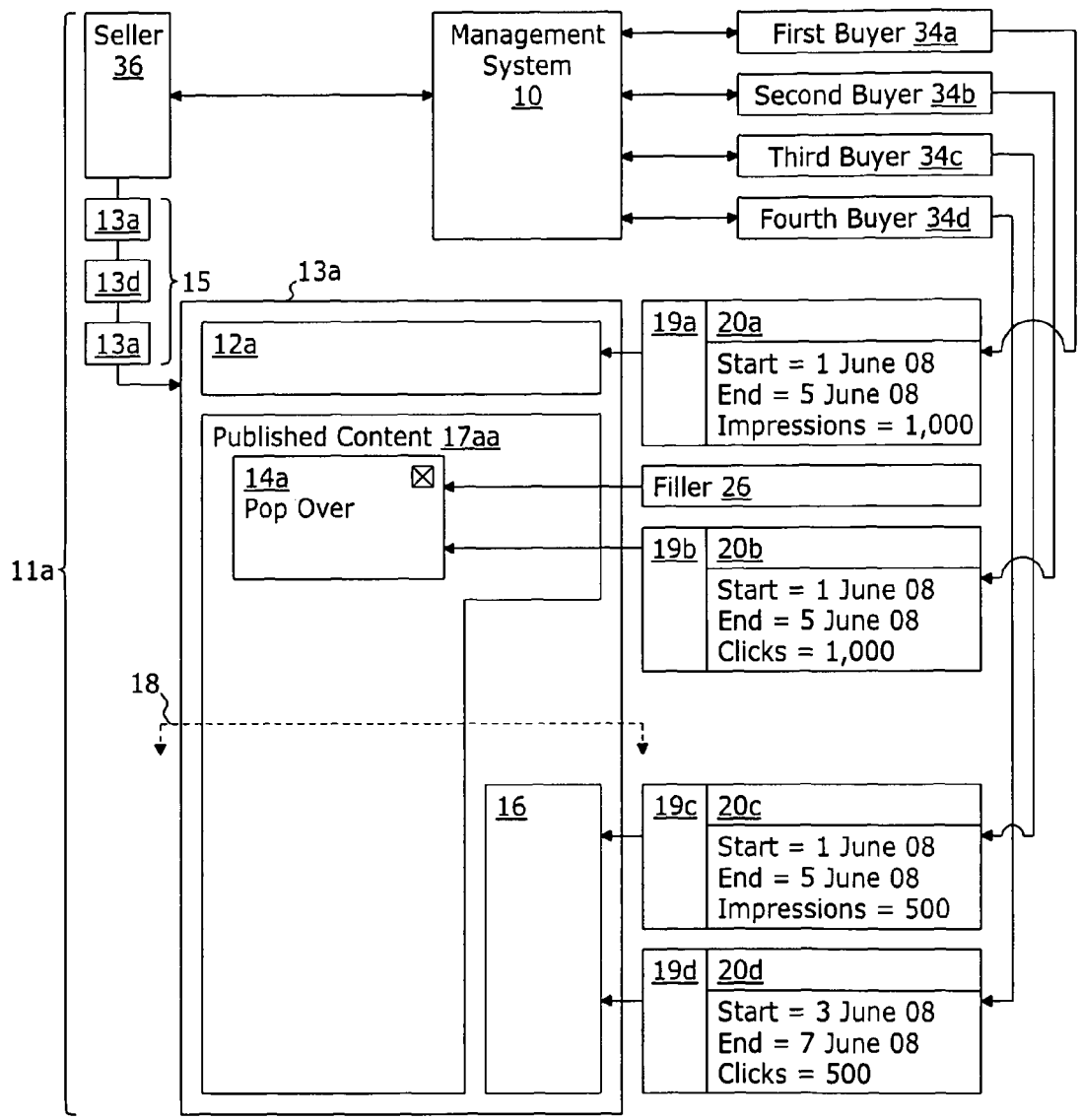
FIG. 3 is a block diagram representing exemplary architecture for implementing a network based system and method for brokering the sale of Internet advertisement inventory as discrete traffic blocks of segmented Internet traffic in accordance with an embodiment of the present invention.

Turning to FIG. 3, the management system 10 may be adapted to broker the placement of advertisement content as an advertisement impression within the various advertisement placements 12, 14, and 16 of one, two, or more segments of a page profile group (for example segment 11a of page profile group 232a) in a plurality of discrete traffic blocks (for example discrete traffic blocks 20a-20d).

Each discrete traffic block 20a-20d may comprise: i) a defined quantity of impressions rendered within the advertisement placement during a specified duration of time; ii) a sufficient quantity of impressions rendered within the advertisement placement to yield a defined quantity of clicks (end user's selecting the advertisement impression to link through to the advertiser's website) during a specified duration of time; or iii) a sufficient quantity of impressions rendered within the advertisement placement to yield a defined quantity of other salable events (for example, leads, sales, etc) during a specified duration of time. In all cases, the specified duration may be defined by a specified start time and a specified end time.

For example, first buyer 34a may purchase a discrete traffic block 20a for advertisement placement 12a which comprises rendering of 1,000 impressions within banner advertisement placement 12a between 1 Jun. 2008 and 5 Jun. 2008. Each impression comprises a rendering of advertisement content 19a defined by the first buyer 34a to a unique end user obtaining and viewing the web page 13 in the browser system of the end user.

As a second example, second buyer 34b may purchase a discrete traffic block 20b for advertisement placement 14a which comprises 1,000 clicks between 1 Jun. 2008 and 5 Jun. 2008. As such, advertisement content 19b defined by the second buyer 34b will be rendered within advertisement placement 14a for a sufficient quantity of impressions to yield 1,000 clicks between 1 Jun. 2008 and 5 Jun. 2008.

As yet a third example: i) a third buyer 34c may purchase a discrete traffic block 20c for advertisement placement 16 which comprises rendering of 500 impressions within advertisement placement 16 between 1 Jun. 2008 and 5 Jun. 2008; and ii) a fourth buyer 34d may purchase a discrete traffic block 20d for advertisement placement 16 which comprises 500 clicks between 3 Jun. 2008 and 7 Jun. 2008.

As such, advertisement content 19c defined by the third buyer 34c is rendered within the advertisement placement 16 to a unique end user obtaining and viewing the web page 13 between 1 Jun. 2008 and 5 Jun. 2008 and advertisement content 19d defined by the fourth buyer 34d is rendered within the advertisement placement 16 for a sufficient quantity of impressions to yield 500 clicks between 3 Jun. 2008 and 7 Jun. 2008. During the time period between 3 Jun. 2008 and 5 Jun. 2008 when the two discrete traffic blocks overlap, order balancing systems (discussed herein) provide for selection of which advertisement content 19c or 19d to render within the advertisement placement 16 as an impression to each unique end user.

In all four examples, filler advertisement content 26 (for example filler placements sold by way of brokerage by the system 10, filler placements obtained via an associated advertisement network, and/or filler placements defined by the seller 36 to be placed in the absence of a higher yielding advertisement placement) may be rendered within the advertisement placement 12, 14, or 16 as needed if the web site traffic 15 (i.e. the quantity of impressions that the seller is able to deliver) exceeds that needed for delivery of advertisement impressions for each purchased discrete traffic block. A more detailed discussion of filler advertisement content 26 and its placement within a web page 13 is discussed herein.

Figure 4:
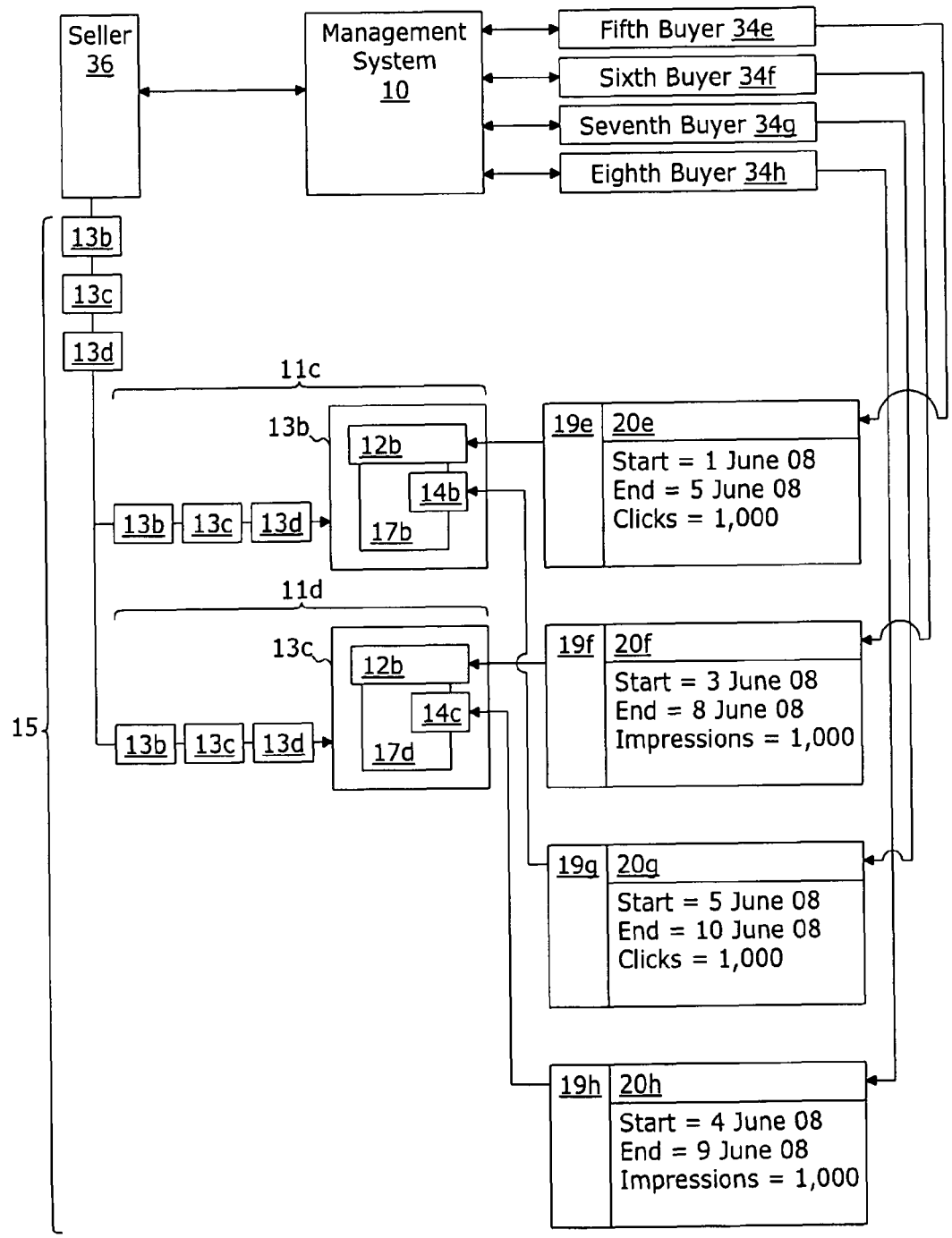
FIG. 4 is a block diagram representing exemplary architecture for implementing a network based system and method for brokering the sale of Internet advertisement inventory as discrete traffic blocks of segmented Internet traffic in accordance with an embodiment of the present invention.

Turning to FIG. 4 in conjunction with FIG. 2 and with reference to page profile group 232b, a fifth buyer 34e may purchase a discrete traffic block 20e for advertisement placement 12b within attribute segment 11c which, as discussed, comprises the male attribute segment such that each advertisement impression is rendered to a male end user. The discrete traffic block 20e may comprise rendering a volume of 1,000 clicks within advertisement placement 12b (on any of web pages 13b, 13c, or 13d) between 1 Jun. 2008 and 5 Jun. 2008.

Similarly, a sixth buyer 34f may purchase a discrete traffic block 20f for advertisement placement 12b which comprises rendering of 1,000 impressions within advertisement placement 12b (on any of web pages 13b, 13c, or 13d) between 3 Jun. 2008 and 8 Jun. 2008. The discrete traffic block 20f may comprise attribute segment 11d which, as discussed, comprises the female attribute segment such that each ad impression is rendered to a female end user.

Similarly, a seventh buyer 34g may purchase a discrete traffic block 20g for advertisement placement 14b which comprises rendering a volume of 1,000 clicks within advertisement placement 14b (on web page 13b) between 5 Jun. 2008 and 10 Jun. 2008. The discrete traffic block 20g may be within attribute segment 11c which, as discussed, comprises the male attribute segment such that each ad impression is rendered to a male end user.

Similarly, an eight buyer 34h may purchase a discrete traffic block 20h for advertisement placement 14c which comprises rendering of 1,000 impressions within advertisement placement 14c (on either web page 13c or 13d) between 4 Jun. 2008 and 9 Jun. 2008. The discrete traffic block 20h may be within attribute segment 11d which, as discussed, comprises the female attribute segment such that each ad impression is rendered to a female end user.

Figure 5A:
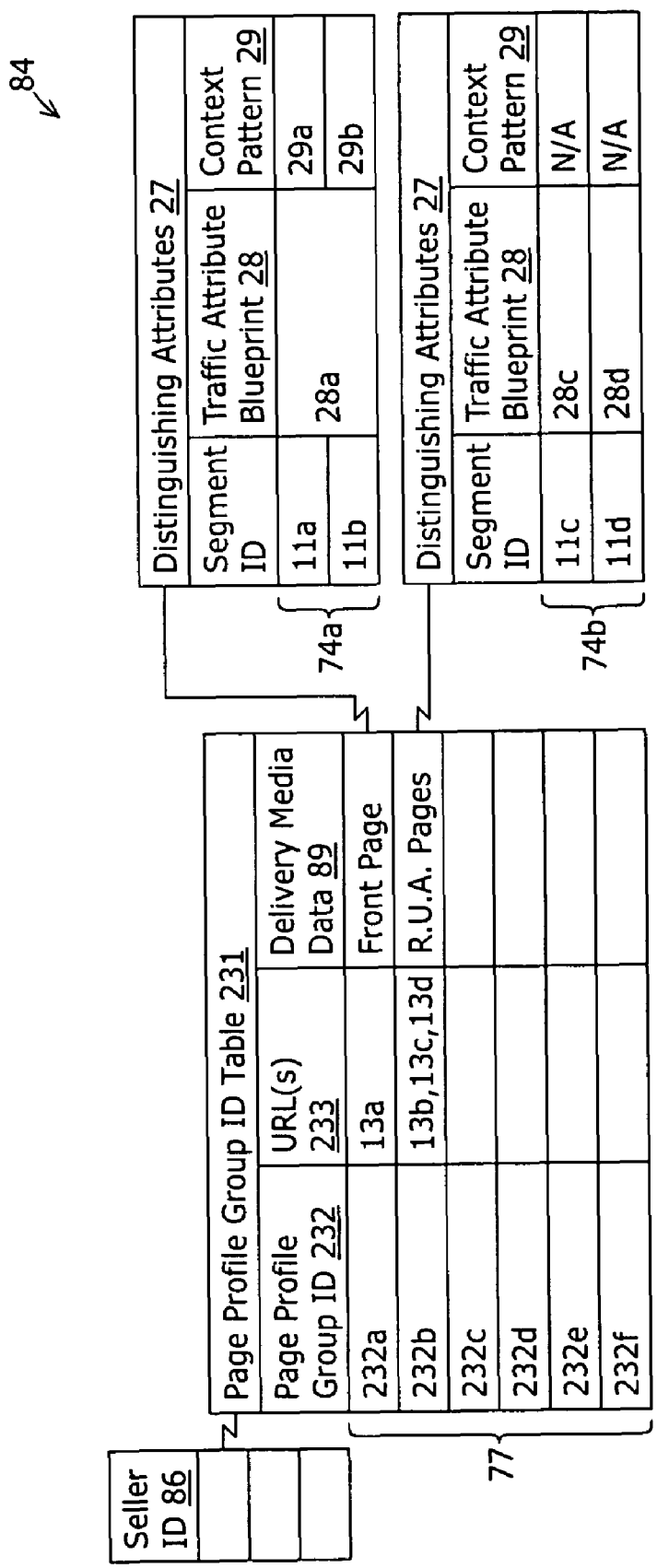
FIG. 5a represents exemplary data structure recording a seller's segmentation of its inventory of advertisement impressions and recording distinguishing attributes of each segment in accordance with an embodiment of the present invention.

Data Relationships Referring to FIG. 5a in conjunction with FIG. 1, the management system 10 may be adapted to maintain exemplary data relationships 84 defining a seller's page profile groups 232 and segmentation thereof. Associated with a seller ID 86 (identifying one of multiple sellers 36) may be a plurality of page profile groups, each represented by a page profile group ID 232a-232f recorded, for example, as a record 77 of a page profile group ID table 231. Each page profile group ID 232a-232f may be associated with the URL(s) 233 of the web page(s) 13 within the page profile group and delivery media data 89.

The delivery media data 89 may include information related to classification of the content of the web page(s), attributes of the web page(s) 13, branding associated with the web page(s) 13, and other information related to the content of the web page(s) 13 which is useful to a potential buyer assessing whether the published content is sufficiently related to the buyer's potential advertisement for placement to be beneficial.

Also associated with each page profile group ID 232a-232f are a plurality of records 74a, 74b. Each record represents one of the segments 11a-11d into which the Internet traffic 15 of the page profile group has been segmented. Each record 74 associates the segment 11a-11d with its distinguishing attributes 27 which may include a traffic attribute blue print 28 for distinguishing the segment 11 from other segments 11 based on a traffic profile of end user attributes such as geographic, demographic, and/or behavioral attributes and/or a context pattern 29 distinguishing the segment 11 from other segments 11 based on a contextual segmentation of differing web page content in a situation wherein web page content of a web page 13 is periodically altered between multiple classification.

For example, page profile group 232a, which comprises web page 13a, may be contextually segmented into segments 11a and 11b associated with context patterns 29a and 29b respectively as the distinguishing attributes 27. Assuming no further segmentation of the page profile group 232a based on end user attributes, a single traffic attribute blueprint 28a may be associated with both segments 11a and 11b.

Page profile group 232b, which comprises web pages 13b, 13c and 13d, may be segmented based on end user attributes only. As such, traffic attribute blue prints 28c and 28d comprise the distinguishing attributes 27 distinguishing segment 11c from segment 11d.

It should be appreciated that although contextual segments 11a and 11b may be distinguished only by a context pattern 29, such segments may also further be associated with a single (or multiple) traffic attribute blueprint(s) (e.g. a single (or multiple) attribute segment(s)) for purposes of facilitating matching of the context segments 11a and 11b with applicable buyers based on end user traffic attributes.

Referring briefly to FIG. 6 in conjunction with FIG. 5a, for purposes of defining a traffic attribute blue print 28 to distinguish segments by end user attributes, an exemplary embodiment of the system 10 may include a global attribute library 70 which includes all attributes 80 that may be used to define a traffic attribute blueprint 28 and distinguish a segment of internet traffic 15 by end user attributes.

The global attribute library 70 may include several thousand, or more, attribute descriptions 72. Examples include: i) geographical attributes such as United States, United Kingdom, regions of the United States such as New England, Mid Atlantic, and South East, and individual states and/or postal codes; ii) demographic attributes may include male/female, age brackets and income brackets; and iii) behavioral attributes (not shown).

Turning to FIG. 7a in conjunction with FIG. 6, an exemplary traffic template 76a may be defined as a selected subset of the end user attribute descriptions 72 that are utilized for defining the traffic attribute blue prints 28 which segment the page profile group into multiple attribute segments.

For example, multiple attribute blue prints 28a-28g may be defined utilizing traffic template 76a. Each blue print 28a-28g is uniquely associated with, and defines, end user attributes of an attribute segment 11a-11g—and distinguishes such attribute segment from the other attribute segments. More specifically, each traffic attribute blue print is a unique permutation of end user attributes of the traffic template 76a.

For example, the exemplary traffic template 76a distinguishes segments 11a-11g based on end user geography location. Such segmentation is useful for one or more web pages 13 for which heavy volume from geographically diverse end users is achieved—and for which other segmentation strategies based on demographic information may not be available.

The traffic template 76a may be based on an attribute subset 80 of the global attribute library 70. A first traffic segment 11a may include a traffic attribute blue print 28a in which attributes of United States and New England are identified as required. Similarly segments 11b through 11f, including traffic attribute blue prints 28b through 28f respectively, each identifying other regions of the United States as the applicable required attributes. Segment 11g includes a traffic attribute blue print 28g with no specified required geography and as such would be a segment that includes all non US end users by virtue of such end user's not being within any of the other segments 11a-11f, each of which requires a specific geography.

As another example, turning to FIG. 7b, an exemplary traffic template 76b comprising selected end user attributes 80 may be used to define traffic attribute blueprints 28a-28f distinguishing segments 11a-11f based on demographic information (e.g. users gender and age). The first segment 11a may include a traffic attribute blue print 28a identifying female end users as a required attribute without further attribute segmentation. Segments 11b through 11f may include traffic attribute blue prints 28b through 28f respectively, each identify male end users as a required attribute—with further segmentation by age group. As such, female end users will be within the first segment 11a, while male end users will be within the proper segment 11b through 11f—based on each segment being limited to an attribute defining a required age classification.

As will be discussed in more detail herein, when an advertisement request is received by an order fulfillment system 40 (FIG. 11), the request may designate certain end user attributes known about the end user to which the web page 13 will be rendered. The order fulfillment system 40 may match the end user attributes to the traffic attribute blue print 28 of each of the traffic segments 11 of the traffic profile template 76 to identify the traffic segment 11 to which the end user's attributes best match or correspond. The order fulfillment system 40 will then serve advertisement content of an active traffic block (e.g. an open order) for such identified traffic segment 11.

Figure 8:
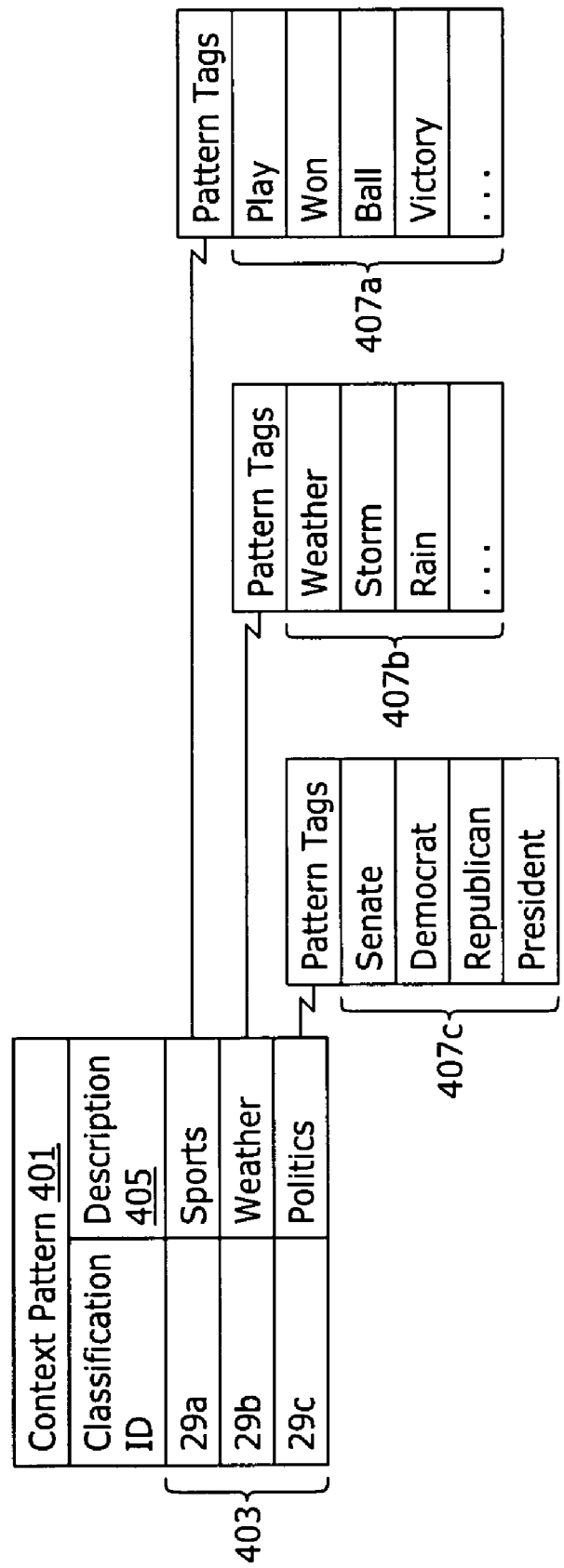
FIG. 8 is a data structure representing contextual segmentation patterns in accordance with an exemplary embodiment of the present invention.

Turning to FIG. 8 in conjunction with FIG. 5a and FIG. 1, exemplary context classifications 29a-29c for distinguishing contextual segments are represented. In the exemplary embodiment, each of a plurality of context classifications, represented by a context classification ID 29a, 29b, and 29c, may be recorded, for example, as a record 403 of a context pattern table 401. Each context classification ID 29a, 29b, and 29c may associate with: i) a context description 405 describing a particular classification of potential web page published content such as sports, weather, or politics; and ii) classification data, unique to the classification, useful for determining whether content of a web page matches or corresponds to the context classification, and distinguishing the published content from other classifications.

In one embodiment, such classification data may be a set of pattern tags 407a, 407b, and 407c. Preferably the pattern tags 407 represent words unique to or utilized more frequently in content within the context classification than content of other context classifications. As will be discussed in more detail herein, the order fulfillment system 40 (FIG. 11) may include a context determination system 47 for periodically accessing the seller's web site to obtain web content for purposes of determining, if the web content periodically changes, its then current context classification.

Turning to FIG. 5b in conjunction with FIG. 1, the data relationships 84 maintained by the system 10 may further associate each advertisement placement 12, 14, and 16 (identified by an ad placement ID 93) with its page profile group (identified by a page profile group ID 232). For example, a plurality of records 75, associated with a page profile group 232, may each associate an advertisement placement (identified by its advertisement placement ID 93) with: i) identification of the web pages 13 within the page profile group on which the advertisement placement exists (e.g. Identification by URL); ii) its size designator 88 (which, as an example, may be determined utilizing Interactive Advertising Bureau standard sizes); iii) its position designator 90 defining its position within (or related to) content on the web page 13; and iv) the page profile group ID 232 associated with the web pages 13 on which the advertisement placement is rendered.

Figure 5C:
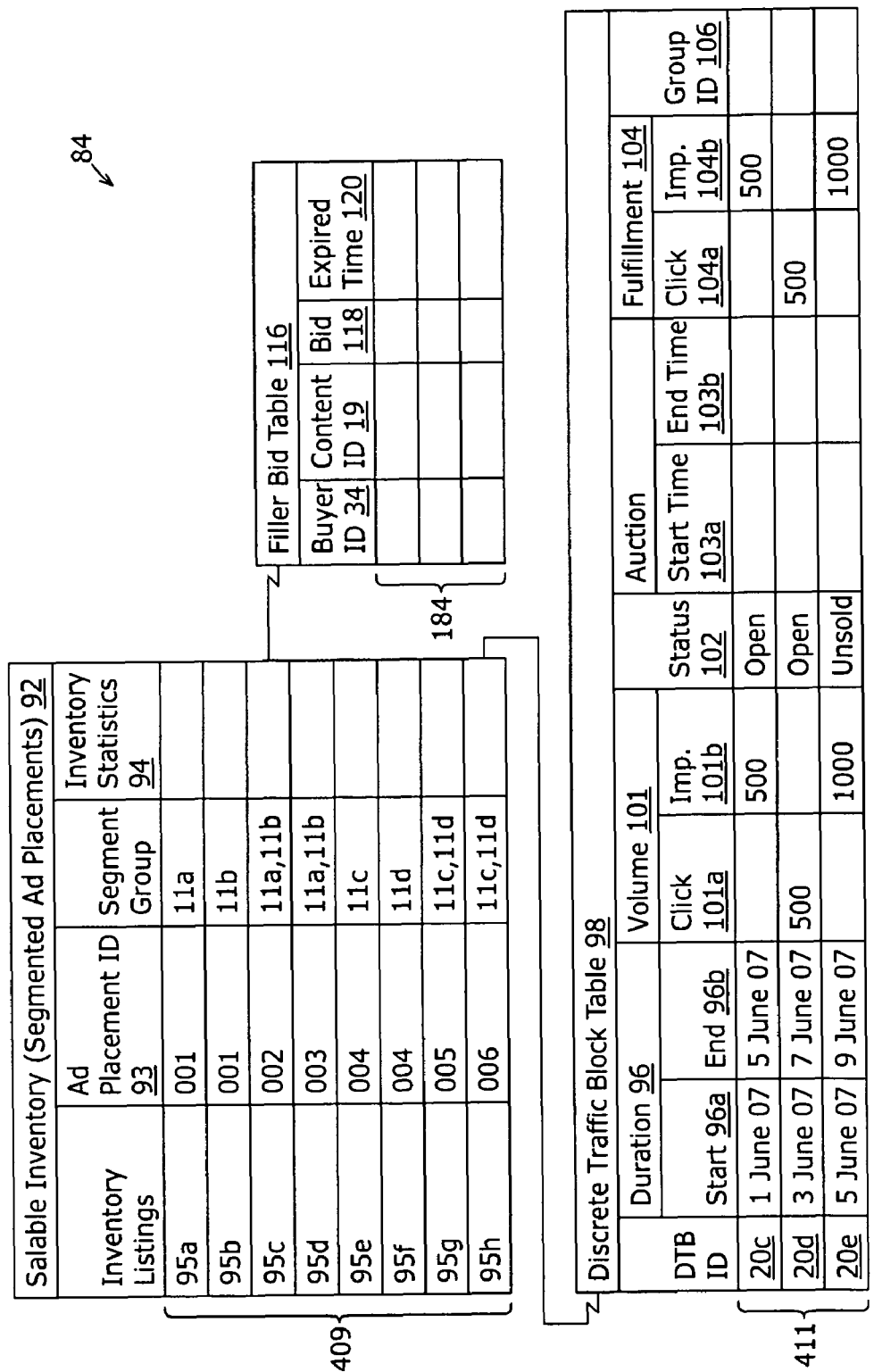
FIG. 5c represents exemplary data structure recording a seller's salable inventory of advertisement impressions and information related to the sale thereof in accordance with an embodiment of the present invention.

Turning to FIG. 5c in conjunction with FIG. 1, the data relationships 84 may further associate inventory listings 95 (e.g. segmented advertisement placements) with each advertisement placement utilizing, for example, a salable inventory table 92. More specifically, each of a plurality of records 409 may represent an inventory listing (also inventory listing may also referred to as a segmented ad placement). The record 409 associates an inventory listing identifier 95a-95h (also referred to as a segmented ad placement identifier) with: i) identification of the ad placement (by ad placement ID 93); ii) identification of a group of one or more segments 11 of a page profile group 232 grouped to form the inventory listing 95; and iii) inventory statistics 94.

The inventory statistics 94 may include values such as: i) expected quantity of impressions per period of time (e.g. expected impressions per day); ii) historical quantity of impressions per period of time (e.g. historical impressions per day); iii) estimated yield factor (e.g. an estimated ratio of quantity of clicks per 1000 impressions); and iv) historical yield factor (e.g. a ratio of historical quantity of clicks per 1000 impressions).

Figure 11:
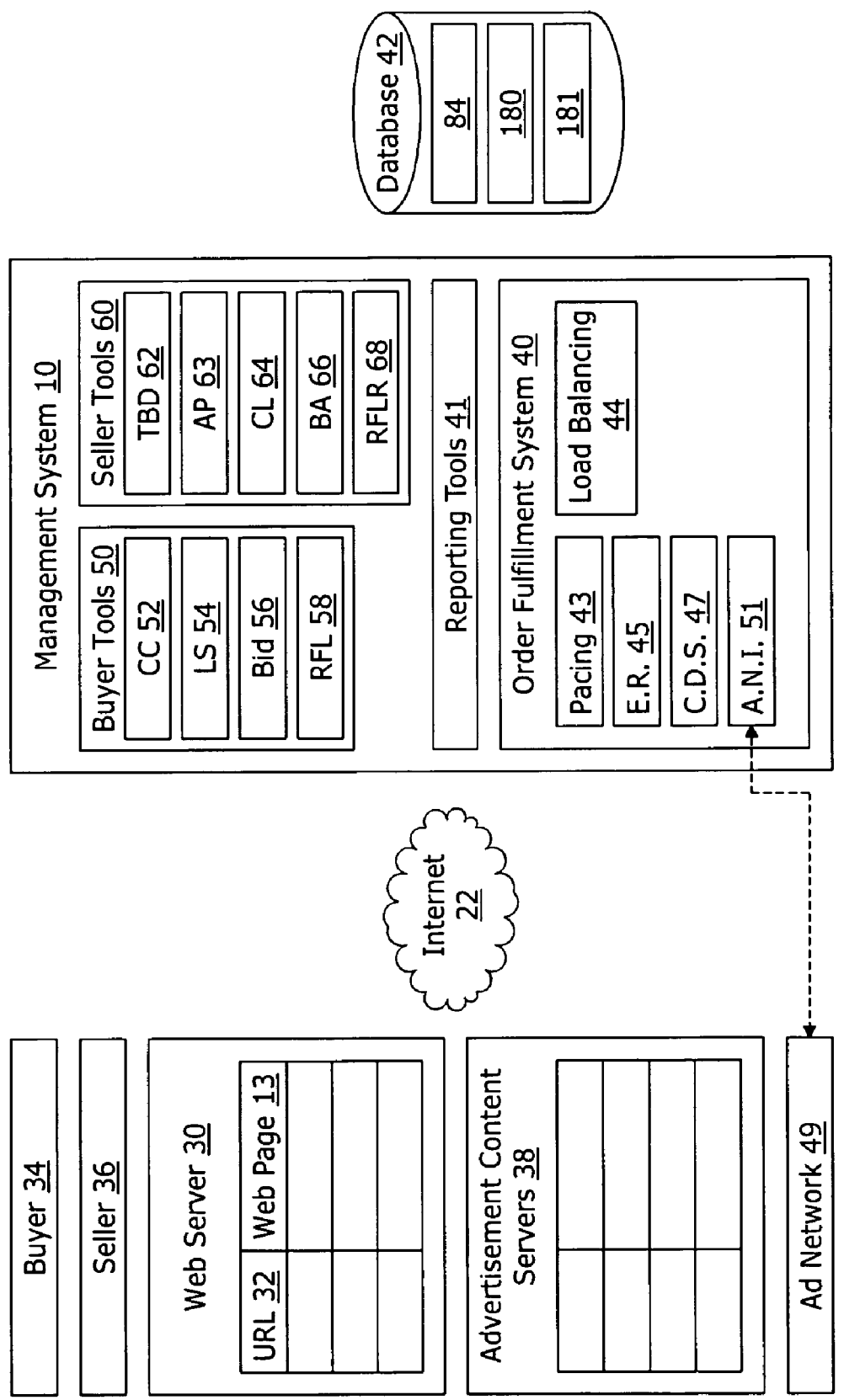
FIG. 11 is a block diagram representing exemplary architecture for implementing a network based system and method for brokering, between a seller and a buyer, sale of at least a portion of the seller's inventory of advertisement impressions that the seller can render within its web pages of internet traffic in accordance with an embodiment of the present invention.

The historical data may be tracked and accumulated by the order fulfillment system 40 (FIG. 11). Further, when a segmented advertisement placement is first defined, initial historical data may be determined: i) based on historical data from similar web pages/segmented advertisement placements of the seller; and/or ii) the web pages/segmented advertisement placements of the seller which are replaced by the newly defined segmented advertisement placement.

The data relationships 84 may also associate each segmented advertisement placement 95 with information related to sales of impressions by way of discrete sales and fulfillment of traffic blocks and, if applicable, continuous auction filler placements. Each of a plurality of discrete traffic blocks 20 of the segmented advertisement placement 95 made available for buyers to purchase may be represented as a record 411 of a discrete traffic block table 98.

The record 411 defines the discrete traffic block 20 in terms of its duration 96 (i.e. a start time 96*a* and an end time 96*b* defining the time period during which the volume of salable events included in the traffic block will be delivered) and its volume 101 (e.g. salable events such as a quantity of clicks 101*a* or a quantity of impressions 101*b*).

Figure 5E:
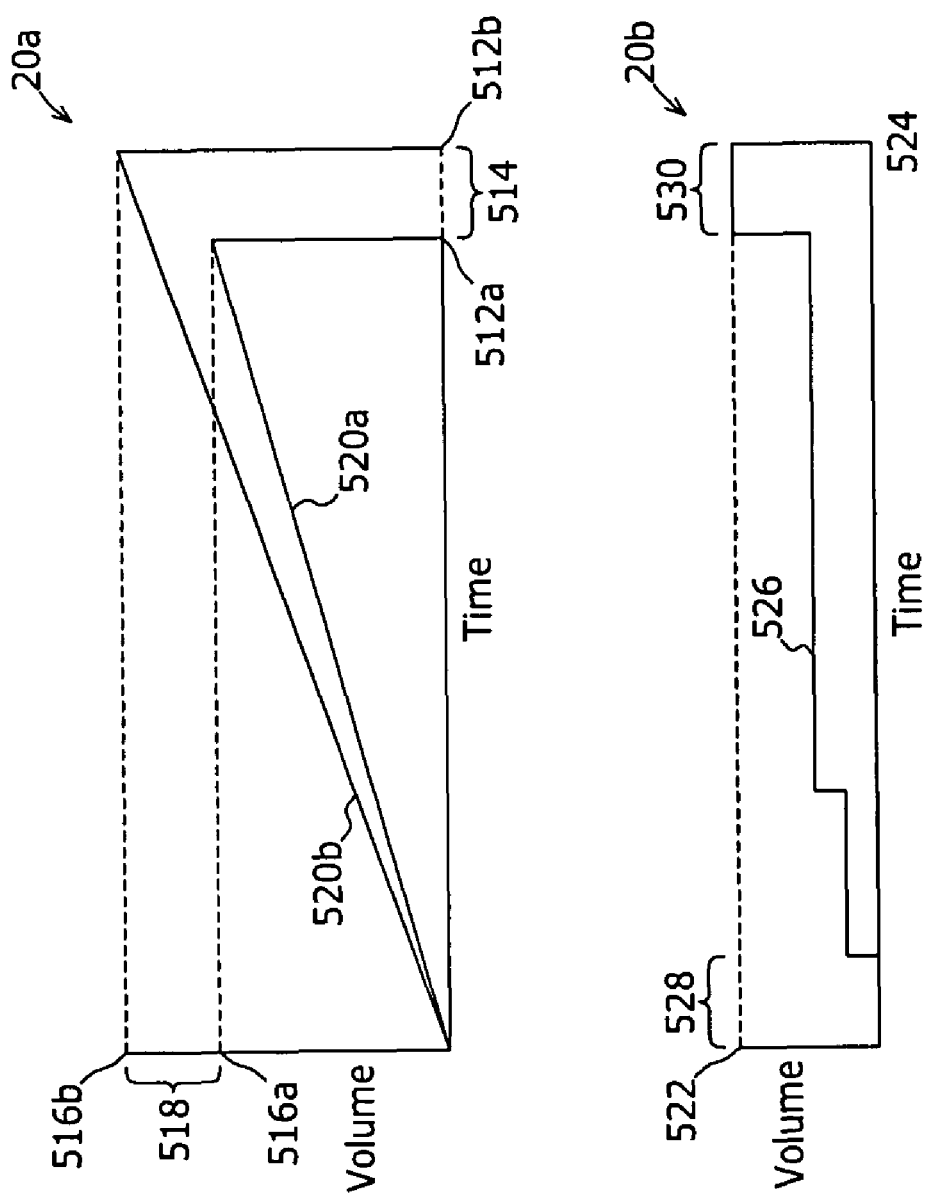
FIG. 5e depicts graphs distinguishing between exemplary discrete traffic blocks with a desirable and expected pacing requirement and an exemplary discrete traffic block that can be fulfilled independent of pacing.

Turning briefly to FIG. 5*e*, two exemplary discrete traffic blocks 20*a* and 20*b* are representing in graphical form. Discrete traffic block 20*a* comprises a volume of salable events 516*a* to be delivered during a duration 512*a*. In this first traffic block model, the salable events are expected to be delivered at an even fulfillment pace 520*a* (e.g. a target pace) which comprises the volume of salable events 516*a* divided by the duration 512*a*.

As will be discussed in more detail, it is expected that there will be a typical fulfillment pace 520*a* (e.g. slope of line 520*a*) that is optimal in that it is a pace commonly desired by buyers for fulfillment of advertising campaign objectives. As such if a larger traffic block with an incrementally longer duration 514 (total duration of 512*b*) is defined, a similarly incrementally larger volume of salable events 518 (total salable events 516*b*) would be required to maintain a similar (or otherwise typical or desirable) fulfillment pace 520*b* commonly desired by buyers.

Because the exemplary discrete traffic block 20*a* is paced at a typical and desirable fulfillment pace, an advantage of offering salable inventory 95 (FIG. 5*c*) utilizing such optimally sized and paced blocks is that premium values may be obtained for such blocks. However, a disadvantage exists in that sale of inventory 95 utilizing only optimally sized and paced blocks may result in excess unsold inventory and/or time when no discrete traffic block of the inventory is available for sale.

As such, a second exemplary discrete traffic block 20*b* may implement a filler discrete traffic block model wherein the discrete traffic block 20*b* includes a defined volume of salable events 522 to be delivered during a defined duration 524 but with no expected fulfillment pacing. Actual fulfillment 526 may be at any time during the duration 524. For example, an initial portion 528 of the duration 524 may include no fulfillment and a final portion 530 of the duration 524 may also include no fulfillment—and fulfillment there between may be sporadic.

This exemplary filler traffic block 20*b* may also be characterized by a relatively long duration of time 524 compared to its volume 522. The advantages of the filler traffic block having the relatively long duration of time compared to its volume 22 and having no pacing expectation is that there exists a very low probability that fulfillment will materially impact pacing for other discrete traffic blocks.

Because such a filler block has few pacing constraints, if any, on the order fulfillment system 40, a seller can confidently keep such blocks offered for sale on a "standing order" basis—meaning that a new listing for a new block can be created immediately upon the sale of a previously listed block without material consideration to fulfillment capabilities.

Returning to FIG. 5*c*, for each discrete traffic block 20 sold by auction, the record 411 further associates the discrete traffic block 20 with an auction start time 103*a* and an auction end time 103*b* defining the end time of an auction for purchase of the discrete traffic block 20 and bidding data (described with respect to FIG. 5*d*).

A status identifier 102 may indicate whether: i) the auction is active; ii) the auction is ended unsold; iii) the discrete traffic block 20 is sold—but that the start time 96*a* of the duration has not yet occurred (e.g. the discrete traffic block 20 is not yet an open order); iv) the discrete traffic block is sold 20 and is an active traffic block being fulfilled by the order fulfillment system 40 (e.g. the discrete traffic block 20 is an open order); v) the order has been fulfilled; and vi) other status such as order ended short or order canceled.

Those skilled in the art will appreciate that the distinction between the statuses of sold but not open, sold and open order, and fulfilled order may be calculated from other data within the discrete traffic block table 98 and need not be represented within a status field. However, such statuses are represented in the status field for purposes of convenient illustration.

Further associated with the discrete traffic block 20 may be fulfillment fields 104 for tracking order fulfillment. The fulfillment fields 104 may include identification of the actual quantity of clicks 104*a* and the actual quantity of impressions 104*b* delivered. Such information will be updated by the order fulfillment system 40 (FIG. 11) each time an impression is delivered and/or a click-through achieved, against an open order for the discrete traffic block 20.

As is noted in the discrete traffic block table 98, and depicted in FIG. 3 and FIG. 4, multiple discrete traffic blocks 20 may be sold for an inventory listing 95—with concurrent (e.g. at least partially overlapping) time periods for fulfillment. It is preferable that the multiple discrete traffic blocks 20 sold for any segmented advertisement placement include volumes such that impressions and/or clicks required for fulfillment of all discrete traffic blocks for any particular time period does not exceed the inventory available during that duration of time. For example, it would be disadvantageous to define multiple discrete traffic blocks 20 that, in the aggregate require an inventory of 20,000 impressions on a certain day when the expected quantity of impressions on such certain day is only 15,000.

Other exemplary data which may be associated with any discrete traffic block 20 include: i) minimum bid/start bid price or reserve price, ii) an immediate purchase price (e.g. One CLIQ Buy Price); and iii) seller specified advertisement content (e.g. fail over content) for placement within the advertisement placement in the event that there are no open orders, or other revenue generating advertisement content, available at the time an impression is required for delivery to an end user.

Referring to FIG. 5*d*, the bidding data may be represented as records 182 of a bid table 110. Each record 182 may associate an identification of a bidding buyer 34, identification of the buyer's advertisement content 19, and a raw bid 112 entered by the buyer.

In one aspect, the raw bid 112 may be a buyer compensation value or parameter paid for delivery of the salable events (or for each salable event) included in the discrete traffic block 20. As such, the selection parameter for determining the winning bidder may be the highest raw bid 112 entered. In another aspect, wherein sale of the discrete traffic block 20 is based on a salable event or transactional unit other than delivery of a certain quantity of impressions (for example, when the salable event or transactional unit is the end user clicking through to the buyer's web site (e.g. a click)), an effective bid value 122 may be calculated (for example an expected revenue-per-thousand impressions (eCPM) and recorded as the buyer compensation value or parameter and the selection parameter for determining the winning bidder may be the highest effective bid value 122 of the entered bids.

When volume is based on a transactional unit other than impressions (e.g. based on clicks) the quantity of impressions that will be needed to generate the defined volume of clicks is dependent, at least in part upon the ability of the buyer's advertisement content to entice an end user to click through to the advertiser's web site. As such, the effective bid calculation normalizes all raw bids to revenue that would be expected from delivery of 1,000 impressions.

The effective bid calculation may be based on a yield factor (e.g. a conversion ratio) which may be a measurement of an ability of the buyer's advertisement content and/or advertisement campaign to yield salable events from impressions (e.g. convert impressions to salable events) and may be tracked by the order fulfillment system 40.

As a very basic example of this concept, a first buyer may have advertisement content with a conversion ratio such as 1 click per 1,000 impressions while a second buyer may have more enticing advertisement content with a conversion ratio of 1 click per 2,000 impressions—a conversion factor that is only half that of the first buyer.

If a discrete traffic block comprises a volume of 500 click-throughs, it can be expected that 500,000 impressions will be required to deliver the volume if the discrete traffic block is purchased by the first buyer while 1,000,000 impressions would be required to deliver the volume if the discrete traffic block is purchased by the second buyer.

The seller of the discrete traffic block would rather accept a bid from the first buyer if the second buyer's bid is anything less than double the bid of the first buyer. For example, if the first buyer bids $100.00, the seller would rather accept such bid even if the second buyer bids more than $100.00 but anything less than $200.00. This of course assumes that there is a limited quantity of available impressions that the seller is able to deliver and the seller is not able to accept both bids thereby selling a discrete traffic block to both buyers.

To facilitate such, the selection criteria for the auction may be selection of the bid with the highest effective bid value 122 wherein the first buyer's bid of $100.00 on an eCPM (e.g. effective cost per 1,000 impressions) basis is $0.20 because 500,000 impressions are expected to be required to deliver the 500 clicks. Assuming the second buyer bids $150.00, the second buyer's bid is only $0.15 per 1000 impressions, on an eCPM basis.

It should be appreciated that without use of an effective bid 122 as the basis of the auction, the second buyer would win the auction with a raw bid of $150.00. However, if the auction is based on effective bid, the first buyer's bid of $100.00 would win the auction. The benefit of the calculating an effective bid is that it enables a seller to determine the value of its inventory on a per-impression basis and compare all bids on a per-impression basis. The effective or eCPM value may be calculated using various yield factors for the buyer's advertisement content (e.g. conversion rates) as will be discussed with respect to FIGS. 22a-22d.

Returning briefly to FIG. 5c, each inventory listing 95 may further be associated with filler bid data represented as records 184 of a filler bid table 116. In one aspect, a bidder (which in certain circumstances may be limited to a buyer who bids to purchase a discrete traffic block 20) may also bid to have its advertisement content placed within an advertisement placement of the inventory listing as filler—meaning when excess inventory is available and not needed for fulfillment of discrete traffic blocks. Each filler bid record 184 may include an identification of the buyer 34, identification of the buyer's advertisement content 19, a bid 118 entered by the buyer either on a per impression basis, and an expiration time 120. As will be discussed, the order fulfillment system 40 (FIG. 11), may include systems for order balancing and selecting filler bid content when orders are ahead of pace.

Data Relationships—Buyer Campaigns

Figure 9A:
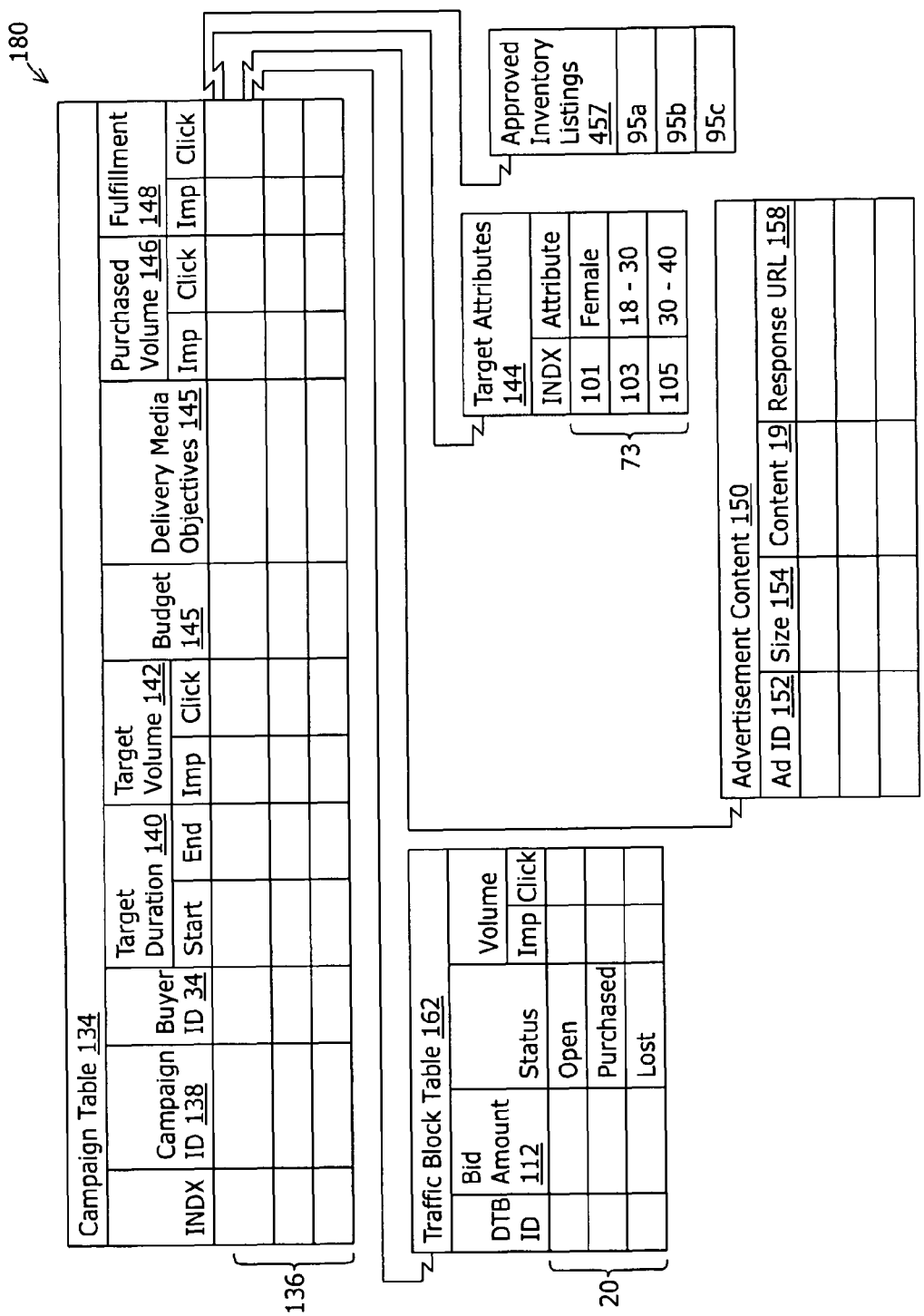
FIG. 9a is a diagram representing exemplary data structure recording data associated with a buyer's advertising campaign in accordance with an embodiment of the present invention.

Turning to FIG. 9a, to facilitate a buyer searching and evaluating discrete traffic listings, the system 10 may maintain data relationships 180 related to a buyer's advertising campaign. A buyer's advertising campaign may be represented, at least in part, by a record 136 of a campaign table 134 and identified by a campaign ID number 138.

The record 136 associates identification of the buyer 34, a buyer defined target duration 140 (including a target start date and a target end date), a target volume of salable events 142 (which may be a target volume of impressions, a target volume of clicks, or a target volume of other salable events or user action, for example user completion of a lead generation form), and a target advertising budget 145.

Throughout the campaign, a sales management tool may populate additional campaign parameter data to the campaign table 134 such as: i) purchased volume data 146—for example data representing the quantity of impressions, clicks, or other salable events purchased as discrete traffic blocks; and ii) fulfillment data 148 representing the actual volume—for example quantity of impressions, clicks or other salable events delivered in fulfillment of the discrete traffic blocks (or as filler advertisements). These values may be updated by the order fulfillment system 40 (FIG. 11) when the buyer purchases a discrete traffic block and updated as volume is delivered—for example by advertisement content being placed as an impression and/or "clicks" are recorded.

Also associated with the campaign ID 138 are its target end user attributes 144. Turning briefly to FIG. 6 in conjunction with FIG. 9a, the target end user attributes 144 comprise identification of a subset of attribute descriptions 80, from the attribute library 70, which the buyer desires in end users to which its advertisement content will be delivered. Such target end user attributes 144 may be utilized for searching for discrete traffic blocks with those same attributes and/or matching of discrete traffic blocks with those same attributes to the advertisement campaign—for purposes of assuring that any purchased discrete traffic block includes segmented inventory which corresponds to the target end user attributes 144.

Also associated with the campaign are the buyer's defined advertisement content in one or more rendering formats. The exemplary ad content table 150 includes records for one or more instances of buyer's creative advertisement content that the buyer may define, create, upload, or otherwise associate with an advertisement campaign. Each record associates ad identification 152 with identification of its size 154 (again, for example, utilizing an Interactive Advertisement Bureau standard size), the creative content 19 (e.g. the image, video, or other creative rendering content that will be rendered with the web page content 13), and a response URL 158 which identifies the URL of the advertiser's web page to which the advertiser desires a user to be directed upon clicking the advertisement impression (i.e. the landing page). The size 154 may also be utilized for searching and/or matching of discrete traffic blocks to the advertisement campaign for purposes of assuring that any purchased discrete traffic block includes an advertisement placement matching the required size 154 of the buyer's creative content 19.

Figure 9B:
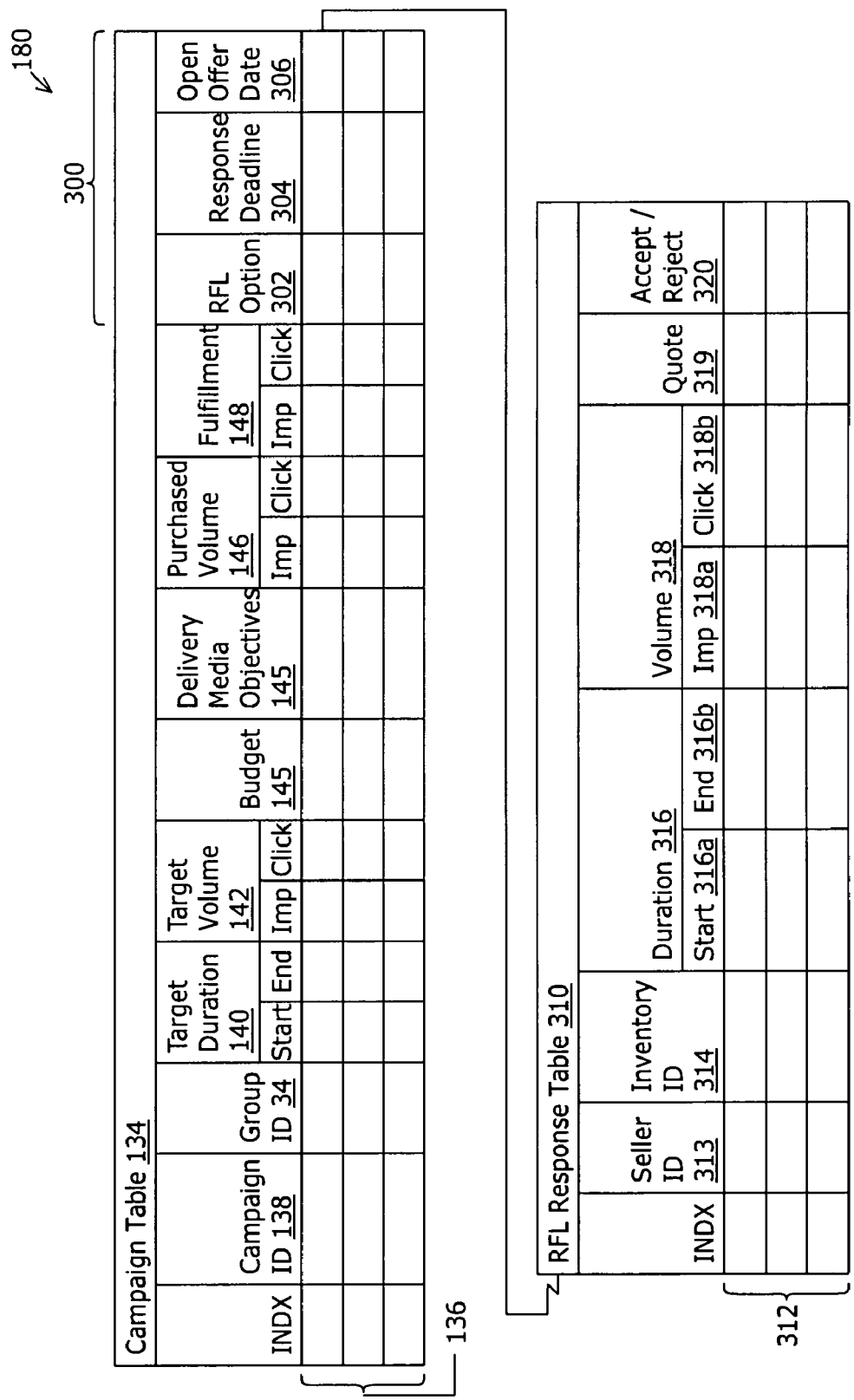
FIG. 9b is a diagram representing exemplary data structure recording data associated with a buyer generating a request for listings and a seller's response thereto in accordance with an embodiment of the present invention.

Referring to FIG. 9b, for purposes of supporting a process of brokering at least a portion of a seller's inventory listings utilizing a request for listing (RFL) and response/proposal system, the data exemplary relationships 180 of a buyer's campaign may further include exemplary RFL fields 300 comprising data useful for soliciting sellers to propose discrete traffic blocks for fulfillment of the buyer's campaign 136 and recording any such proposed discrete traffic blocks.

The exemplary RFL fields 300 may comprise: i) an RFL option field 302 indicating whether the campaign is open for sellers to propose a discrete traffic block in response to the campaign 136; ii) a response due date 304 indicating when seller proposals are due; and iii) an open offer date 306 indicating for how long any seller proposal must remain open for buyer acceptance thereof.

Each discrete traffic block proposed by a seller may be represented by a record 312 within an exemplary RFL response table 310. Each record 312 includes: i) a seller ID field 313 identifying the seller—which may be the same seller global identifier as discussed with respect to field 86 of FIG. 5a; ii) an inventory ID field 314 which identifies the seller's segmented traffic by reference to a record 95 of the inventory table 92 of FIG. 5c; iii) a duration field 316 (comprising a start date 316a and an end date 316b) specifying the duration during which the seller is proposing to fulfill the buyer's request; iv) a volume field 318 specifying the quantity impressions 318a or quantity of clicks 318b which the seller proposes to fulfill the buyer's request; and v) an acceptance/rejection field 320 indicating the buyer's acceptance or rejection of the proposal.

Figure 10:
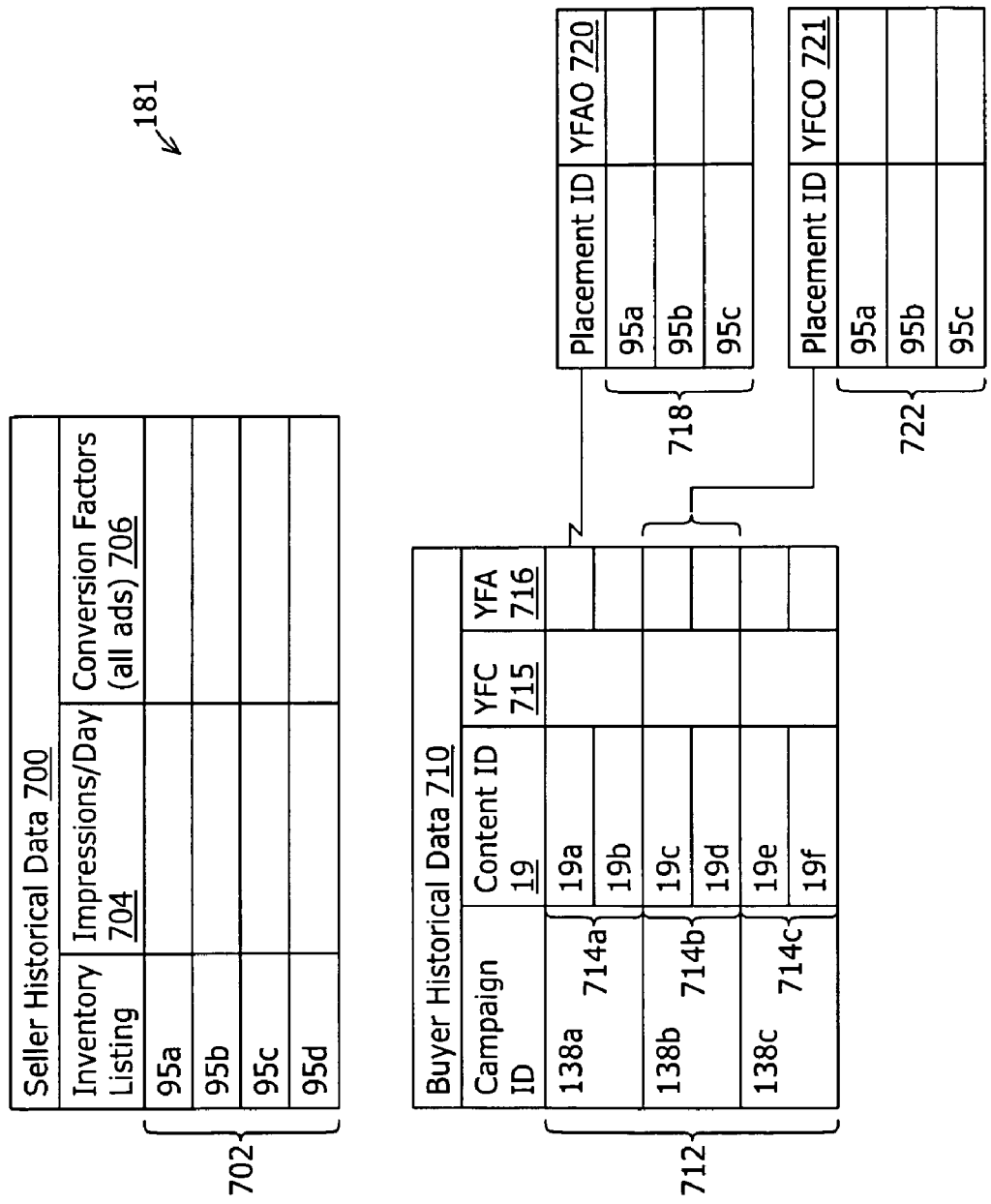
FIG. 10 is a diagram representing exemplary data structure recording historical data in accordance with an exemplary embodiment of the present invention.

FIG. 10 depicts exemplary elements of historical data 181 which may be maintained by the management system 10. The exemplary elements include seller historical data 700 and buyer historical data 710.

The seller historical data 700 may include, for each inventory listing 95, a value representing the historical rate of impressions (such as impressions per day 704) and a conversion factor 706 for the segmented placement representing the ratio of impressions that result in a salable event—such as a click—averaged across all advertisement content delivered within the advertisement placement. The impressions per day 704 and the conversion factor 706 may be fields of a record 702 associated with the inventory listing.

The buyer historical data 710 may include various yield factors for each buyer campaign (identified by a campaign ID 138) and each buyer creative advertisement content 19 (identified by content ID 19). A record 712 may associate a campaign, for example campaign 138a with sub-records 714a identifying ad content 19a and 19b that the buyer utilizes within the campaign 138a. Also associated with the campaign is a yield factor referred to as Yfc 715 which represents the ratio of impressions that yield salable events calculated for all advertisements within the campaign 138a—independent of which seller ad placement the content was rendered within.

Each sub record 714a may associate the ad content 19a, 19b within the campaign 138a with a yield factor referred to as Yfa 716 which represents the ratio of impressions that yield salable events calculated for the particular ad content 19a or 19b—independent of which seller ad placement the content was rendered within.

Each sub record 714a may also associate with records 718 which associate a yield factor referred to as Yfao 720 with the advertisement content and a particular seller ad placement. The yield factor Yfao 720 may represent the ratio of impressions that yield salable events calculated for the particular ad content 19a or 19b within the particular seller ad placement 95.

Similarly, each record 712 may also associate with records 722 which associate a yield factor referred to as Yfco 721 with the advertisement campaign and a particular seller ad placement. The yield factor Yfco 721 may represent the ratio of impressions that yield salable events calculated for the particular campaign (independent of ad content) within the particular seller ad placement 95.

Operation

Turning to FIG. 11, for purposes of brokering the sale of advertisement impressions as discrete traffic blocks of salable inventory (impressions that can be delivered within segment(s) of a page profile groups), the management system 10 may be coupled to the Internet 22 and operate as a web server for interacting with at least one buyer 34 and at least one seller 36.

For purposes of interacting with the management system 10, the buyer 34 may comprise a computer system operating a traditional web browser through which a buyer has accessed the management system 10 through a buyer account (e.g. logged on using defined buyer credentials such as a user name and password).

Similarly, the seller 36 may comprise a computer system operating a traditional web browser through which a seller has accessed the management system 10 through a seller account (e.g. logged on using defined seller credentials such as a user name and password).

The management system 10 may comprise a database 42 adapted to store data representing the data relationships 84, 180, and 181 discussed with respect to FIGS. 5a, 5b, 5c, 5d, 9a, 9b and 10, a sales management module (including seller tools 60, buyer tools 50), an order fulfillment system 40, and reporting tools 41. In general, the seller tools 60 represent work flows for performing various tasks associated with the seller, inclusive of: i) defining page profile groups; ii) segmenting the seller's page profile groups into one or more segments; iii) defining advertisement placements within one or more web pages of a page profile group; iv) associating each advertisement placement with one or more segments to develop a salable inventory of advertisement impressions; and v) defining and listing discrete traffic blocks of such inventory.

Other seller tools 60 represent work flows for performing tasks such as: i) reviewing a buyer's advertisement content for purposes of accepting a purchase of a discrete traffic block; and ii) defining a discrete traffic block in response to a buyer's request for a specified traffic block listing (e.g. an RFL Response, described here).

Yet other seller tools 60 may include workflows for searching and reviewing listings of other sellers for purposes of researching and developing segmentation and pricing strategies.

The buyer tools 50 represent work flows for performing various tasks associated with a buyer defining an advertisement campaign; searching listings of discrete traffic blocks matching campaign criteria, and bidding/purchasing selected discrete traffic blocks. Other buyer tools 50 represents work flows for performing tasks such as defining a request for listing (RFL) to solicit seller proposals/responses that include discrete traffic blocks meeting the defined RFL.

The order fulfillment system 40 implements various pacing systems 43, content determination systems 47, load balancing systems 44, and expected revenue models 45 for directing delivery of advertisement impressions (i.e. placement of buyer defined advertisement content within advertisement placements) to optimize revenue utilizing combinations of delivery of advertisement content in fulfillment of purchased discrete traffic blocks and delivery of filler advertisement content. Filler advertisement content may be any of filler advertisement placements brokered by the system 10 (e.g. bids from the filler bid table 116 as described with respect to FIG. 5c), filler advertisement placements obtained via an advertisement network interface 51 linking to an associated advertisement network 49, and/or filler placements defined by the seller 36 to be placed in the absence of a higher yielding advertisement placement.

The reporting tools 41 generally enable buyers and sellers to access data related to Internet advertising activities.

TBD Tool 62

In an exemplary aspect, a traffic block definition tool 62 is adapted to provide web pages for implementing a workflow to enable the seller to group one or more web pages(s) 13 into a defined page profile group; segment each page profile group into one or more contextual segments; and segment each page profile group (or contextual segments) into one or more traffic attribute segments by end user attributes.

As discussed, a seller may group one or more web pages 13 of its internet traffic 15 into a page profile group and segment each page profile group into one or more segments based on any combination of the context of published content with and/or attributes of end users to which the advertisement impression will be rendered—including geographical attributes, demographic attributes, and behavioral attributes.

Figure 12:
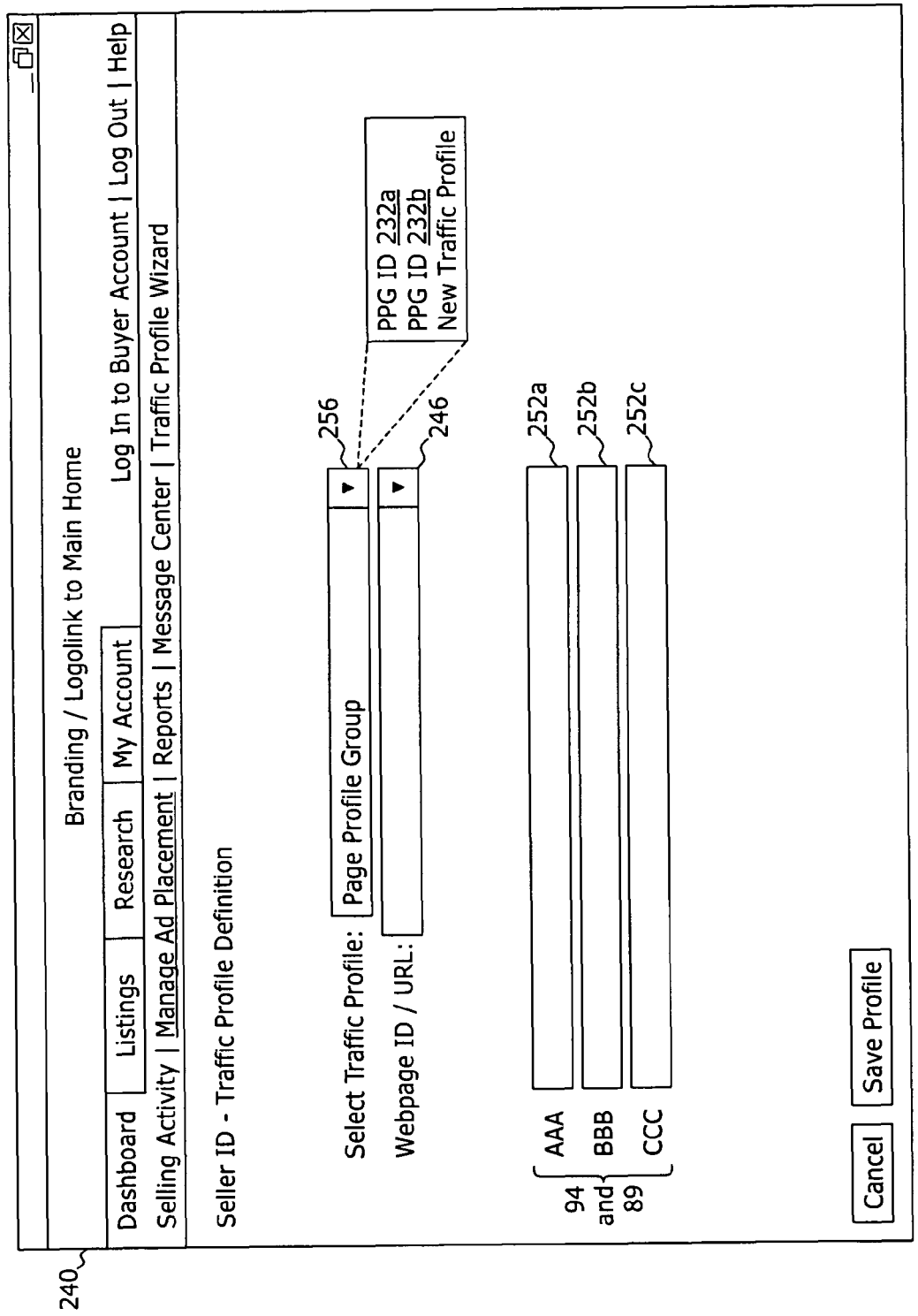
FIG. 12 is a web page diagram representing an exemplary web page useful for obtaining a seller's grouping of web pages within page profile groups in accordance with an embodiment of the present invention.

FIG. 12 represents an exemplary web page 240 that may, amongst other processes, be provided for purposes of obtaining seller grouping of one or more web pages as a page profile group. For purposes of defining a page profile group 232, the web page 240 may include a control 256, which may be a drop down menu, which lists existing page profile groups associated with the seller (for example 232a and 232b as discussed with respect to FIG. 2) as well as a menu choice for defining a new page profile group.

The web page 240 further includes a web page ID control 246, which also may comprise a text box, displaying web pages 13 within the page profile group and for obtaining user identification of web page(s) 13 for inclusion in the page profile group. Such identification and selection may be by way of identifying the URL of the web page or other identification of the seller's traffic 15.

Various controls 252a-252c obtain user input of, election of, or identification of various inventory statistics 94 and/or delivery media data 89 for the page profile group. Identification of inventory statistics and/or delivery media data 89 may be by way of identifying such inventory statistics 94 and/or delivery media data 89 within historical data maintained by the order fulfillment system 40.

The inventory statistics 94 may include values such as: i) expected quantity of renderings of web pages within the page profile group per period of time (e.g. expected "hits" per day); ii) historical quantity of renderings per period of time (e.g. historical hits per day); iii) estimated conversion factor for advertisement placements (e.g. an estimated ratio of quantity of clicks per 1000 impressions); and iv) historical conversion factor for advertisement placements (e.g. historical ratio of quantity of clicks per 1000 impressions).

As discussed, delivery media data 89 may comprise information related to attributes of the web page(s) 13, branding associated with the web page(s) 13, and other information related to the content of the web page(s) 13 which is useful to a potential buyer assessing whether the published content is sufficiently related to the buyer's potential advertisement for placement to be beneficial.

Referring to FIG. 12 in conjunction with FIG. 5a and FIG. 11, upon the web page 240 posting a newly created page profile group, or a revision to a page profile group (inclusive of a page profile group ID and identification of web pages 13 included in the page profile group), back to the system 10, the traffic block definition tool 62 may write such page profile group data to a record 77 (or update a record 77) of the page profile group table 231.

Figure 13:
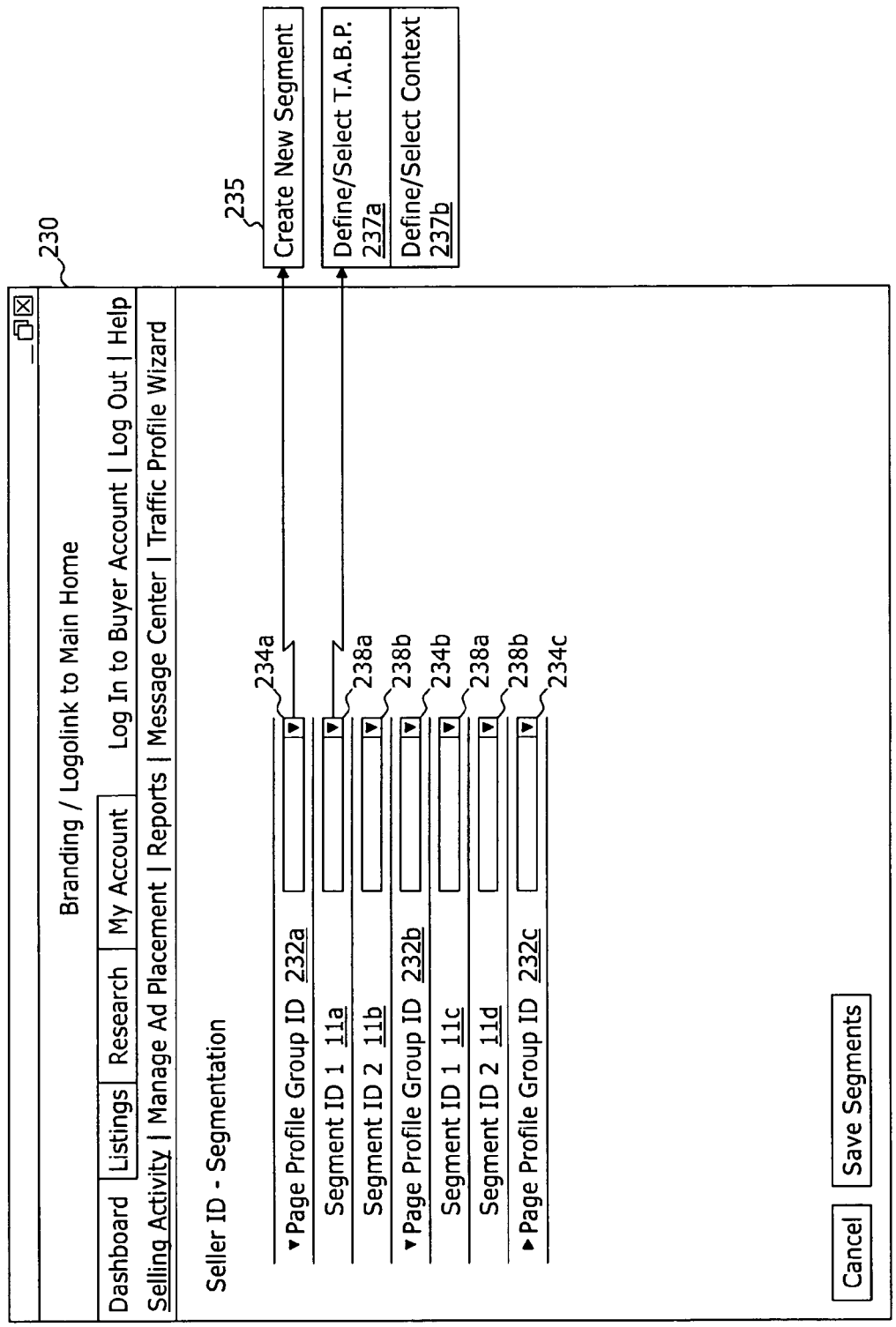
FIG. 13 is a web page diagram representing an exemplary web page useful for obtaining a seller's segmentation of its page profile groups by combinations of context and attributes in accordance with an embodiment of the present invention.

FIG. 13 represents an exemplary web page 230 that may, amongst other processes, be provided for purposes of: i) obtaining seller segmentation of the seller's page profile groups 232 by end user attributes and/or context; and ii) defining distinguishing attributes for each segment.

The web page 230 may list the seller's defined page profile group IDs 232a, 232b, and 232c as recorded in the page profile groups table 231 (FIG. 5a). Associated with the page profile group ID 232a, 232b, and 232c may be a drop down menu control 234a, 234b, and 234c which, as shown for control 234a, includes a selection 235 which enables the seller 36 to create (and name) a new traffic segment 11 for the page profile group 232. Such creation may, if applicable, automatically duplicate the traffic attribute blue print 28 for a particular segment (populate an applicable traffic attribute blue print 28 for the new segment) such that the user may define the new segment by changing only a portion of the traffic attribute blue print 28 being duplicated.

After the seller 36 has created a segment, it may appear as shown below the page profile group ID 232a. Associated with each segment ID 11a, 11b, 11c, 11d may be a drop down menu control 238a, 238b which, as shown for control 238a includes a selection 237a which enables the seller 36 to select and/or define a traffic attribute blue print 28 and/or selection 237b which enables the seller to select and/or define a context pattern 29 (FIG. 5a), in each case, to distinguish such segment from remaining traffic within the page profile group 232. In an exemplary embodiment, upon selection of 237a, a list of defined traffic attribute blue prints 28 (as described with respect to FIG. 7a and FIG. 7b) may be made available for selection. Upon selection of 237b, a list of defined context patterns 29 (as described with respect to FIG. 8) may be made available for selection. Upon user selection, the segmentation is posted back to the traffic block definition tool 62 such that applicable records may be written within tables implementing the data relationships 84 discussed with respect to FIG. 5a.

As a first alternative, if existing traffic attribute blue prints 28 or defined context patterns 29 are not applicable to the seller's desired segmentation, a web document object may be provided for purposes of obtaining user definition of a new traffic attribute blue print 28 and/or a new context pattern 29.

As a second alternative, the traffic block definition tool 62 may be adapted to offer a suggested segmentation strategy intended to optimize yield on the sale of segmented advertisement placements within the page profile group based on historical traffic patterns of both the page profile group and other similar web sites with similar traffic profiles.

Advertisement Placement Tool 63

Returning to FIG. 11 in conjunction with FIG. 1, the advertisement placement tool 63 may be adapted to provide web pages for implementing a work flow to enable a seller 36 to define advertisement placements within one or more web pages of a page profile group—such as advertisement placements 12, 14, 16a and 16b within web page 13a of page profile group 232a.

Figure 14:
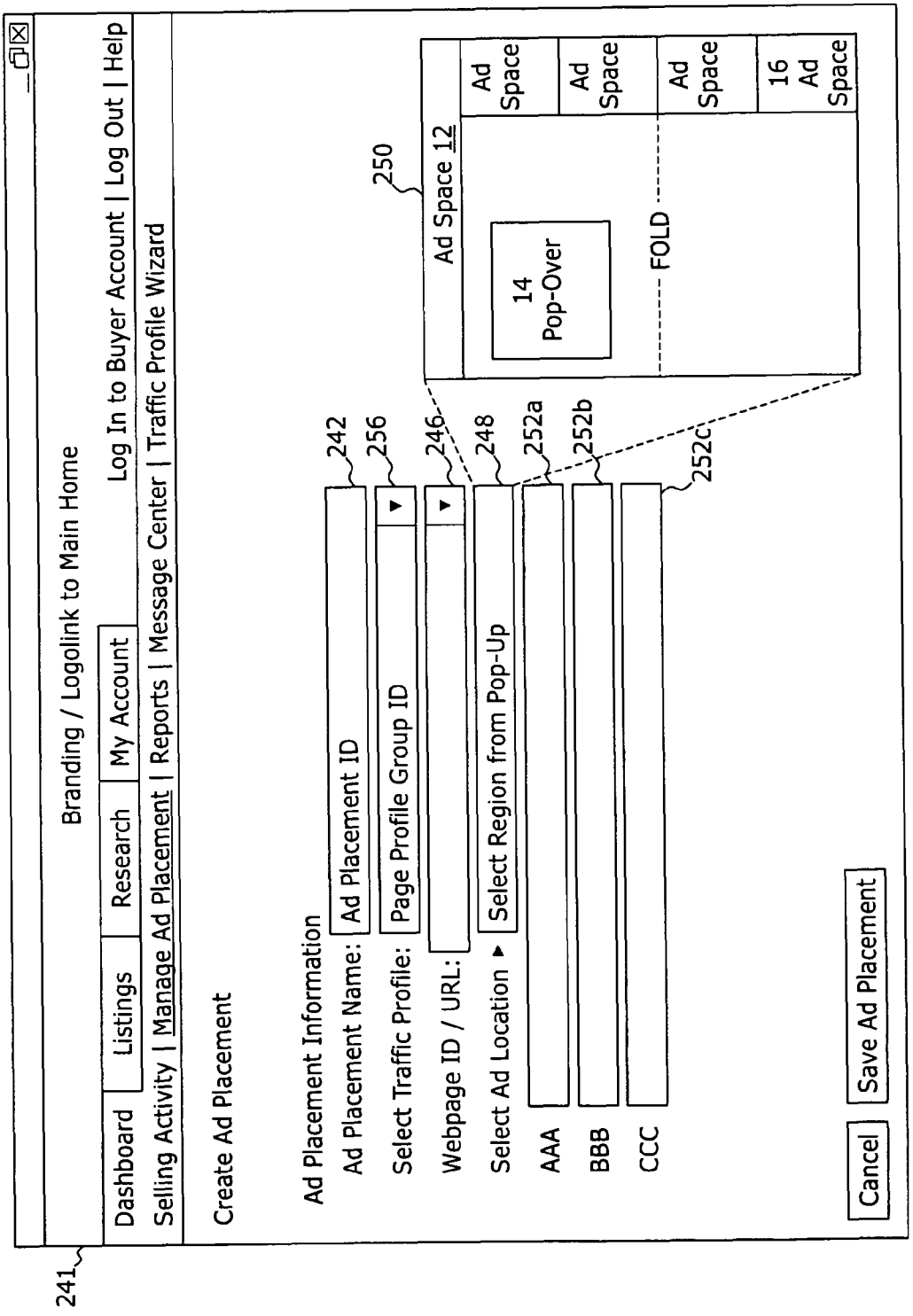
FIG. 14 is a web page diagram representing an exemplary web page useful for obtaining a seller's definition of an advertisement placement in accordance with an exemplary embodiment of the present invention.

FIG. 14 represents an exemplary web page 241 that may, amongst other things, be provided for purposes of obtaining seller definition of an advertisement placement within one or more web pages. Referring to FIG. 14 in conjunction with FIG. 5b, the web page 241 may comprise an advertisement placement control 242, which may be a drop down menu listing the seller's existing advertisement placements, by advertisement placement ID 93 and include a control or adding an additional advertisement placement—including its name or other identification. Upon selection of an existing advertisement placement, the remaining fields of the web page 241 may automatically populate with pre-existing data stored as represented in FIG. 5b to permit modification thereof.

A page profile group control 256, which may be a drop down menu, lists the page profile groups 232a-232f associated with the seller (FIG. 5a) and obtains user input or election of a page profile group 232 to be associated with the advertisement placement.

A web page ID control 246, which also may comprise a drop down menu: i) lists the one or more web pages 13, by URL, associated with the page profile group; and ii) for a new advertisement placement, obtains user identification (e.g URL) of the web page(s) 13 in which the advertisement placement will exist.

A region control 248, which may provide a pop up map 250 of the web page content, obtains user input or election of the specific location of the advertisement placement 12, 14, 16 within the web page 13.

Various controls 252a-252c obtain user input or election of various inventory statistics 94 for the advertisement placement 93. As discussed, the inventory statistics 94 may include may include values such as: i) expected quantity of impressions per period of time (e.g. expected impressions per day); ii) historical quantity of impressions per period of time (e.g. historical impressions per day); iii) estimated conversion factor (e.g. an estimated ratio of quantity of clicks per 1000 impressions); and iv) historical conversion factor (e.g. historical ratio of quantity of clicks per 1000 impressions).

Following the user defining the advertisement placement, the advertisement placement information is posted back to the advertisement placement tool 63 such that applicable records may be written within the advertisement placement tables discussed with respect to FIG. 5b.

Referring to FIG. 11 in conjunction with FIG. 5c, the create listing tool 64 comprises work flows which enable a seller 36 to: i) create inventory listings 95 for each advertisement placement in one or more of the segments 11a-11c of the page profile group ID 232; ii) define discrete traffic blocks 20 for its any inventory listing 95; and iii) make such discrete traffic blocks 20 available for buyers to purchase.

Figure 15:
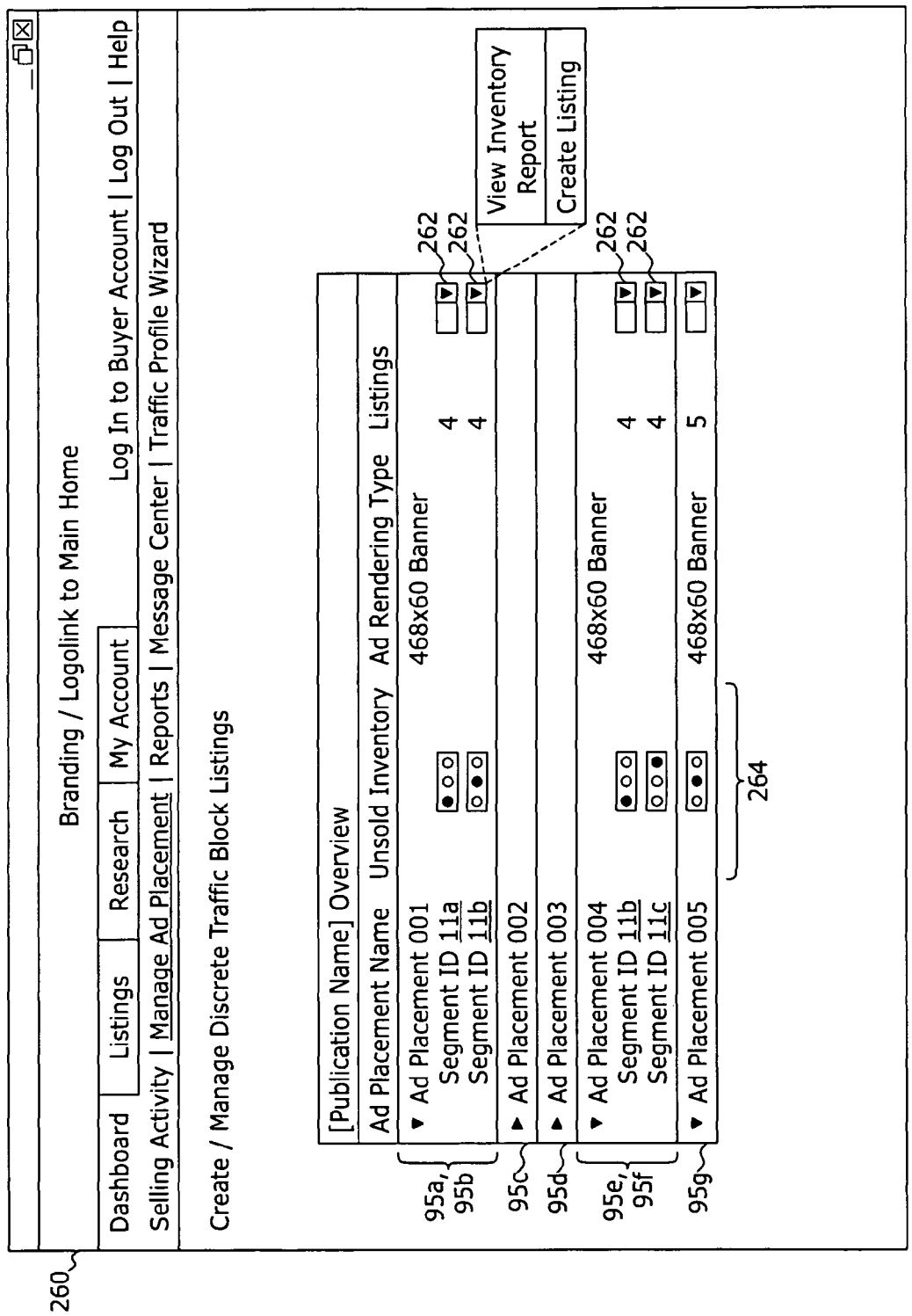
FIG. 15 is a web page diagram representing exemplary work flow for managing segmented advertisement placement inventory in accordance with an exemplary embodiment of the present invention.

Referring to FIG. 15 in conjunction with FIG. 5c, a first exemplary web page 260 may, amongst other processes, be provided for purposes of obtaining a seller's management of inventory listings 95 and discrete traffic blocks 20.

For example, region 12 (the banner advertisement placement (placement ID 004) on the web pages 13b, 13c, and 13d) because of its value may be inventoried and sold separately for each traffic segment 11c and 11d. The other regions, for example placement region 16a, 16b below the fold line 18 (placement ID 003) being of lower value, typically generating fewer clicks due to its location, may be inventoried and sold collectively with all traffic segments 11a and 11b.

The exemplary web page 260 may display, for each advertisement placement 95, the segments 11 associated therewith. If a particular advertisement placement, for example advertisement placement 005, is associated with all segments of the page profile group (or the only segment of an un-segmented page profile group), it may be represented as a single inventory listing 95g and be referred to as un-segmented.

An unsold inventory alert icon 264 may associate each segment of each inventory listing 95. The unsold inventory alert icon 264 may appear as a traffic light of a red, yellow, or green color, and may alert the user to whether unsold inventory exists. In more detail, if available traffic volume (meaning volume that is both unsold and not committed for sale by way of being listed as a discrete traffic block or committed to a sale by way of other sales efforts such as being included in a response to a request for a listing) in the aggregate, are below a predetermined threshold of the expected volume for the inventory listing 95 (meaning not much of such inventory exists), the icon 264 may appear "green light" indicating that the projected available inventory has been listed for sale, otherwise committed and/or sold. Similarly, if excess expected volume of the inventory listing 95 has not been defined and listed as discrete traffic blocks, or otherwise sold or committed, the icon 246 may appear "red light" indicating that available inventory exists.

A drop down menu control 262 may link to separate web pages useful for managing existing discrete traffic blocks 20 for the inventory listing 95 and/or defining and listing new discrete traffic blocks 20.

FIG. 16a represents an inventory report 376 web page for displaying inventory associated with an inventory listing 95. In an exemplary embodiment, the inventory report 376 may, for each of a plurality of days 378, associate, for the inventory listing, data related to delivery of volume against orders 380, data related to volume ordered but not yet delivered 382, total committed inventory 384, listed inventory 386, and the total portion of projected inventory that is not yet sold 388. Such an inventory report 376 may be useful in assisting a seller in determining to list additional inventory as well as monitor progress of delivery of volume against orders.

Figure 16B:
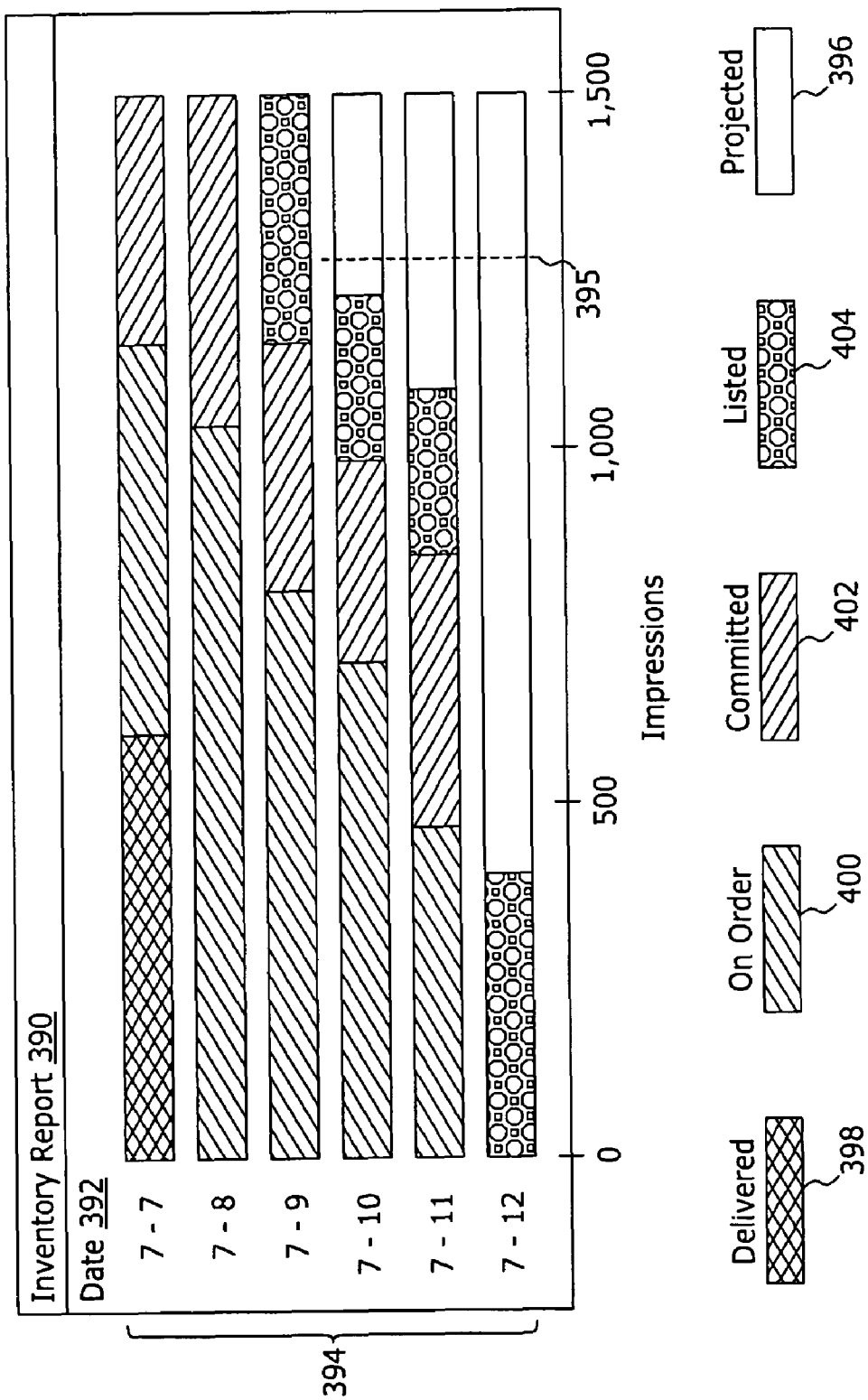
FIG. 16b is a web page diagram representing a second embodiment of an inventory report in accordance with an exemplary embodiment of the present invention.

FIG. 16b represents an alternative inventory report 390 web page for displaying inventory associated with an inventory listing 95. This alternative inventory report 390 is in the form of a bar chart. For each day 392, a single bar 394 graphically depicts total projected inventory 396, volume delivered against orders 398, volume ordered, but not delivered 400, additional committed volume 402, and listed volume 404.

Although both of the inventory report of FIG. 16a and the alternative inventory report of FIG. 16b represent reporting of inventory on the basis of days, comparable embodiments may include similar reports wherein the data is reported on the bases of weeks, months, or other useful time periods.

FIG. 17 represents a web page that may, amongst other things, be provided for purposes of obtaining seller definition and listing of discrete traffic blocks 20. Turning to FIG. 17 in conjunction with FIG. 5c, the exemplary web page 280 may display detailed information about the discrete traffic blocks 20 defined for the inventory listing 95. The web page 280 may further include a Create New Listing control 282 which may provide work flows (e.g. a wizard) for obtaining such information for new discrete traffic blocks to list for sale—including but not limited to: i) a duration 96; ii) a volume 101, and iii) an auction end time 103b.

Auto Listings

Figure 18:
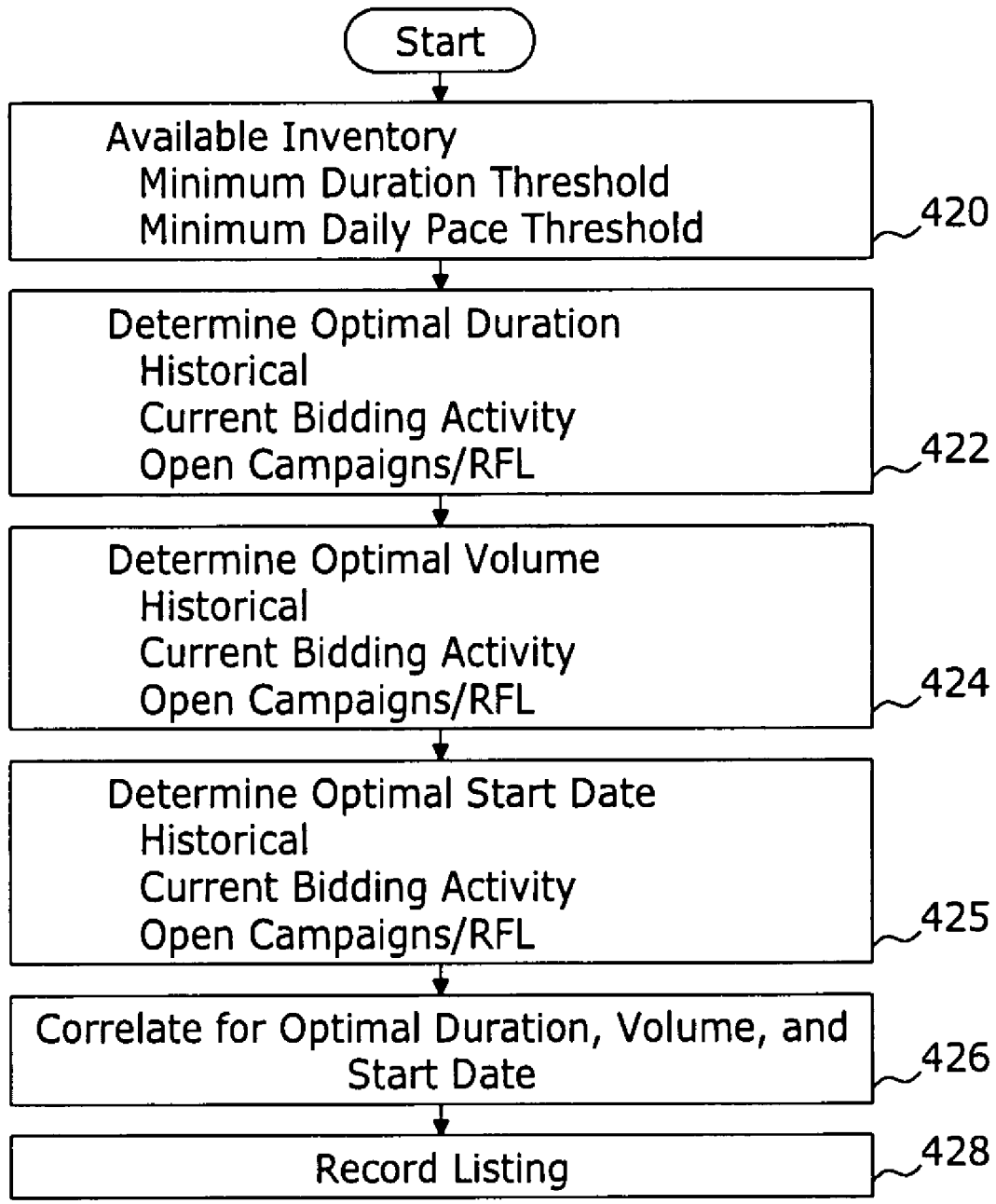
FIG. 18 is a flow chart representing exemplary steps for determining optimal traffic block duration and volume in accordance with an embodiment of the present invention.

Referring to FIG. 11 in conjunction with FIG. 18, in an alternative aspect, the create listing tool 64 may be adapted to generate listings of discrete traffic blocks on an automated basis and in accordance with parameters established by the seller, historical performance, current bidding activity on open auctions, and open advertising campaigns and/or RFLs.

The flow chart of FIG. 18 depicts an exemplary implementation for generating discrete traffic blocks on such an automated basis.

As discussed with respect to FIG. 5c, at least the following parameters are required for defining a discrete traffic block 20: i) a duration 96; and ii) a volume 101. Other useful parameters include at least a start time 96a for fulfillment (i.e. start time for the duration 96) and an auction end time 103b. As such, the create listing tool 64 may be adapted to generate these parameters to define a traffic block 20 in accordance with systems for maximizing expected yield on the sale of the traffic block 20.

Turning to FIG. 18 in conjunction with FIG. 16b and FIG. 5c, step 420 represents the create listing tool 64 determining whether available inventory for a particular inventory listing 95 is sufficient to generate a discrete traffic block. In an exemplary embodiment, such a determination may be made by evaluating projected inventory 396 (available inventory that has not already been delivered 398, ordered 400, committed 402, or already listed 404, FIG. 16b). If projected inventory, for each of a minimum quantity of sequential days (a preconfigured minimum duration for a discrete traffic block), is greater than a predetermined threshold (a preconfigured minimum daily pacing threshold, for example threshold 395) there exists sufficient available inventory to create a new discrete traffic block.

Step 422 represents the create listing tool 64 determining an optional listing duration 96, step 424 represents the create listing tool 64 determining an optional listing volume, and step 425 represents the create listing tool 64 determining an optimal fulfillment start date 96a (i.e. start of the duration 96). It is envisioned that potential buyers have certain predetermined volume requirements, duration requirements, and preferred days within a calendar cycle (weekly, monthly, annually) for starting fulfillment based on expected pacing, commitment duration policies, calendar cycles, and other factors that may effect a buyer's decision to prefer a traffic block of a certain duration, volume, and/or start date.

Figure 19A:
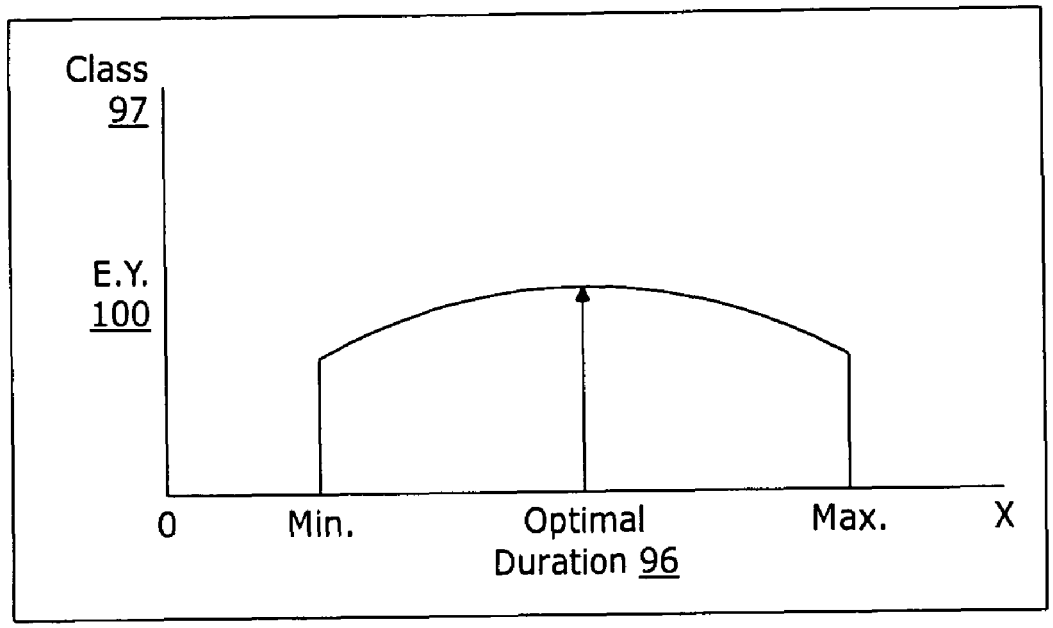
FIG. 19a is a diagram representing determination of optimal traffic block duration in accordance with an embodiment of the present invention.

In one aspect, optimal duration, volume, and start date may be determined based on automated evaluation of historical data. For example, the traffic block definition tool 64 may be adapted to generate reports from the historical data, extract data for discrete traffic blocks of either the same page profile group and segment (or discrete traffic blocks of a similar class 97 (e.g. similar web site content and/or similar traffic profiles)) and by comparing, as depicted by the graph in FIG. 19a, effective yield 100 (the closing sales price divided by the number of impressions required to fulfill the order) to duration 96, an optimal duration based on historical sales (historical optimal duration) may be the historical duration that is associated with maximum effective yield.

More specifically, referring to FIG. 9a, utilizing the duration of previously sold discrete traffic blocks as the independent variable (x axis) and the effective yield of such traffic blocks (sales price divided by the quantity of impressions required for fulfillment) as the dependent variable (y axis), a maxima of the dependent variable may define the optimal duration 96 (i.e. the duration that has historically yielded the highest effective yield). Previously sold traffic blocks used for the optimal duration determination may be limited to those delivering advertisement impressions within similar advertisement placements, classifications of web page content that are the same or similar, and/or same or similar end user attributes to further improve accuracy.

Figure 19B:
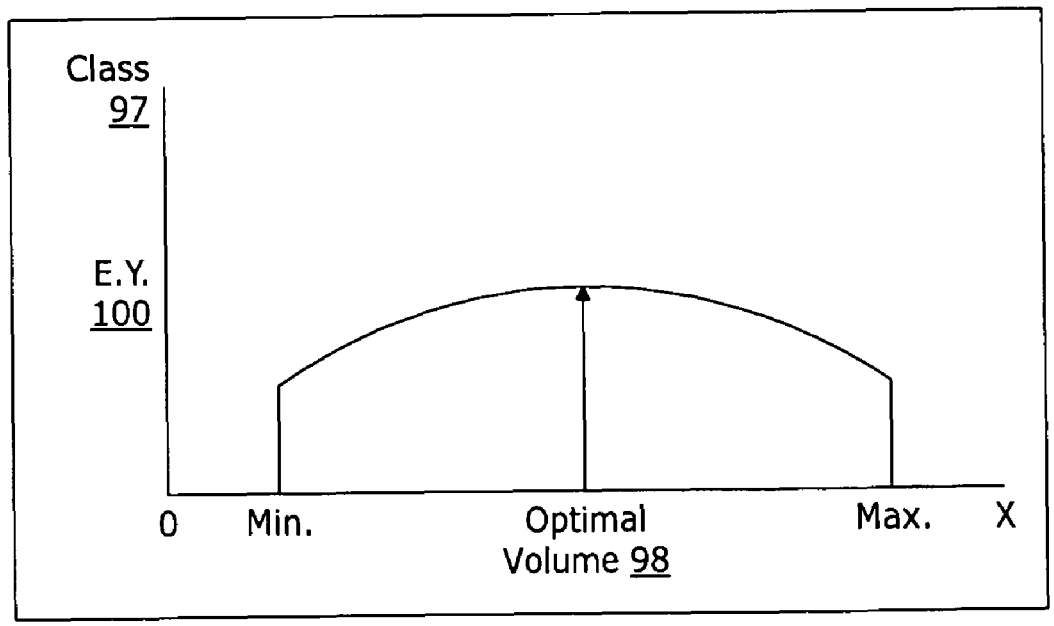
FIG. 19b is a diagram representing determination of optimal traffic block volume in accordance with an embodiment of the present invention.

Similarly, referring to FIG. 19b, the traffic block definition tool 64 may be adapted to compare effective yield 100 (the closing sales price divided by the number of impressions required to fulfill the order) to volume 101. An optimal volume based on historical sales (historical optimal volume) may be the historical volume that is associated with maximum effective yield.

More specifically, referring to FIG. 9b, utilizing the volume of previously sold discrete traffic blocks as the independent variable (x axis) and the effective yield of such traffic blocks (sales price divided by the quantity of impressions required for fulfillment) as the dependent variable (y axis), a maxima of the dependent variable may define the optimal volume 101 (i.e. the volume of salable events that has historically yielded the highest effective yield). Again, previously sold traffic blocks used for the optimal duration determination may be limited to those delivering advertisement impressions within similar advertisement placements, classifications of web page content that are the same or similar, and/or same or similar end user attributes to further improve accuracy.

Figure 19C:
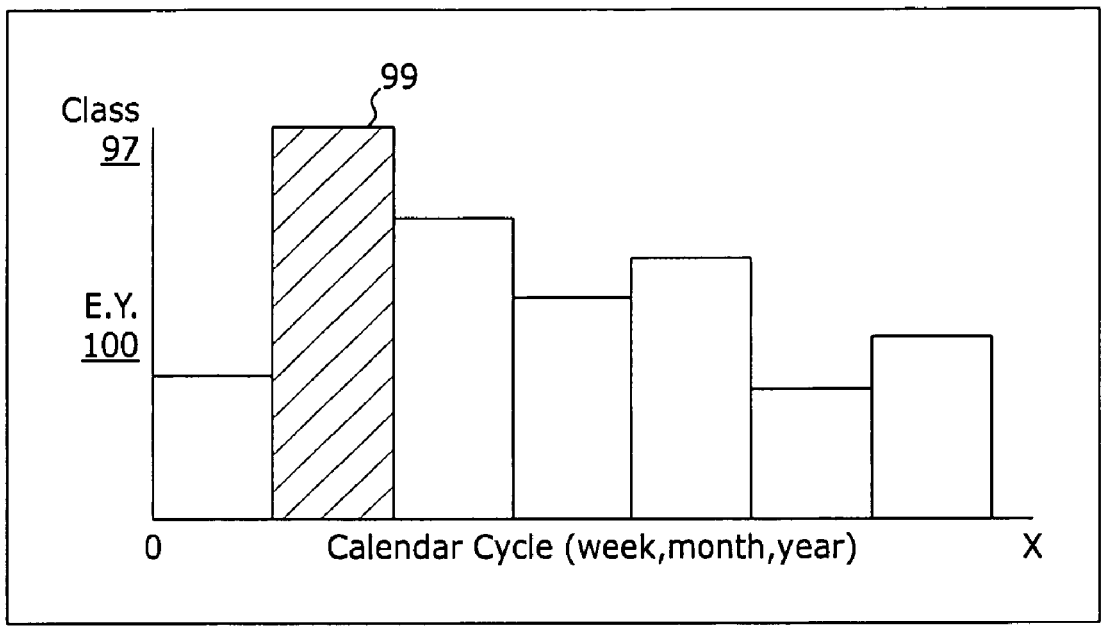
FIG. 19c is a diagram representing determination of optimal traffic block start date in accordance with an embodiment of the present invention.

Similarly, referring to FIG. 19c, the traffic block definition tool 64 may be adapted to compare effective yield 100 (the closing sales price divided by the number of impressions required to fulfill the order) to certain start dates within a calendar cycle (which may be any of a weekly, monthly, or annual calendar cycle). An optimal start date may be the same day within the calendar cycle that is historically associated with maximum effective yield.

More specifically, referring to FIG. 19c, utilizing the calendar cycle phase for the start date of previously sold discrete traffic blocks (for example day of week for a weekly calendar cycle, day of month for a monthly calendar cycle, or specific days, such as the day after Thanksgiving for an annual calendar cycle) as the independent variable (x axis) and the effective yield of such traffic blocks (sales price divided by the quantity of impressions required for fulfillment) as the dependent variable (y axis), a maxima of the dependent variable may define the optimal start date 99 (i.e. position) within the calendar cycle. Again, previously sold traffic blocks used for the optimal start date determination may be limited to those delivering advertisement impressions within similar advertisement placements, classifications of web page content that are the same or similar, and/or same or similar end user attributes to further improve accuracy.

In a second aspect, optimal duration, volume, and start date may be determined based on current bidding activity utilizing real time information regarding each open auction for a discrete traffic block 20. As discussed with respect to FIG. 5d, an effective bid value 122, calculated utilizing existing bids divided by the expected quantity of impressions required to fulfill the order may be used as the dependent variable (y axis) to determine an optimal duration 96, volume 101, and start date 99 as discussed with respect to FIGS. 19a, 19b, and 19c.

In a third aspect, optimal duration, volume, and start date may be determined based on open existing buyer advertisement campaigns and RFLs for which the inventory listing 95 includes a traffic attribute blueprint 28 compliant with: i) the campaign's target traffic attributes 144 (FIG. 9a) or ii) the RFL's delivery media objectives 146 (FIG. 9b). In each case, the optimal duration, optimal volume, and optimal start date may be set to the target duration, target volume, and/or target start date specified in the open campaign or open RFL.

After determining an optimal duration, volume, and start date by use of historical data, current bidding activity, open buyer campaigns and/or RFLs, such values may be correlated to yield an optimal duration and an optimal volume as represented by step 426.

A first example of correlating such values may be by way of combining such values by way of, for example, an averaging calculation. For example, the optimal duration 96 may be the average of the optimal duration determined by each of the historical method, the current bidding activity method, and the open campaign method.

A second example of correlating such values may be by way to selecting the value determined to be most accurate—such as by selecting the value determined by open campaigns and RFLs, or if such a value is not available, the value determined by current bids on open orders.

Returning to FIG. 18, step 428 then represents creating and recording the listing 20 such that is available for buyers to purchase—which may mean writing a record to the discrete traffic block table 98 as depicted in FIG. 5c.

Bid Acceptance Tool 66

Returning again to FIG. 11 in conjunction with FIG. 1, the bid acceptance tool 66 provides work flows that enable a seller 34 to accept or reject a bid for a discrete traffic block 20. It is envisioned that a seller 34 may object to placement of certain buyer defined advertisement content 19 within its web page 13. As such, the work flows, within a predetermined time period (e.g. for example, a time period following the auction end time 103b of FIG. 5c), make the buyer defined advertisement content 19 available to the seller 34 to enter an approval or an objection.

Buyer Tools

Referring again to FIG. 11, to facilitate a buyer purchasing a discrete traffic block, buyer tools 50, inclusive of the configure campaign tool 52, listing search tool 54, and bid tool 56, enable a buyer to configure elements of an advertising campaign, search for listings of discrete traffic blocks 20 (FIG. 5c), and purchase of such discrete traffic blocks 20—which may be by way of an auction or by an immediate purchase (e.g. buy-it-now or One CLIQ Buy), or other means. Further, as will be discussed in more detail herein, buyer tools 50 further includes a request for listing module 58 enabling a buyer to request proposals for discrete traffic blocks 20 fulfilling the buyer's needs.

Configure Campaign Tool

The configure campaign tool 52 may be adapted to provide web pages to obtain campaign parameters useful for populating the data relationships 180 of the buyer's advertising campaign as discussed with respect to FIG. 9a.

Listing Search Tool

In general, the listing search tool 54 provides for matching of buyer needs as set forth in the goals of a campaign against available seller listings, with relevance based on attributes, price, run time, transactional units, and other relevant factors.

Figure 20:
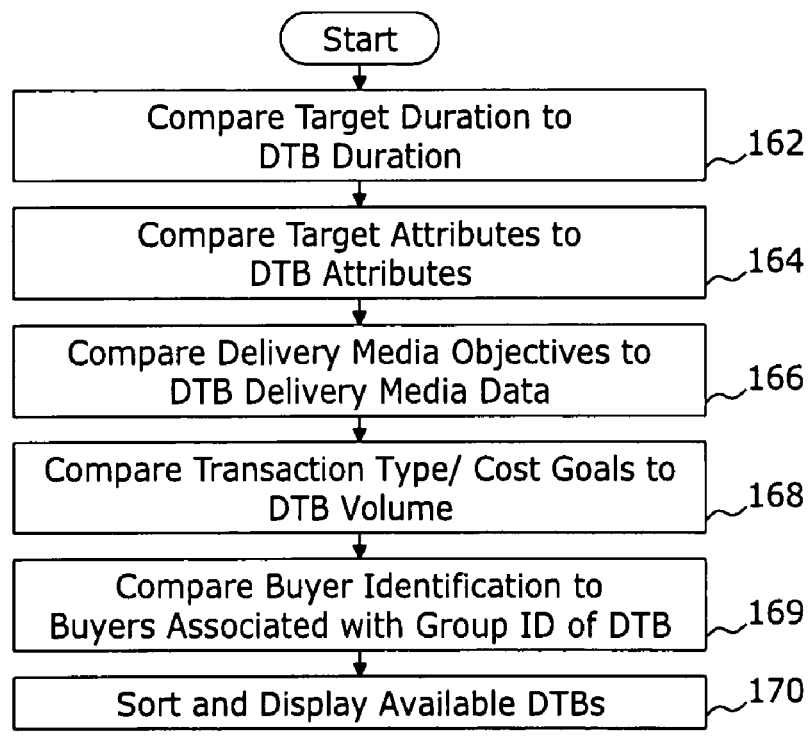
FIG. 20 is a flow chart representing exemplary steps for associating discrete traffic blocks with objectives of a buyer's campaign in accordance with an embodiment of the present invention.

In more detail, referring to FIG. 20 in conjunction with FIG. 5d and FIG. 9a, the listing search tool 54 provides work flows for: i) matching discrete traffic blocks 20 with the objectives of an advertisement campaign 136; and ii) displaying such discrete traffic blocks.

Matching discrete traffic blocks 20 with the objectives of an advertisement campaign 136 may comprise steps of: i) comparing the target duration of the advertisement campaign 136 with the duration 96 (or at least the start date 96a) of the discrete traffic block 20 as represented by step 162; ii) comparing the target attributes of the advertisement campaign 136 with the segment blue print 86 of the discrete traffic block 20 as represented by step 164; iii) comparing the delivery media objects of the advertisement campaign 136 with the delivery media data 89 of the web page of the discrete traffic block 20; iv) comparing the transactional unit type and cost goals of the campaign with the volume and costing statistics of the discrete traffic block 20 as represented by step 168; and comparing identification of the buyer with buyers associated with a group ID of the discrete traffic block (if a private auction) as represented by step 169. The degree of match of each such comparison can be calculated and an overall degree of mach calculated using, for example, a weighted average.

More specifically, with respect to step 162, a subset of the discrete traffic blocks available (i.e. a subset of discrete traffic blocks 20 with a status 102 of Open (FIG. 5d) may be selected as matching the objectives of the advertisement campaign 136—with such subset including those discrete traffic blocks 20 that include a duration 96 that is within a predetermined variance of the target duration. The predetermined variance may be a specific number of days or a percentage of the target duration.

More specifically, with respect to step 164, a subset of the discrete traffic blocks available (i.e. a subset of discrete traffic blocks 20 with a status 102 of Open (FIG. 5d) may be selected as matching the target attributes of the advertisement campaign 136—with such subset including those discrete traffic blocks 20 that are for an inventory listing 95 associated with a segment group 11 that includes a traffic attribute blueprint 28 that matches or is within a predetermined variance of the target attributes 144. More specifically, turning briefly to FIG. 9a, the data relationships may include a plurality of buyer defined target attribute sets 144. Each target attribute set 144 associated with a campaign includes a target attribute subset 73 of attributes 80 from the attribute library 70 which the buyer desires of end users. Comparing target attributes 144 to a segment group 11 to select matching discrete traffic blocks comprises a comparison of the target attribute subset 73 to the traffic attribute blueprint 28 for the segment.

After making such comparisons, the discrete traffic blocks with a status 102 of unsold and for which the auction has not yet expired (e.g. end time 103 has not yet occurred) may be sorted and displayed by how closely each of the above aspects of the traffic block matches the buyer's requirements (e.g. overall degree of match) as determined by steps 162 through 169 and displayed at step 170.

Figure 21:
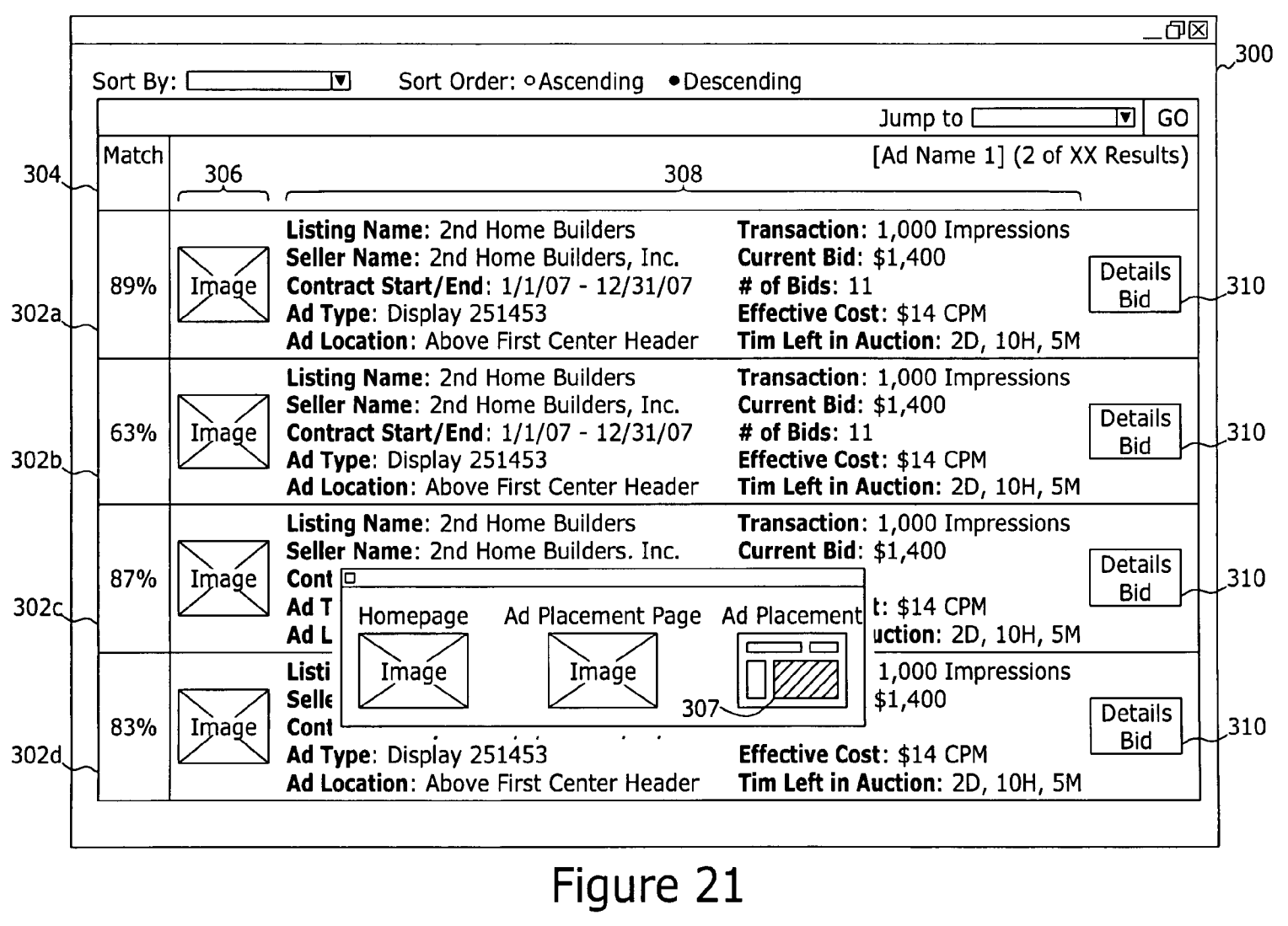

Turning briefly to FIG. 21, the display may comprise a listing display web page 300 which includes a listing 302a-302d for each of a plurality of discrete traffic blocks best matching the search criteria. The web page 300 further comprises various controls for enabling further sorting and searching of listings by the buyer.

Each listing display 302 includes: i) an indicator 304 identifying how closely the discrete traffic block matches the buyer's advertisement campaign (e.g. how closely the various parameters match as determined by steps 162 through 169 of FIG. 20); ii) a thumb nail image 306 of the seller's website content 13 inclusive of identification 307 (for example by highlighting or hashing) of the advertisement placement therein; and iii) various other information about the discrete traffic block.

Each listing display 302 further includes a bid control 310 which, if selected by the buyer, initiates operation of a bid tool to enable the buyer to bid to purchase the discrete traffic block 20 represented by the listing display 302.

Returning to FIG. 11 in conjunction with FIG. 5d, in general the bid tool 56 provides for recording a buyer's bid 112 for a discrete traffic block, recording a buyer's bid 118 for placement of filler advertisement content (e.g. continuous auction), and providing expected cost/price economic statistics based on expected results the advertisement content and/or the expected results provided by the seller's web page.

Further, as discussed with respect to FIG. 5d, the bid tool 56 may further calculate the effective bid value 122 for any auction wherein the transaction unit is other than impressions and determination of the wining bidder may be based on effective bid value. Calculation of the effective bid value 122, or eCPM value may be performed using various yield factors (e.g. conversion rates) including, but not limited to:

First, a yield factor of the advertisement content within a specific advertisement placement (e.g. inventory listings 95) which may be referred to as Yfao and calculated in accordance with the formula of FIG. 22a. In the event that Yfao is known for a particular bid on a particular discrete traffic block, it may provide the most accurate calculation of eCPM.

Second, a yield factor for the advertisement content (across all advertisements placements (e.g. inventory listings 95) within which the advertisement content has been placed) which may be referred to as Yfa and calculated in accordance with the formula of FIG. 22b. In the event that Yfao is unknown, Yfa may provide a fairly accurate estimate of eCPM assuming that the advertisement content performs equally well in various traffic segments.

Third, a yield factor based on all advertisement content within a buyer's advertisement campaign (within a specific advertisement placement (e.g. inventory listings 95)) which may be referred to as Yfco and calculated in accordance with the formula of FIG. 22c. In the event that Yfao is unknown and/or the advertisement content is too new to accurately calculate Yfa, Yfco may provide an estimate of eCPM based on past performance of other advertisement content within the buyer's campaign.

Fourth, a yield factor based on all advertisement content within a buyer's advertisement campaign (across all advertisements placements (e.g. inventory listings 95) within which the advertisements content has been placed) which may be referred to as Yfc and calculated in accordance with the formula of FIG. 22d. In the event that Yfao, Yfa, and Yfco are unknown, Yfc may provide an estimate of eCPM based on past performance of other advertisement content in other traffic segments.

It should be appreciated that values needed for calculating the various yield factors may include the inventory statistics 94 as discussed with respect to FIG. 5c and statistics traced by the order fulfillment system 40 as depicted in FIG. 10.

Returning to FIG. 11 in conjunction with FIG. 5d, the bid tool 56 may be further adapted to obtain and record a buyer's filler bid 118 in the event a buyer desires to bid for placement of its advertisement content 19 within an advertisement placement as a filler bid option on a continuous auction basis. In one aspect, only buyers who bid for a discrete traffic block within an inventory listing 95 (FIG. 5c) are permitted to bid for placement as filler advertisement content 26.

Returning briefly to FIG. 9a, the bid tool 56 may be further adapted to record bid information in the traffic block table 162 for those discrete traffic blocks 20 purchased in fulfillment of a campaign 136—to facilitate tracking and reporting on the campaign's performance and fulfillment against its target volumes and budget.

In other aspects, the bid tool 56 provides typical auction controls which create limitations on a buyer's ability to bid on a discrete traffic block listing and a seller's ability to cancel a discrete traffic block listing based on submitted bids, including (i) by not allowing bids less than a minimum bid, if any, set by the seller during the traffic listing creation process; (ii) by not allowing bids less than a minimum incremental bid, if any, set by the seller during the traffic listing creation process; (iii) by halting further bidding and deeming a bid to be a winning bid if an immediate purchase price (e.g. One CLIQ Buy price) is bid by a buyer; (iv) by preventing a seller from terminating a listing for a discrete traffic block if at least one bid has been placed by a buyer, provided such bid meets the minimum bid requirement, if any, (v) by preventing a bid from a buyer when the buyer does not have a sufficient account balance to be reserved for such bid in the event such bid becomes the winning bid, (vi) by allowing a seller to set the time and date an auction for a listing for a discrete traffic block will begin and end, during the listing creation process, thereby limiting the time during which a buyer may submit a bid for such discrete traffic block; (vii) by preventing a buyer from submitting a bid less than a winning bid, and (viii) by preventing a buyer from withdrawing a winning bid.

Auto Bidding

In another aspect, the bid tool 56 may include work flows that enable a buyer to set up parameters for automatically locating and bidding on listings in fulfillment of the buyers advertising campaign. A buyer may create high level metrics for certain associations between a prospective discrete traffic block and the campaign objectives. When the bid tool 56 recognizes that a discrete traffic block matches the high level metrics and is favorably priced, a bid may be automatically entered by writing of a bid record 182 to the bid table 110.

Figure 23:
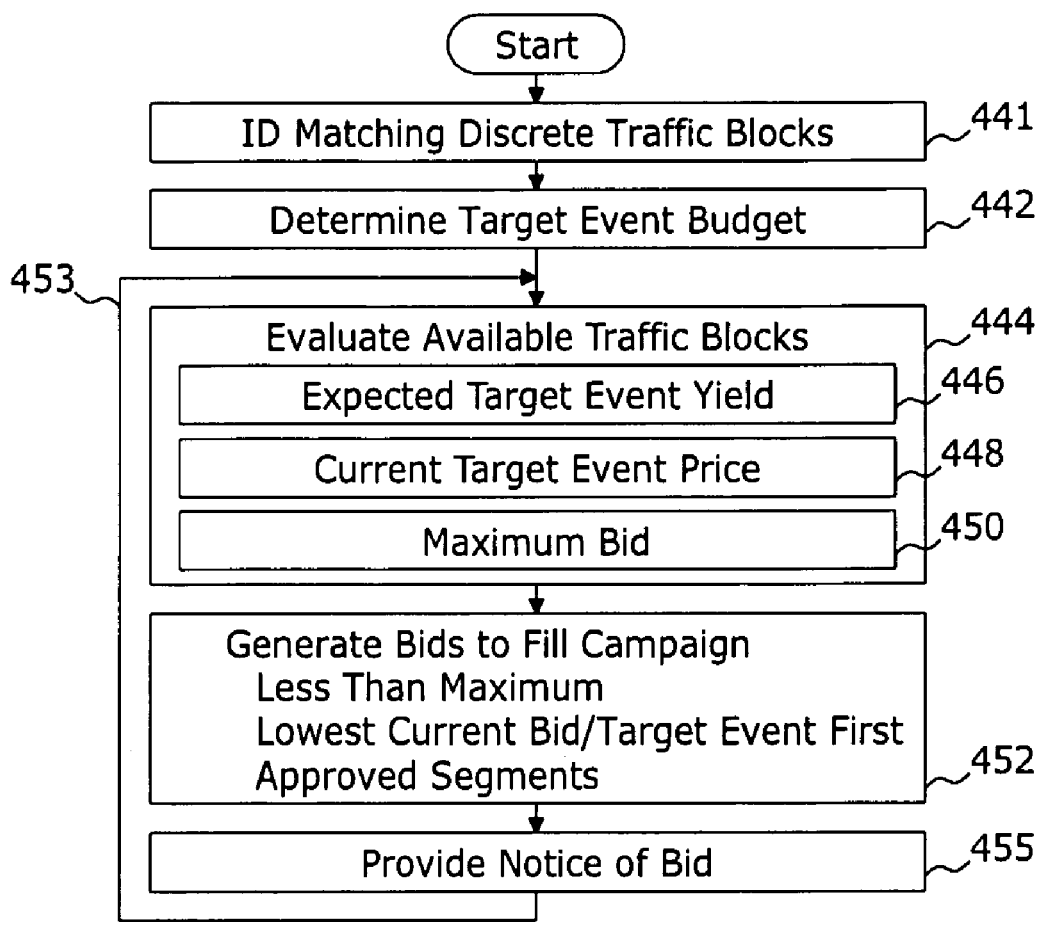
FIG. 23 is a flow chart representing exemplary steps implementing automated bidding on discrete traffic blocks in fulfillment of a buyer's advertising campaign blocks in accordance with an embodiment of the present invention.

FIG. 23 depicts exemplary steps the bid tool 56 may perform to evaluate which campaigns, of those identified by the listing search tool 54 that best matches the campaign's requirements in terms of delivery media objectives (e.g. web site content and traffic patterns), provide the best value to the buyer at current bid prices and enter bids accordingly on an automated bases. FIG. 24 depicts a financial analysis table 454 representing exemplary data relationships which may be used for selecting, on an automated basis, one or more discrete traffic blocks meeting campaign objectives and placement of bid(s) for those selected discrete traffic blocks.

Turning to FIG. 23 in conjunction with FIG. 24, step 441 represents selecting a subset of the discrete traffic blocks with "Open" status 122 that best match or correlate with the buyer's advertising campaign objectives.

As discussed with respect to FIG. 20, matching discrete traffic blocks 20 with the objectives of an advertisement campaign 136 may comprise steps of: i) comparing the target duration of the advertisement campaign 136 with the duration 96 (or at least the start date 96a) of the discrete traffic block 20 as represented by step 162; ii) comparing the target attributes of the advertisement campaign 136 with the segment blue print 86 of the discrete traffic block 20 as represented by step 164; iii) comparing the delivery media objects of the advertisement campaign 136 with the delivery media data 89 of the web page of the discrete traffic block 20; iv) comparing the transactional unit type and cost goals of the campaign with the volume and costing statistics of the discrete traffic block 20 as represented by step 168; and comparing identification of the buyer with buyers associated with a group ID of the discrete traffic block (if a private auction) as represented by step 169. Again, the degree of match of each comparison can be calculated and an overall degree of match calculation using, for example, a weighted average. For purposes of selecting the subset of discrete traffic blocks that match or correlate, step 169 may represent selecting those discrete traffic blocks with a degree of match greater than a predetermined threshold.

Step 442 represents determining a target event budget for the campaign. The target event budget may be the campaign budget divided by the aggregate number of target events the buyer desires to acquire. For example, referring briefly to FIG. 9a, if the target volume 142 is expressed in terms of impressions, each impression may be considered a target event and the target event budget would be the campaign budget 145 (or the remaining campaign budget which may be the budget less amounts already expended or committed) divided by the target volumes 142 of impressions (or the remaining target volume which may be the target volume less amounts already purchased or contracted for).

Step 444 represents performing a financial analysis on each of the available traffic blocks 20 that are identified by the listing search tool 54 as best matching or correlating to the buyer's advertisement campaign.

Sub-step 446 represents determining an expected target event yield 500. The expected target event yield 500 may represent, for the particular traffic block, the ratio of the number of target events derived from a certain quantity of impressions divided by the quantity of impression. For example, if the target event is a click, the percentage of impressions that yield clicks.

Sub-step 448 may represent determining the current target event bid 502 which may be the current bid 112 (FIG. 5d) divided by the expected number of target events included in the traffic block (e.g. impressions multiplied by the target event yield—if the block volume is impressions).

Sub-step 450 represents determining the buyer's maximum bid 504 for the traffic block. The maximum bid may be the target event budget multiplied by the expected number of target events included in the traffic block.

After calculating the current target event bid 502 at step 448 and the maximum bid at step 450, the bid tool 56 may generate bids on an automated basis to fulfill the campaign as depicted in step 452.

In selecting which traffic blocks 20 to bid, the bid tool may abide by the following rules: i) the aggregate of all bids (with a purchased or open status with the buyer having the current winning bid) may not exceed the campaign budget; and ii) bids should be placed in a designated priority order which may be bidding on those discrete traffic blocks with the lowest current bid per target event 502—prior to bidding on discrete traffic blocks with higher current bid per target event values; and iii) optionally, bidding is only to be placed on discrete traffic blocks within segments 95 approved by the buyer.

More specifically, if a particular discrete traffic block is identified for bidding—meaning that an inventory listing 95 (FIG. 5c) defining a page profile group and segment—but has not yet been approved by the buyer, prior to automatic bidding, the bid tool 56 may generate a notice to a predetermined email address associated with the buyer identifying the inventory listing 95 (i.e. URL, ad placement, segment attributes, etc). Upon the user approving a particular inventory listing 95, it may be added to an approved inventory listing table 457 (FIG. 9a) associated with the buyer campaign ID 138 as depicted in FIG. 9d. As such, bidding only on discrete traffic blocks within approved segments may represent bidding only on discrete traffic blocks within segments listed in the approved listing table 457 associated with the campaign.

After generating bids on selected discrete traffic blocks for fulfilling the campaign (which may include writing appropriate bid records 182 to the bid table as 110 as depicted in FIG. 5d bidding, step 455 represents providing notice of the bids to the buyer either by way of depicting on a web page or by sending to a designated email address associated with the buyer.

After generating bids, it is quite likely that new traffic blocks will be listed and other buyers will outbid the buyer on current traffic blocks. As such, the bid tool 56 must periodically re-evaluate and re-bid on available traffic blocks as depicted by the loop back 453 of the flow chart of FIG. 23.

Request for Listing/Response to Listing

Returning to FIG. 11, the request for listing tool 58 and the request for listing response tool 68 (also referred to as the response tool 68) provide an alternative system and method for brokering the sale of a discrete traffic block between a seller and a buyer.

In a first aspect, the request for listing tool 58 may be adapted to operate in a similar manner to the create campaign tool 52, or invoke operation of the create campaign tool 52, to provide for development of the data relationships related to the buyer's campaign (inclusive of the RFL fields 300) as previously discussed with respect to FIG. 9a and FIG. 9b. As discussed, the exemplary RFL fields 300 may comprise: i) an RFL option field 302 indicating whether the campaign is open for sellers to propose a discrete traffic block in response to the campaign 136; ii) a response due date 304 indicating when seller proposals are due; and iii) an open offer date 306 indicating for how long any seller proposal must remain open for buyer acceptance thereof.

In a second aspect, the request for listing tool 58 may be further adapted to provide workflows to enable a buyer to review a selected seller's advertisement placements and traffic profile segments and, if desired by the buyer, generate a request for a discrete traffic block to the seller.

Figure 42:
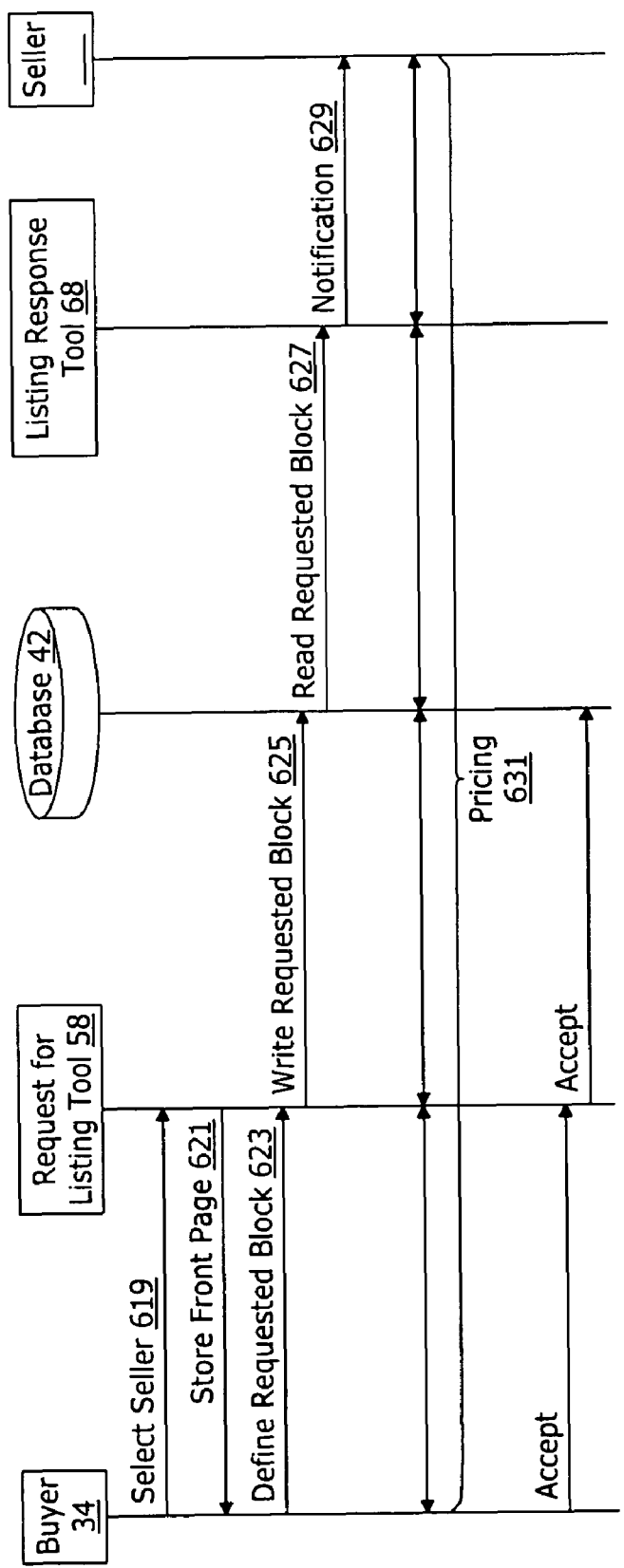
FIG. 42 is a ladder diagram representing exemplary steps for show-casing a seller's inventory of advertisement impressions and facilitating a buyer requesting to purchase a discrete traffic block.

Turning to FIG. 42, the request for listing tool 58 may, at step 619 obtain from a buyer 34 identification of a selected seller that may have inventory desirable to the buyer. In response thereto, the request for listing tool 58 may provide a store front page to the buyer 34 at step 621. An exemplary store front page 620 is depicted in FIG. 43 and showcases the seller's inventory.

Figure 43:
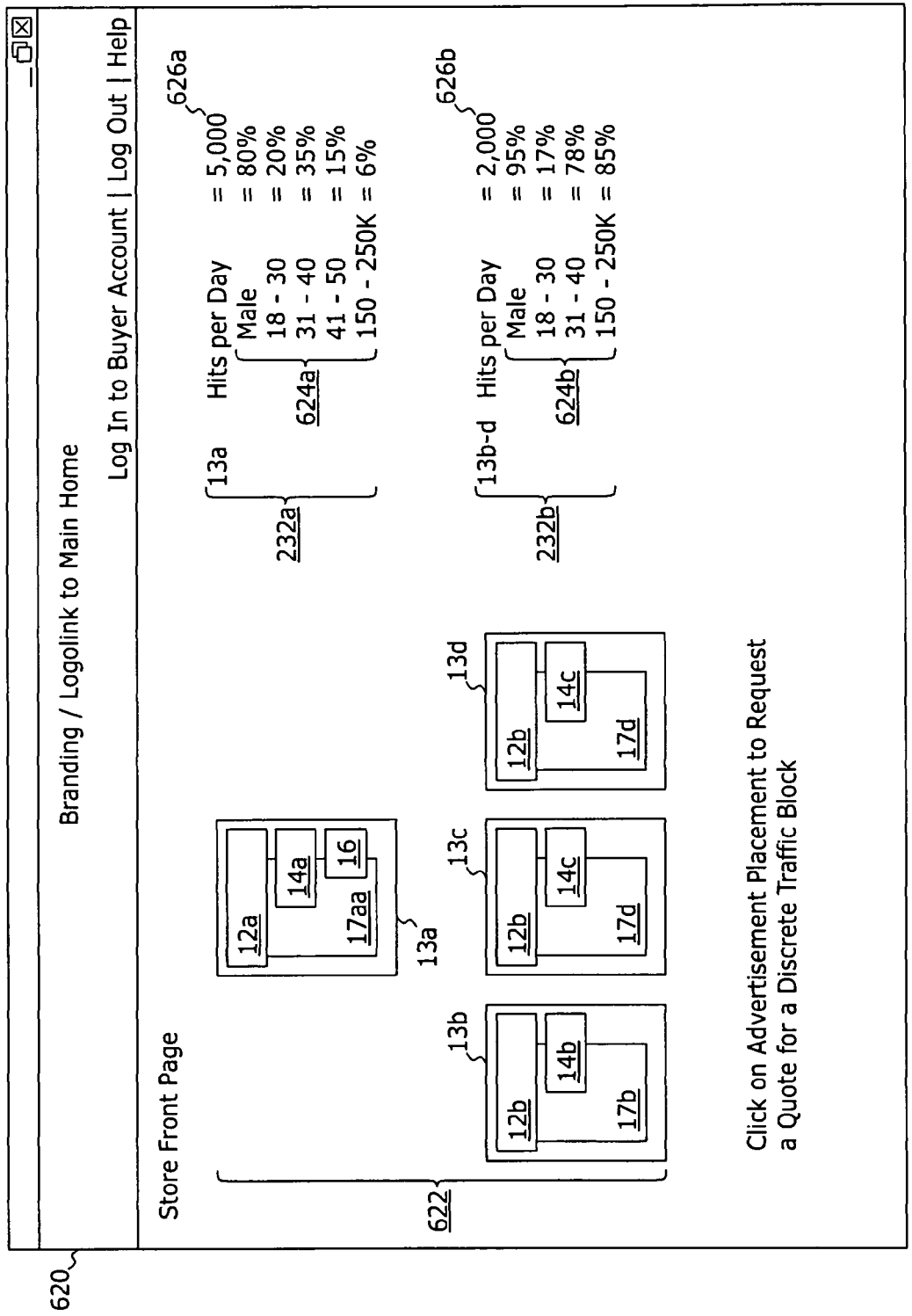
FIG. 43 is a diagram representing an exemplary web page for show-casing a seller's inventory of advertisement impressions and facilitating a buyer requesting to purchase a discrete traffic block.

Referring to FIG. 43, the exemplary store front page 620 may include a graphical depiction 622 of the various web pages 13a-13d of the seller's web site and, within each page 13a-13d, a graphical depiction of the various advertisement placements 12, 14 and 16 therein. The store front page 620 may also include, for each page profile group 232a, 232b: i) an indication of volume, such as "hits per day" from unique end users 624a, 624b; and ii) traffic profile parameters 626a, 626b identifying characteristics of at least a portion of the end users comprising at least a portion of the seller's internet traffic. The traffic profile parameters 626a, 626b may represent percentages of the end user which are within each of a selected subset of the traffic attributes 72 from the attribute library 70 (FIG. 6).

The store front page 620 may also include one or more controls to enable the buyer to identify the advertisement placement and define a requested discrete traffic block. In the exemplary store front page 620, each graphical image of an advertisement placement 12, 14, and 16 may be a control which, if activated, posts a response 623 (FIG. 42) from the buyer's system to the request for listing tool 58 for requesting a discrete traffic block of the "clicked" advertisement placement.

The response 623 may further include the buyer's requested discrete traffic block. The requested discrete traffic block may comprise identification of at least: i) a volume parameter defining a volume of at least two salable events included in the requested discrete traffic block; and ii) a duration parameter defining an active time period during which the volume of salable events included in the requested discrete traffic block will be provided. Turning briefly to FIG. 44 in conjunction with FIG. 42, step 625 may represent writing a record 634 representing the requested discrete traffic block to a table 620 of the database 42 storing the parameters of requested discrete traffic blocks. The record 634 may associate identification of the buyer (buyer ID 34), identification of the selected seller (seller ID 86), identification of the buyer selected advertisement placement 12, 14, 16 (advertisement placement ID 93); an indication of the traffic profile segment desired (segment ID 11), and indication of the requested volume 636 (either as impressions 636a, clicks 636b, or other salable events), and an indication of the requested duration 638, including a start time 638a and an end time 638b.

Figure 45:
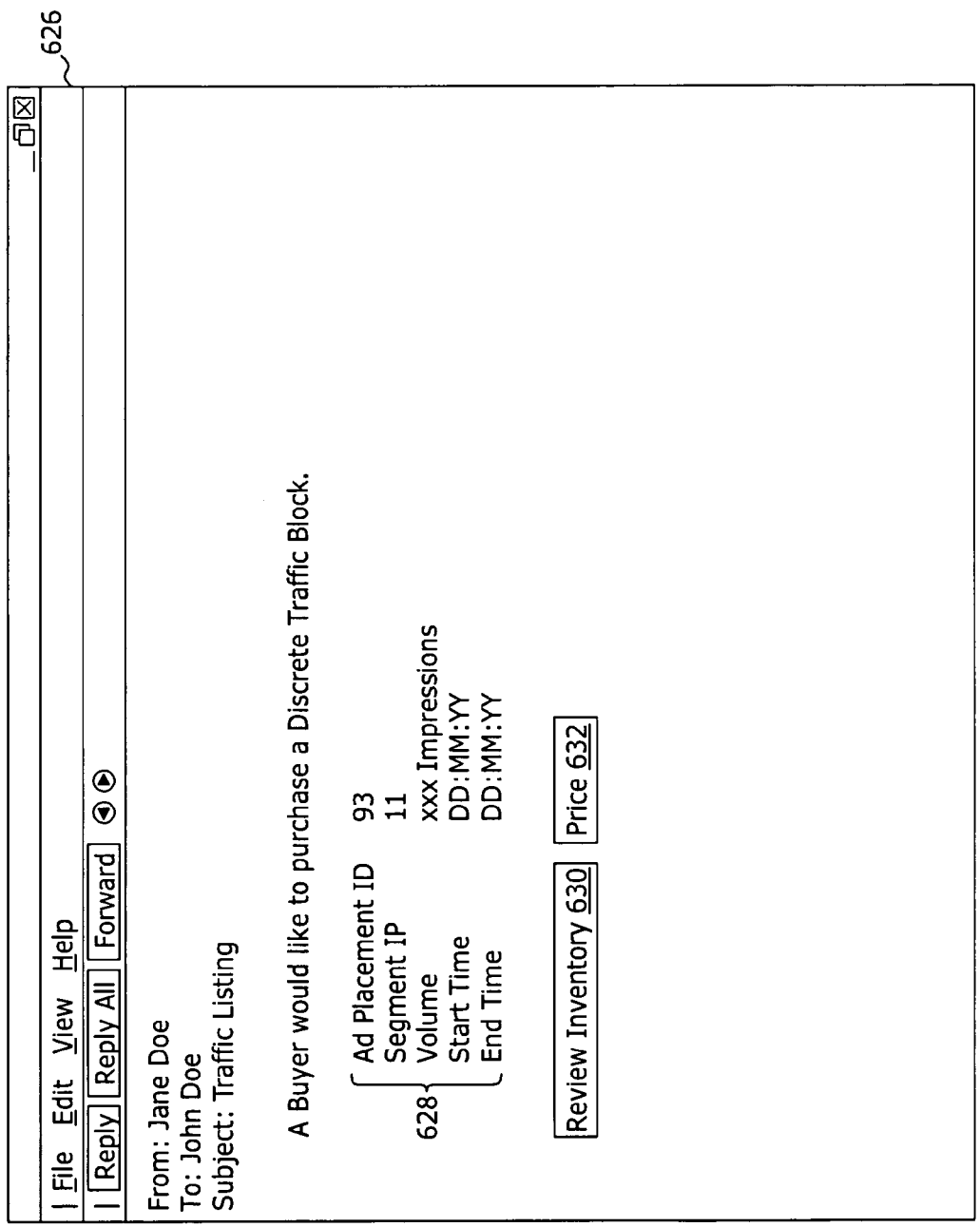
FIG. 45 is a diagram representing an exemplary notification of a buyer's request to purchase a discrete traffic block.

After writing the record 634, the listing response tool 68 may obtain the requested discrete traffic block from the database 42 at step 627 generate notification to the selected seller. Turning to FIG. 45, an exemplary notification 626 may be an email or a web page within the selected seller's workflow that includes identification of the discrete traffic block 628 inclusive of the desired volume, desired duration, ad placement ID 93 and segment ID 11. The notification 626 may include a control 630 enabling the seller 36 to view available inventory and a control 632 enabling the seller to set a price for the requested discrete traffic block.

Returning to FIG. 42 step 631 represents price negotiation that may include the seller proposing a price and the buyer 34 accepting the price via a work flow of the request for listing tool 58. Once priced and accepted, the price 640 (i.e. price for the discrete traffic block) and an indication of its acceptance 646 may be written to the record 634. The discrete traffic block and an indication of its sale may also be written to the discrete traffic block table 98 (FIG. 5c) such that its effect on the inventory listing 95 is properly recorded and its fulfillment may be implemented in accordance with the description of the exemplary order management system described herein.

Listing Response Tool

The listing response tool 68 may be adapted to provide work flows to obtain seller proposed discrete traffic blocks for fulfillment of the buyer's campaign 136. Discrete traffic blocks proposed by sellers may be in accordance with the data relationships of the exemplary RFL response table 310 as depicted in FIG. 9b.

Each record 312 of the RFL response table 310 associates a seller with a proposed discrete traffic block. The record further associates: i) a seller ID field 313 identifying the seller—which may be the same seller global identifier as discussed with respect to field 86 of FIG. 5a; ii) an inventory ID field 314 which identifies the seller's inventory listing by reference to an inventory listing record 95 of the inventory table 92 of FIG. 5c; iii) a duration field 316 (comprising a start date 316a and an end date 316b) specifying the duration during which the seller is proposing to fulfill the buyer's request; iv) a volume field 318 specifying the quantity impressions 318a or quantity of clicks 318b which the seller proposes to fulfill the buyer's request; and v) an acceptance/rejection field 320 which may be populated by workflows of the request for listing tool 58 (FIG. 11) indicating the buyer's acceptance or rejection of the proposal.

Figure 25:
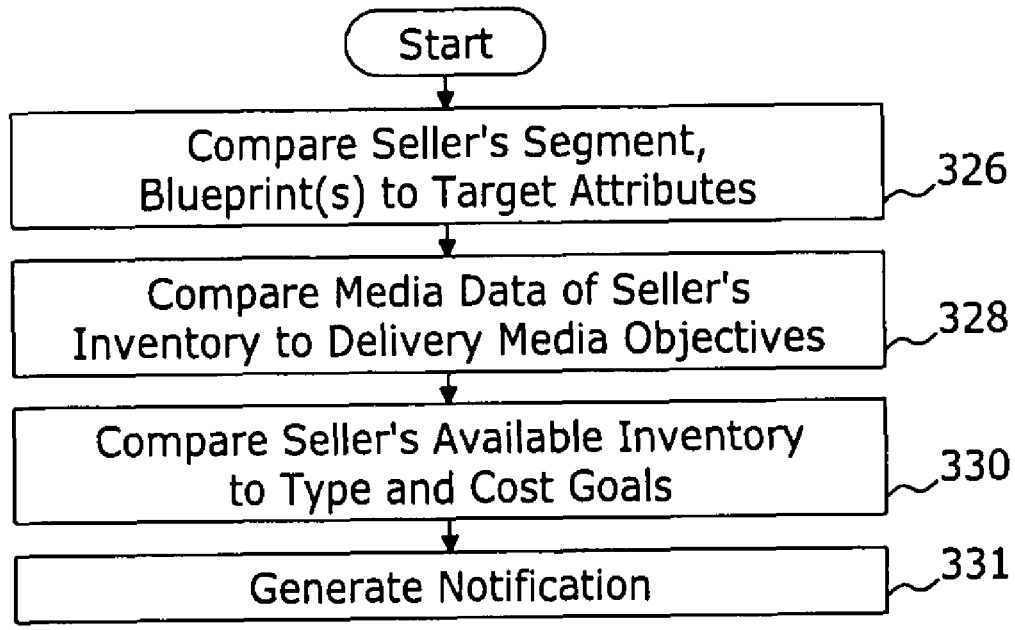
FIG. 25 is a flow chart representing exemplary steps implementing notification of a seller with available inventory of a buyer's advertising campaign with media objectives corresponding to the seller's inventory in accordance with an embodiment of the present invention.

The flow chart of FIG. 25 represents steps that may be used to implement an exemplary listing response tool 68. Step 326 represents comparing distinguishing attributes 27 of the seller's traffic profile segments 11 (FIG. 5a) to target attributes 144 (FIG. 9a) of those campaigns for which an open request for listing exists. Those profile segments 11 which best match or correlate to the target attributes 144 are identified as segments potentially meeting the buyer's requirements.

Step 328 represents comparing the delivery media data 89 (FIG. 5a) of the seller's inventory to delivery media objectives 145 (FIG. 9b) of the campaigns for which open request for listings exists. Those seller's with delivery media that best matches or correlates to the delivery media objectives 145 are identified as potential sellers.

Step 330 represents, for those identified seller's with salable inventory within identified segments (e.g. segments meeting the target attributes and sellers meeting delivery media objects), comparing the seller's available inventory to the transaction type and cost goals of the campaigns for which there are open request for listings.

Figure 26:
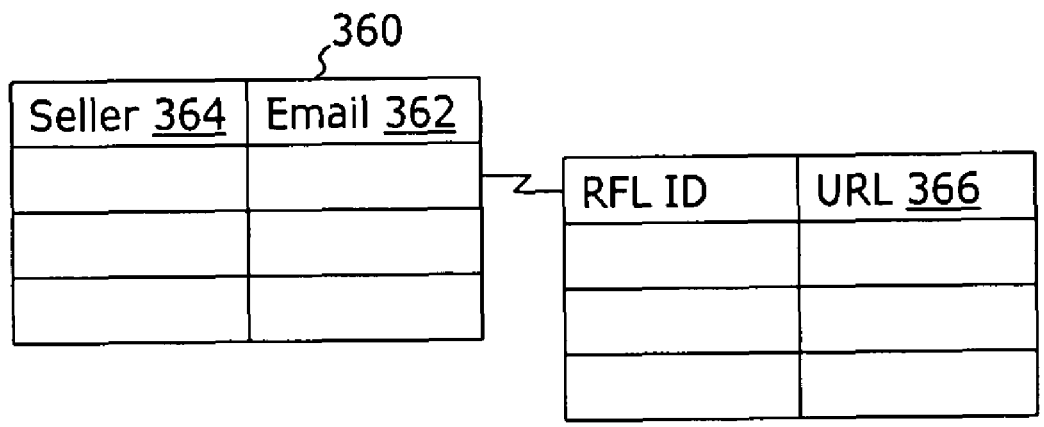
FIG. 26 is a table depicting data structure useful for implementing notification of a seller with available inventory of a buyer's advertising campaign with media objectives corresponding to the seller's inventory in accordance with an embodiment of the present invention.

If, at step 331, the seller's available inventory meets the transaction type and cost goals, the listing response tool 68 may generate a notification to the seller which, in accordance with the data relationships of table 360 of FIG. 26, may include generating an e-mail to a preconfigured email address 362 associated with the seller 364. The response tool 68 may also associate the RFL with the email address such that duplicates are not sent.

Figure 27:
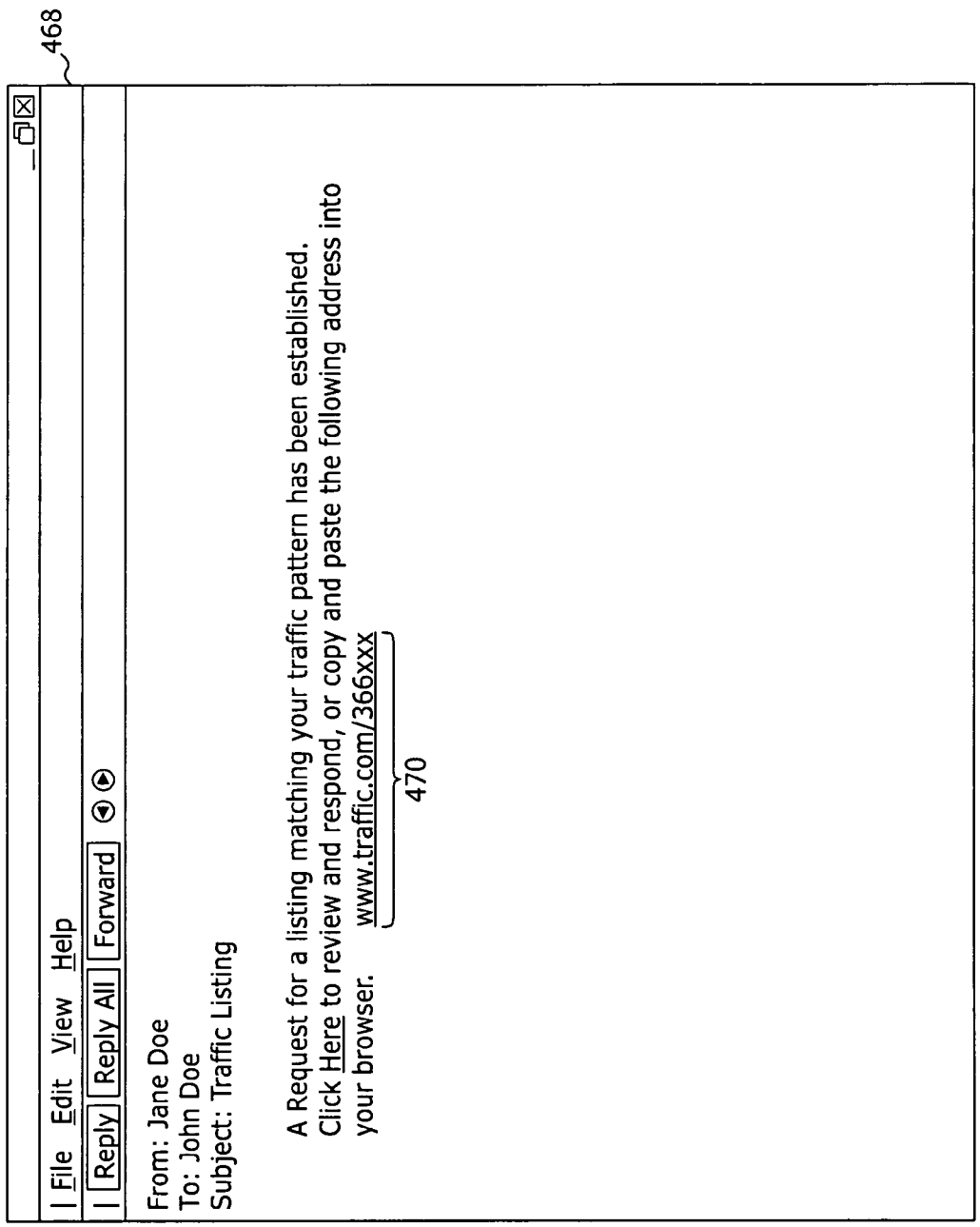
FIG. 27 is a diagram representing an exemplary notification provided to a seller with available inventory of a buyer's advertising campaign with media objectives corresponding to the seller's inventory in accordance with an embodiment of the present invention.

Turning briefly to FIG. 27 in conjunction with FIG. 26, an exemplary email 468 may include a hot link 470 to a URL 366 associated with the listing ID such that if the recipient clicks on the hot link 470, his or her browser may be redirected to a web page that includes the RFL data.

Turning to FIG. 28, an exemplary open RFL web page 336 may display those campaigns for which an open request for listing exists that matches the seller's inventory. The RFL web page 336 may include a listed summary 338 of such campaigns, a calculation of the degree of match 340, an indication of when a response is due 341, and controls 342 and 344 for requesting additional information about the campaign and/or controls for responding to the request for listing available to the seller, respectively.

Figure 29:
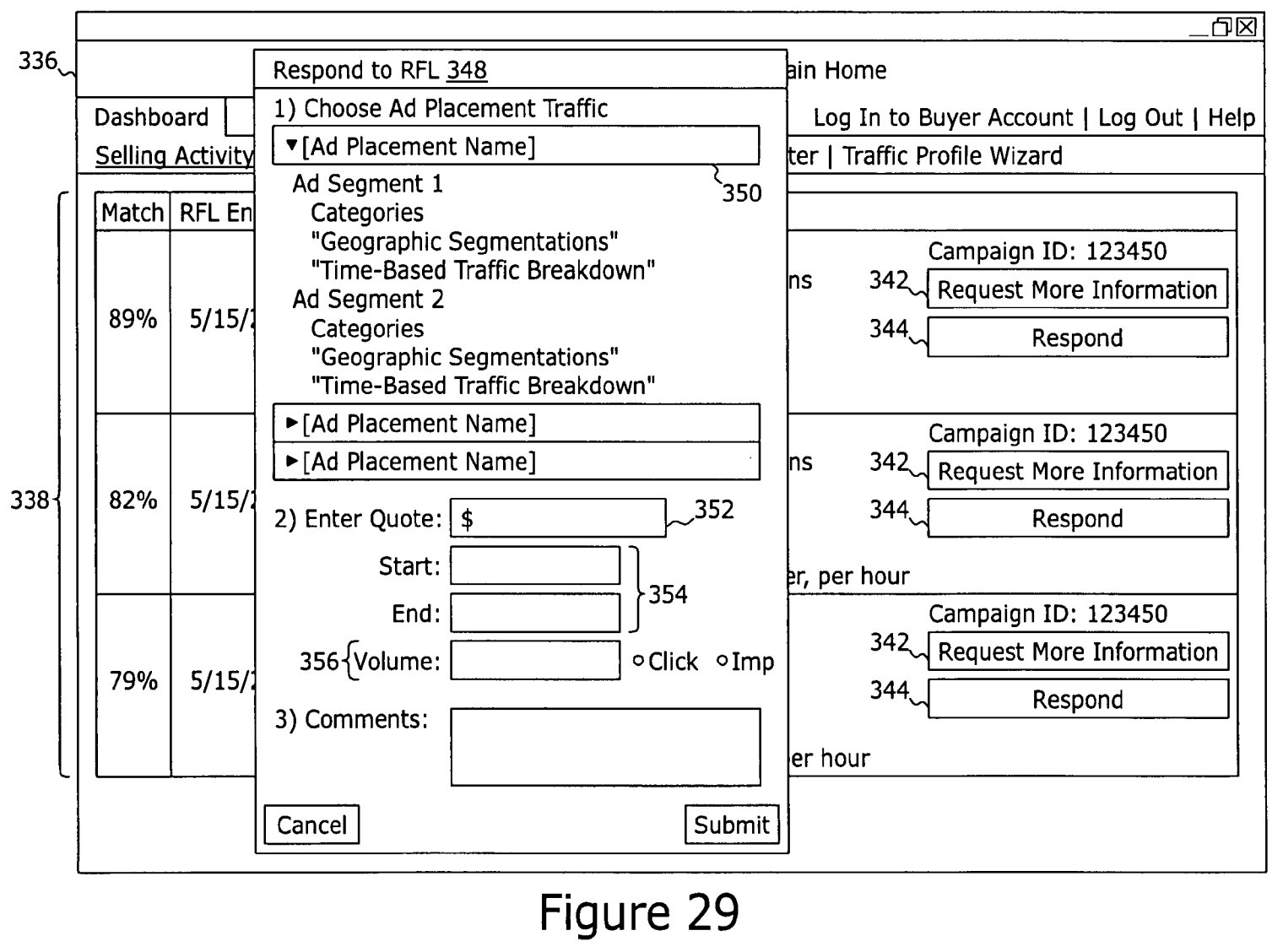

Upon selection of the control for responding to the listing, the RFL response tool 68 may generate a response pop up window 348 as represented in FIG. 29.

The response pop up window 348 may include controls for enabling the seller to define a discrete traffic block, including a price quote, for proposing to the buyer in response to the RFL. In more detail, the pop up window may include: i) control 350 for obtaining seller selection of an available inventory segment/advertisement placement for proposal (e.g. a record 409 from the seller's inventory table 92 of FIG. 5c); ii) control 352 for obtaining seller price quote for the proposed discrete traffic block; iii) control(s) 354 for obtaining a duration of the proposed discrete traffic block; iv) control(s) 356 for obtaining the volume of impressions or clicks proposed in the discrete traffic block. Such data may fulfill the data relationships discussed with respect to the RFL response table 310 of FIG. 9b. In one aspect, the above described values may be automatically populated by an auto response system calculating values as closely as possible based on available information.

Following seller submission of a proposed discrete traffic block, it remains available for buyer acceptance for the period specified by the buyer (e.g. until the open offer date 306 of FIG. 9b). Upon acceptance by the buyer, the discrete traffic block may become an open order for fulfillment by the order fulfillment system 40 (FIG. 11).

Order Fulfillment System

Returning to FIG. 11 in conjunction with FIG. 3, the order fulfillment system 40 may include at least a pacing module 43, load balancing systems 44, an expected revenue model 45, a content determination system 47, and an ad network interface 51 which, in combination, may be adapted to serve advertisement content 19 for each advertisement placement 12, 14, and 16 of a web page 13 in conjunction with the Seller's web server delivering the web page 13 to the end user's computer system for viewing.

Figure 30:
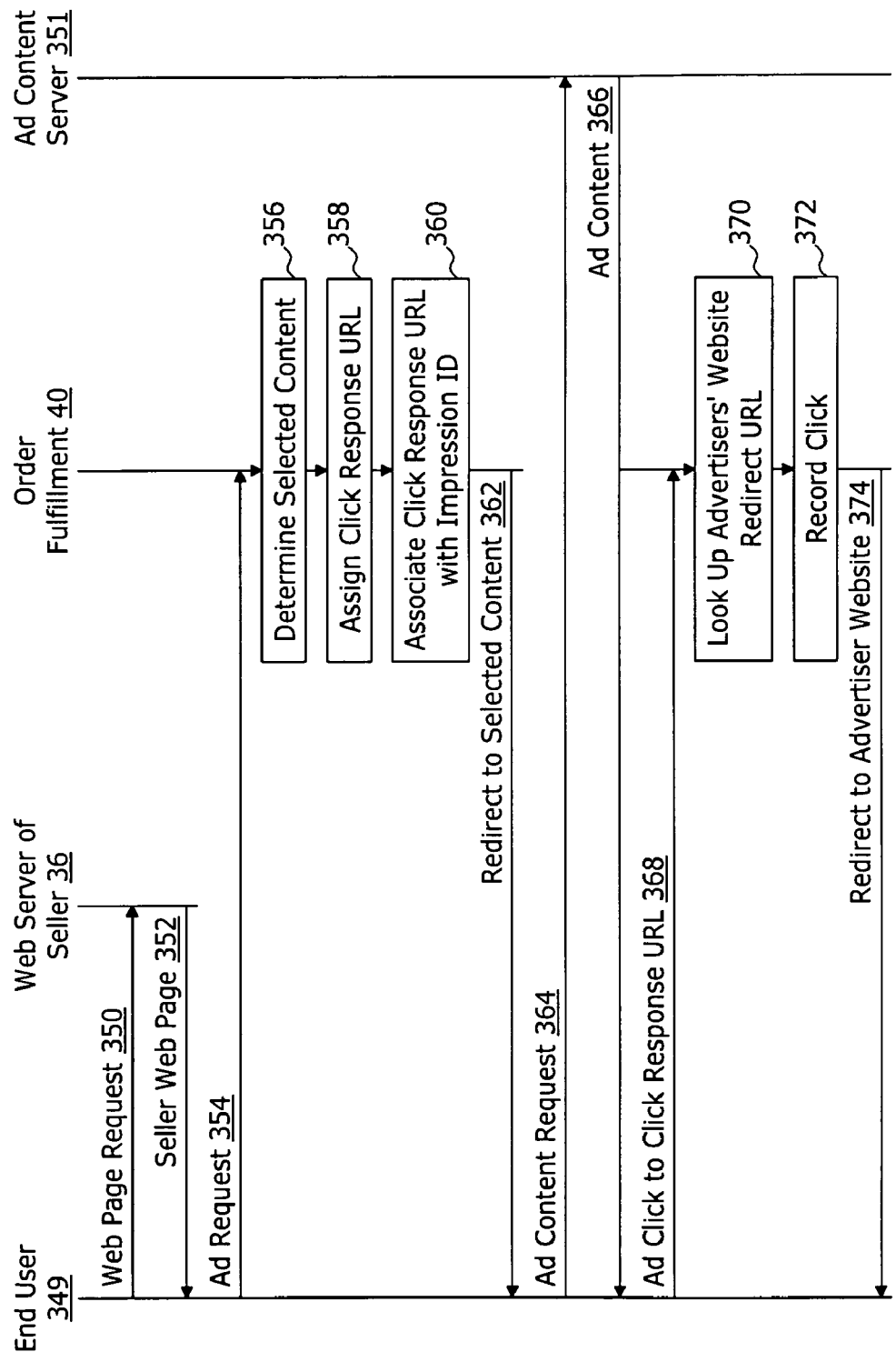
FIG. 30 is a ladder diagram representing exemplary steps performed for serving advertisement content in accordance with an embodiment of the present invention.

Turning to FIG. 30, a ladder diagram represents exemplary interaction between an end user system 349 (e.g. a web browser), a web server of the seller 36, the order fulfillment system 40, and an advertisement content server 351—which may be under common control with the order fulfillment system 40, the seller 36, or the buyer 34.

Step 350 represents the end user browser system 349 generating an HTTP connection to the URL of the web server of the seller 36 for purposes of obtaining the seller's web page 13.

Figure 38:
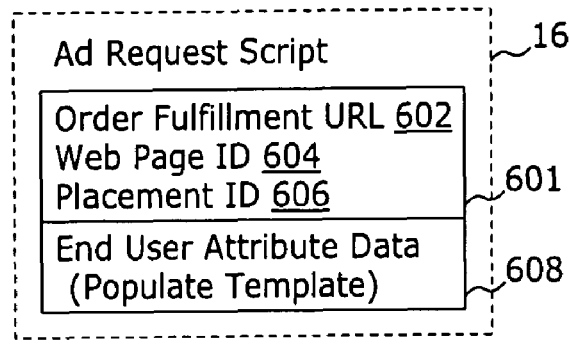
FIG. 38 is a diagram depicting exemplary elements of advertisement request script populated by a seller's web server upon serving a web page to an end user in accordance with an embodiment of the present invention.

Step 352 represents the web server of the seller 36 serving the web page 13. Turning to FIG. 38 in conjunction with FIG. 30, included within each advertisement placement within the seller's web page 13, for example advertisement placement 16, is advertisement request script 601 adapted to drive the end user's browser to generate an advertisement request to the order fulfillment system 40 to obtain an ad impression for rendering within the advertisement placement. The advertisement request script 601 includes the URL of the order fulfillment system 40, an identifier of the advertisement placement (e.g. web page ID 604 and placement ID 606).

Further yet, appended to the advertisement request script 601 may be end user attribute data 608 dynamically generated by the seller's web server. An example of such data may be geographic, demographic, and/or behavioral information available to the seller by way of user registration, a seller controlled cookie on the user's system, or other methods utilized by web site operators for collecting end user information.

Step 354 represents the end user browser 349 generating an advertisement request to the order fulfillment system 40. The advertisement request may include the web page ID 604, the placement ID 606, and the attribute data 608 as provided by the seller's web server.

Figure 40:
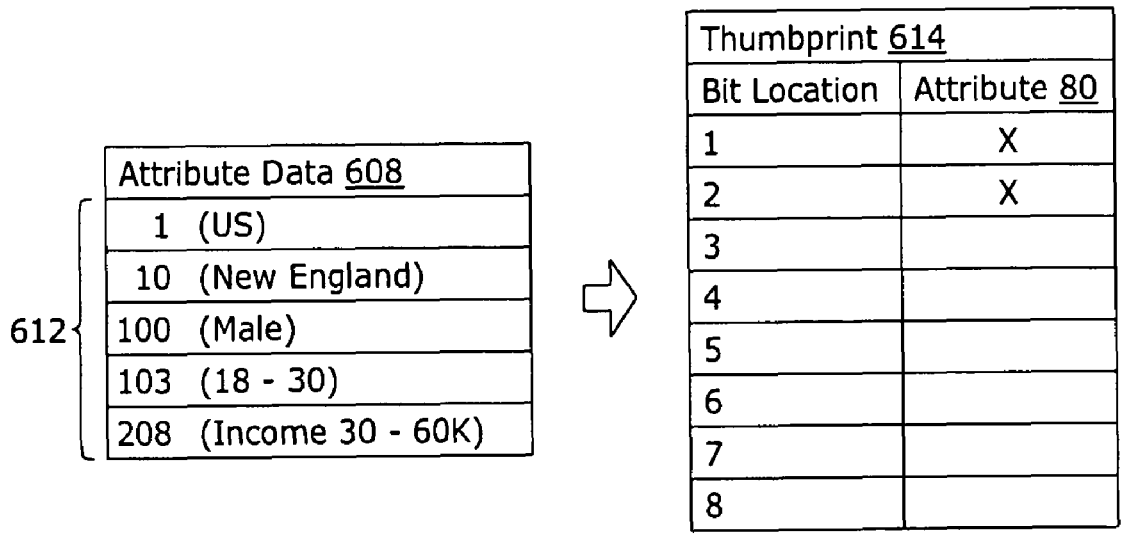
FIG. 40 is a diagram depicting exemplary mapping of end user attributes to a traffic attribute blue print for determining a traffic segment in accordance with an embodiment of the present invention.

More specifically, referring briefly to FIG. 40, the attribute data 608 may be an provided as an extension to the URL that includes identification of an attribute subset 612 representing those attributes 80 (selected from the attribute library 70) of the end user. For example, referring briefly to FIG. 6 in conjunction with FIG. 40, the end user may be a male, 18 to 30, income 30K to 60K, in New England, US—as such, attribute index numbers 1, 10, 100, 103 and 208 may represent the attribute data 608.

Step 356 represents the order fulfillment system 40 determining selected advertisement content for rendering to the end user as an advertisement impression within the advertisement placement within the web page content 13. A detailed description of determining selected advertisement content is included below.

Step 358 represents assigning a unique click response URL to the advertisement impression. The unique click response URL includes a domain name associated with the order fulfillment system 40 and a unique extension associated with the particular advertisement impression such that if the end user clicks on the advertisement impression, his/her browser is redirected to the click response URL such that the order fulfillment system 40 can track and report end user response and, if applicable, upon the occurrence of the applicable salable event, debit an account associated with the advertiser and update the fulfillment data.

Step 360 represents associating a unique identification of the advertisement impression (or the open order with which the selected advertisement content is included) with the click response URL. This association may be recorded in an impression database such that when an end user clicks on the advertisement impression and is linked to the click response URL, such end user action may be associated with the open order associated with the advertisement content and the order fulfillment system can redirect the end user's browser to the advertiser's web page.

Figure 39:
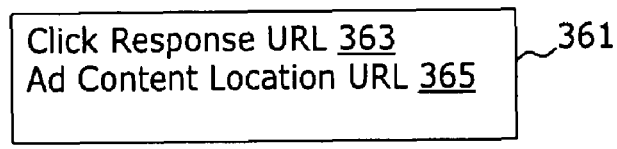
FIG. 39 is a diagram depicting exemplary elements of an advertisement redirect provided by an order fulfillment system in accordance with an embodiment of the present invention.

Turning to FIG. 39 in conjunction with FIG. 30, step 362 represents returning, to the end user's browser 349, a redirect 361 which includes the click response URL to associate with the advertisement impression and an ad content location URL 365 for purposes of instructing the end user browser 349 to connect to an ad content location URL 365 (e.g. an ad server 351) to obtain the ad content for rendering. Such ad content location URL 365 may be associated with the order fulfillment system 40, the seller (for example if a fail over advertisement), the buyer (if the buyer is serving its own advertisement content), or an independent advertisement content server.

Step 364 represents the end user's browser 349 connecting to the ad content server 351 for purposes of obtaining the selected advertisement content. This step may further include passing the click response URL to such ad content server 351 such that it may be associated with the advertisement content to be returned for rendering. This step may further include recording the impression by updating data related to fulfillment of the discrete traffic block.

Step 366 represents the advertisement content server 351 returning the advertisement content (with the click response URL) to the end user's browser for rendering in the advertisement placement.

Step 368 represents the end user browser 349 establishing a connection to the click response URL at the order fulfillment system 40 in response to the user clicking on the advertisement content.

Step 370 represents the order fulfillment system 40 looking up the URL of the advertiser's web site and step 372 represents recording the "click". Recording the click may comprise updating data related to fulfillment of the discrete traffic block, fulfillment of the advertisement campaign, and updating historical records associated with the effectively of the seller's inventory listing 95 (FIG. 5c) and the buyer's advertisement campaign and/or advertisement content.

Step 374 represents providing a redirect to the advertiser's web site such that the end user's browser may connect to the advertiser's website.

It should be appreciated that although the steps of FIG. 30 represent the end user browser 349 obtaining advertisement content directly from the ad content server 351, those skilled in the art will recognize that the order fulfillment system 40 may obtain selected advertisement content from an ad content server 351 and, in response to the ad request 354, return the selected advertisement content (with the click response URL) to the end user browser at step 362. Such embodiment would eliminate the need for steps 364 and 366, but create additional processing and connectivity burdens on the order fulfillment system 40.

Order Fulfillment

Figure 31:
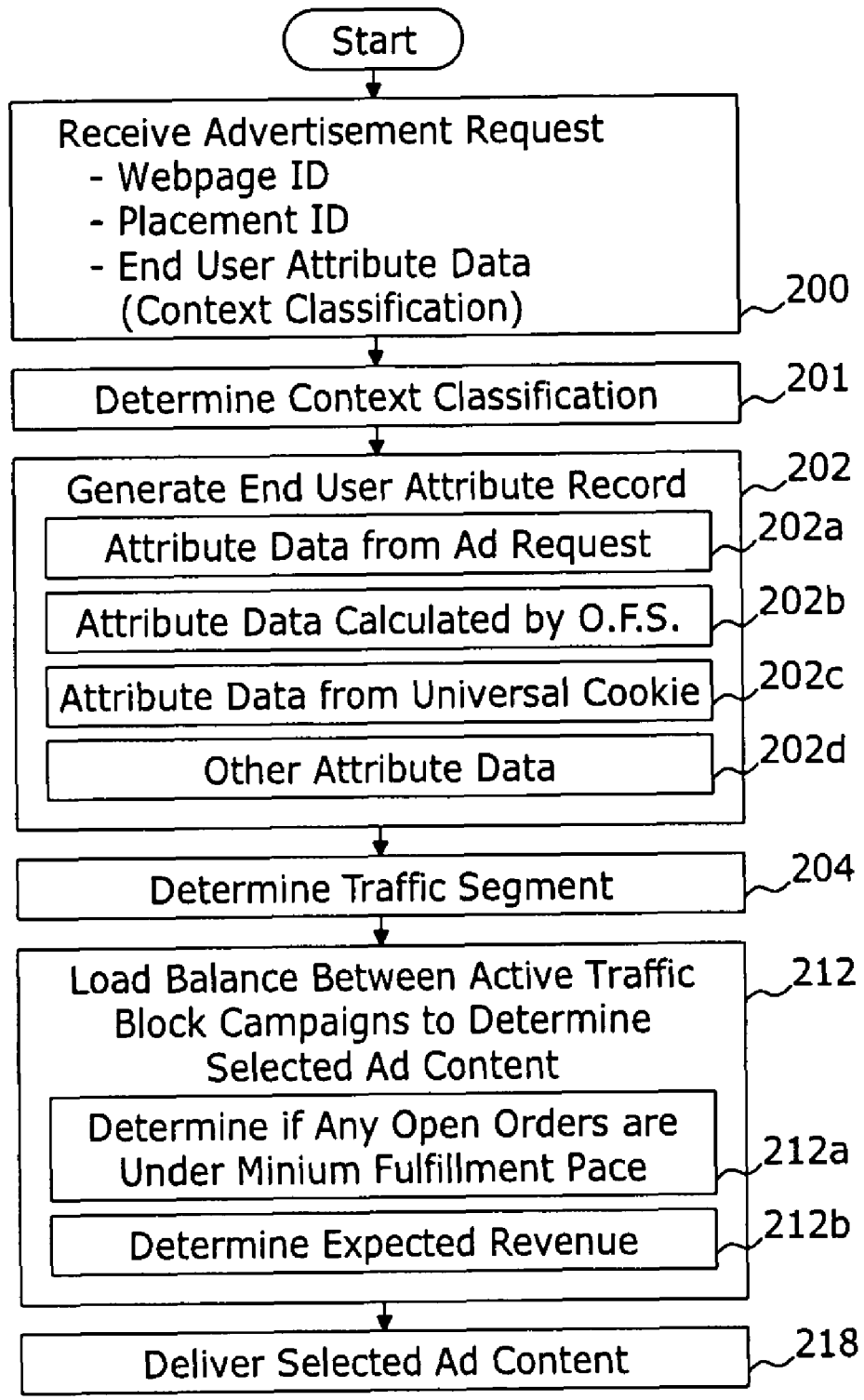
FIG. 31 is a flow chart representing exemplary steps performed by an order fulfillment system for selecting advertisement content for rendering in accordance with an embodiment of the present invention.

Turning to FIG. 31, a flow chart is shown which represents exemplary steps that may be performed by the order fulfillment system 40 for determining selected advertisement content for rendering within the advertisement placement in response to the advertisement request received at step 354 (FIG. 30).

Step 200 represents receiving the advertisement request. As discussed, the advertisement request may include the web page ID 604 and the ad placement ID 606 identifying the seller's advertisement placement as well as end user attribute data 608.

Step 201 represents looking up whether the ad placement is contextually segmented (e.g. looking up in the inventory table 92 as depicted in FIG. 5c whether the ad placement is contextually segmented). If the ad placement is contextually segmented, step 201 further represents determining the current classification of the content of the seller's web page.

In one exemplary embodiment, the context classification may be identified in the advertisement request. In another embodiment, the context determination system may periodically "page scan" the seller's web page for context. More specifically, turning briefly to FIG. 32, the context determination system 47 (of the order fulfillment system 40) (FIG. 11) may maintain a context table 460 which associates the URL of the web page with its current contextual classification.

Figures 32, 33:
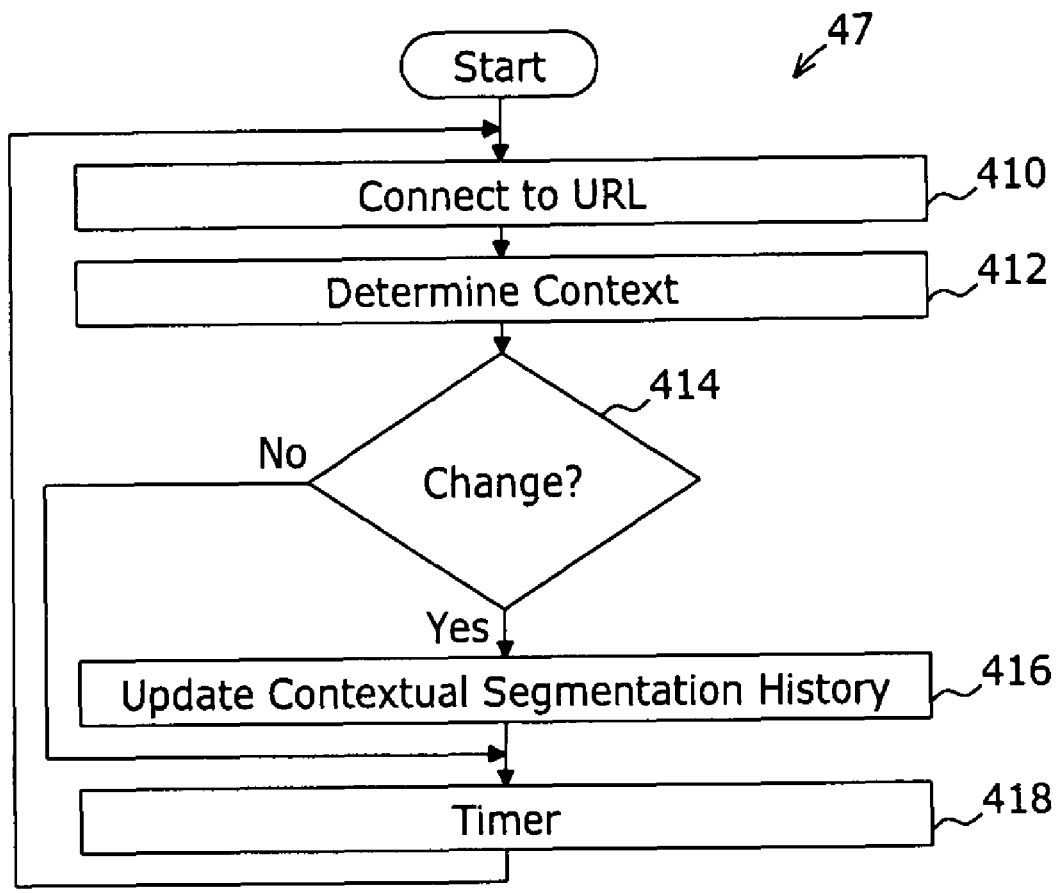
FIG. 32 is a table depicting an exemplary data structure useful for recording classification of web content for a web page wherein the content is periodically altered between at least a first classification and a second classification in accordance with an embodiment of the present invention.
FIG. 33 is a flow chart representing exemplary operation of a content determination system for determining a classification of web content of a web site wherein the content is periodically altered between at least a first classification and a second classification in accordance with an embodiment of the present invention.

More specifically, referring to FIG. 33 in conjunction with FIG. 32 and FIG. 8, an exemplary implementation of the context determination system 47, may, at step 410 periodically connect to the URL of the seller's web site and obtain the web content 17 (FIG. 1).

Step 412 represents comparing the content obtained from the seller's web site to the context pattern tags 407a-407c for each context classification to determine which of the context classifications the web content most closely matches. Most closely matching may mean the most frequent occurrence of pattern tags within the content.

If, at step 414, the context classification of the web page has changed since the system last connected to the URL, the context table 460 is updated, at step 416, to include the date and time of the change 466, and the current context classification 464. Thereafter, timer step 418 represents a step of waiting a certain period of time and then reverting back to step 410 to re-connect to the URL to determine if there has been a context change.

Returning to FIG. 31 in conjunction with FIG. 32, determining the context segment at step 201 may comprise looking up the most recent context classification of the web page in the context table 460.

After determining context segment(s), referring to FIG. 40 in conjunction with FIG. 31, the order fulfillment system 40 may, at step 202, generate an end user attribute record, or thumbprint 614 which may comprise mapping available end user attribute data 608 into the attribute template 76 used for segmenting the advertisement placement.

Referring to FIG. 7b, as an exemplary traffic template 76b for segmenting traffic, in conjunction with FIG. 31 and FIG. 40, available attribute information 608 about the end user may be used to populate each bit location of the traffic template 76b to generate an end user attribute record or thumbprint 614. More specifically, to generate the end user attribute record 614, each bit location of the traffic template 76b is set to represent whether the corresponding attribute 80 applies to the end user.

As represented by sub step 202a, a portion of the attribute information about the end user may be end user attribute data 608 (FIG. 38) appended to the ad request script 601 by the seller's web server. An example of such data may be geographic, demographic, and/or behavioral information available to the seller by way of user registration, a seller controlled cookie on the user's system, or other methods utilized by web site operators for collecting end user information.

As represented by sub step 202b, a portion of the attribute information about the end user may be end user attribute data determined by the order fulfillment system 40 from, for example, the end user's IP address. An example of such data may be a geographic location that can be calculated from an IP address.

As represented by sub step 202c, a portion of the attribute information about the end user may be end user attribute data read from a cookie on the end user system controlled by the order fulfillment system 40 (e.g. referred to as a universal cookie).

Figure 41:
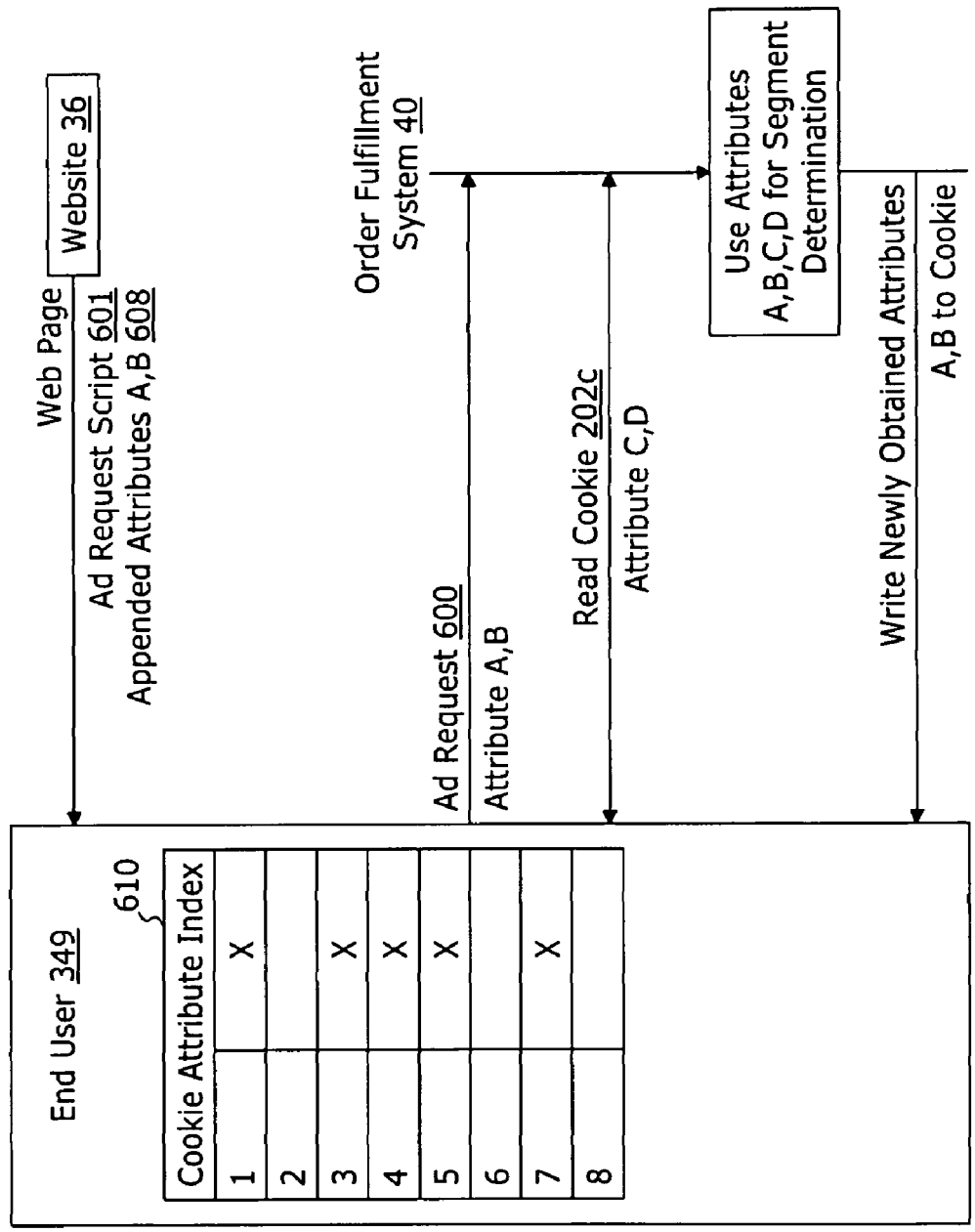
FIG. 41 is a ladder diagram representing exemplary interaction between an order fulfillment system and a universal cookie in accordance with an embodiment of the present invention.

Turning briefly to FIG. 41, a universal cookie 610 may store, for a large quantity or even all, attributes 80 of the attribute library 70 (FIG. 6) an indication of whether the attribute applies to the end user. As discussed, such attributes may be geographic, demographic, and/or behavioral.

As an end user browses the internet, each time the end user browser 349 makes an advertisement request to the order fulfillment system 40, the order fulfillment system 40 may: i) read those end user attributes stored in the universal cookie 610 and ii) write any additional end user attributes known about the end user to the cookie 610—such as geographic, demographic, or behavioral attributes provided to the order fulfillment system 40 by the seller's web server as end user attribute data 608 within the advertisement request 600.

More specifically, when the end user browser 349 obtains a web page from a seller's web site 36, the web site 36 provides the web page in conjunction with the advertisement request scripts 601 and appended end user attributed data 608 (if any) that the web site has recorded regarding the end user as discussed with respect to FIG. 38. In this example it is assumed that the appended end user attributes include attributes "A" and "B". As discussed, the end user browser 349 provides an advertisement request 600 inclusive of the attributes "A" and "B" to the order fulfillment system 40 at step 354.

Step 202c represents reading additional end user attributes from the universal cookie 610. For purposes of this example, those attributes are attributes "C" and "D". As such, after step 202c, the order fulfillment system has access to attributes "A", "B", "C", and "D" for use determining the attribute segment of the end user.

Step 203 represents updating the universal cookie 610 by writing the newly obtained attributes (e.g. attributes "A" and "B" obtained in the advertisement request 600) to the universal cookie 610. As such, the next time the end user browser 349 makes an advertisement request to the order fulfillment system 40, regardless of whether any attributes are included in the advertisement request, the order fulfillment system 40 will be able to utilize each of attributes "A", "B", "C", and "D" from the universal cookie 610 for attribute segmentation.

Returning to FIG. 31, sub step 202d represents any other means available for determining end user attributes for population to the end user attribute record.

Step 204 represents determining which of multiple traffic segments the end user best fits by comparing the end user attribute record to the traffic attribute blue print 28 of each segment of the page profile group. Referring again to FIG. 7b as an example, such comparison may be by way of comparing, for each traffic segment, a bit register representing the end user attribute records to a bit register representing the traffic segment. The closest matching bit register represents the best fit segment. Ideally the match should be exact.

After identifying the attribute and/or contextual segment of the advertisement placement, step 212 represents load balancing between the open orders and/or filler content for the inventory listing 95 that includes the segment for determining the selected advertisement content. More specifically, sub-step 212a represents determining whether any open orders are behind a minimum fulfillment threshold.

In one exemplary embodiment, the pacing module 43 (FIG. 11) may determine which open order (a discrete traffic block with a fulfillment duration that has commenced but not yet expired) is farthest behind (or least ahead) on its target pace. An order's target pace may be equal to the volume (e.g. the purchased quantity of impressions or clicks) divided by the time period over which the volume is to be delivered. An order is ahead of the target pace if its actual aggregate fulfillment volume (either clicks or impressions) is greater than a target volume. The target volume is the target pace multiplied by the number of days that have already elapsed since the start date of the period during which the volume is to be delivered. Similarly, an order is behind the target pace if the actual aggregate fulfillment volume is less than the target volume.

Figure 35:
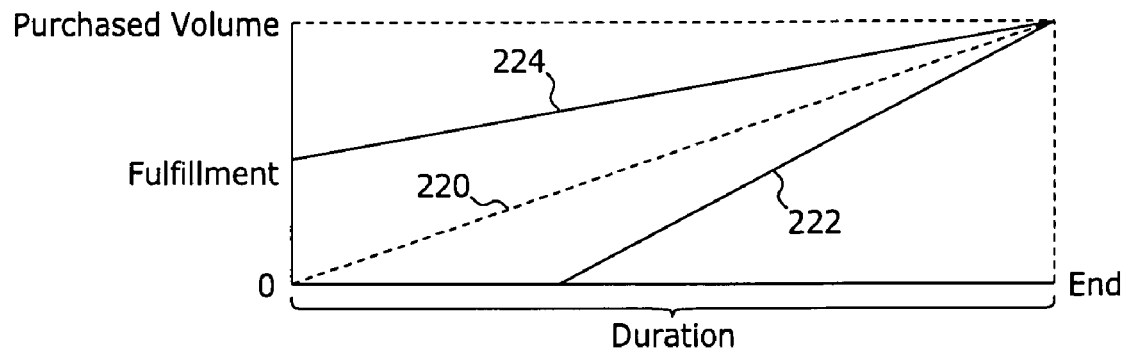
FIG. 35 is a diagram depicting pacing and deviation there from in accordance with a minimum fulfillment threshold and a maximum fulfillment threshold in accordance with an embodiment of the present invention.

In a second embodiment, the pacing module 43 (FIG. 11) may determine which open order is farthest behind a low fulfillment threshold (or least ahead of a high fulfillment threshold). Turning briefly to FIG. 35, target pace 220 of a particular traffic block campaign (e.g. the purchased volume divided by the duration) is represented a graph with: i) a horizontal access representing time between the start time and end time of the duration of the discrete traffic block; and ii) a vertical access representing fulfillment between zero actual impressions/clicks and the purchased volume of impressions/clicks. As such, the target pace 220 may be represented by a straight line from the vertex of the two axes and a coordinate representing full fulfillment of the purchased volume at the end date of the duration.

The low fulfillment threshold 222 represents a fulfillment pace less than the target pace—but approaching the target pace at the end of the duration. Similarly, the high fulfillment threshold 224 represents a fulfillment pace greater than the target pace—but approaching the target base at the end of the duration.

The range between the low fulfillment threshold 222 and the high fulfillment threshold 224 represent an acceptable deviation from the target pace—and such acceptable deviation becomes narrower, and approaches zero, at the end of the duration.

The fulfillment pace threshold 220 may be a function of the volume of salable events included in the discrete traffic block divided by the active time period of the discrete traffic block and multiplied by a portion of the active time period that has elapsed. The low fulfillment threshold may be the fulfillment pace threshold 220 multiplied by a function of the portion of the active time period that has elapsed that yield a value less than one for the entire duration of the active time period and approaches one at termination of the active time period.

In this embodiment, an open order is behind the low fulfillment threshold 222 if its actual fulfillment volume (at the particular time during the duration) is less than the low fulfillment threshold 222. Similarly, an open order is ahead of the high fulfillment threshold if its actual fulfillment volume (at the particular time during the duration) is greater than the high fulfillment threshold 224.

Turning briefly to FIG. 34 for each open order, the pacing module 43 may populate certain parameters into an expected revenue model table 469. Those parameters may include: i) a value representing pace 472; and ii) a value representing fulfillment deviation from low threshold 474.

Returning to FIG. 31, sub-step 212*b* represents the expected revenue module 45 (FIG. 11) determining which of multiple open orders and filler orders provides the highest expected revenue. More specifically, referring to FIG. 34 in conjunction with FIG. 31, the expected revenue module 45 may populate additional parameters to the expected revenue model table for each open order and each of a plurality of filler options 471. The filler options 471 may include a non-paced discrete traffic block (for example discrete traffic block 20*b* as discussed with respect to FIG. 5*e*), filler advertisement placement bid through the system 10 as recorded in the filler bid table 116 as discussed with respect to FIG. 5*c*), and filler advertisement placements that may be obtained from an ad network 39 (FIG. 11).

The parameters include: a revenue per impression 476 (if the revenue is based on delivery of an impression); and iv) a revenue per event 478 (if the revenue is based on some other event other than delivery of the impression).

The expected revenue module 45 may further calculate an expected revenue value 480 which: i) if the order is based on delivery of an impression, comprises the revenue per impression 476; and ii) if the order is based on some other event, the revenue per event 487 multiplied by the fraction of impressions estimated to yield the event.

After calculating expected revenue 480 for each open order and filler impression available, the order fulfillment system may select the option with the highest expected revenue 480.

After populating the expected revenue model table 469 at step 212, the selected advertisement content is identified for delivery at step 218. In the exemplary embodiment, if any open orders 20 are below the minimum fulfillment threshold 474, the open order most below its minimum fulfillment threshold 474 may be identified for delivery. If all open orders are above minimum fulfillment, the open order 20 or the filler option 471 with the highest expected revenue 480 may be identified for delivery.

Ad Network Interface

Figure 36:
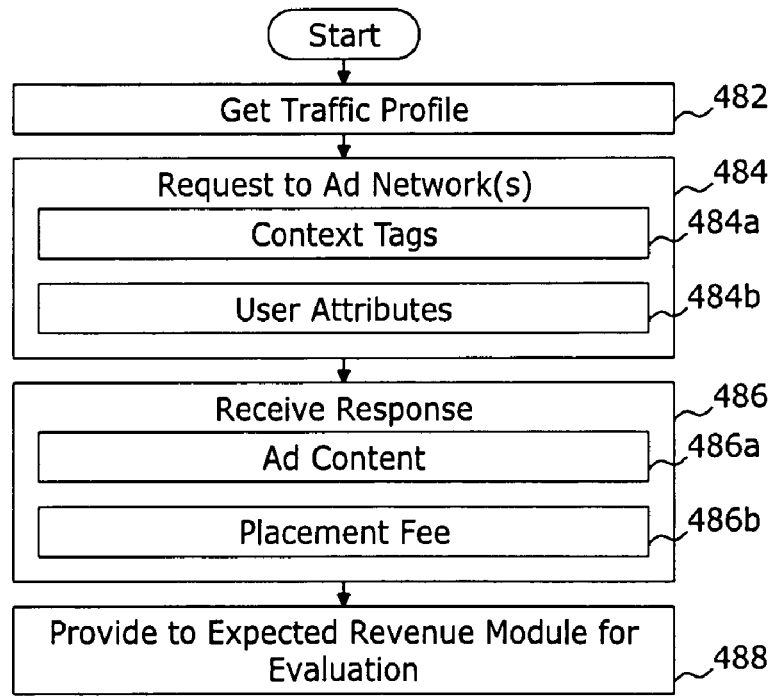
FIG. 36 is a flow chart depicting exemplary steps useful for operating an ad network interface for obtaining filler advertising content options in accordance with an embodiment of the present invention.

Referring to FIG. 36 in conjunction with FIG. 34, an exemplary implementation of the ad network interface 51 (FIG. 11) coupling to one or more ad networks 49 is represented in flow chart form.

Upon receipt of an advertisement request identifying an inventory segment 95, at step 482 the ad network interface generates a request to each available ad network 49 at step 484. Each ad request may include context tags 484*a* and/or end user attributes 484*b*. The context tags may include text tags representative of the web site content with which the advertisement impression would be delivered. The end user attributes 484*b* may be attributes determined by the order fulfillment system 40 at step 202 (FIG. 31).

Step 486 represents receiving a response back from at least one ad network 49 with the response including the ad content (or identification of an ad server URL for obtaining the ad content) 486*a* and identification of a placement fee 486*b* which may be a fee for placing the impression or a fee for another event such as a click.

Step 488 represents the ad network interface 51 providing the placement fee to the expected driven model (described with respect to FIG. 34) for evaluation in conjunction with open orders and It should be appreciated that the steps of flowchart of FIG. 36 are an exemplary implementation only and that those skilled in the art readily recognize that alternative implementations of a network interface may achieve the objectives of the present invention without departing from the scope of the present invention.

Listing Link

Figure 37:
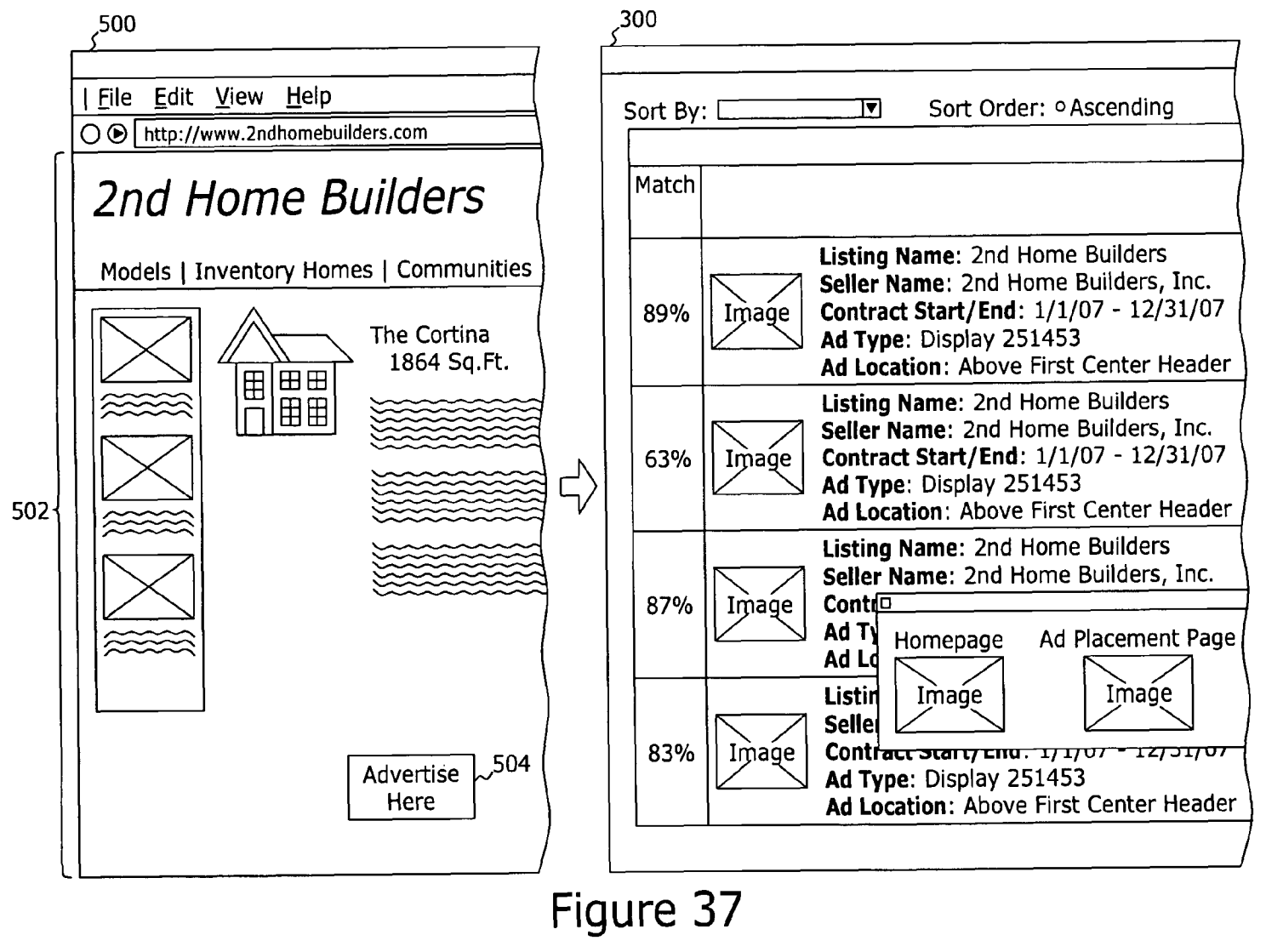

Turning to FIG. 37 in conjunction with FIG. 11, in one aspect a management system may broker the sale of at least a portion of the seller's inventory of advertisement impressions that the seller is able to render within an advertisement placement within a web page of the seller's internet traffic by placement of advertisement inquiry object 504 on the web page 502 of the seller.

More specifically, the advertisement inquiry object 504 may be installable for rendering with at least one web page 502 of the seller. The advertisement inquiry object may be adapted to, upon selection by an end user (e.g. mouse click), redirect the end user's browser 500 to a URL associated with the advertisement system 10. Such URL may further include an extension identifying the seller's web page 502.

In response to the redirect, the listing search tool 54 may populate a listing display web page 300 which includes a listing 302*a*-302*d* for each of a plurality of discrete traffic blocks matching the search criteria—wherein the search criteria comprises identification of the seller's web page 502. This provides the effect that when the end user clicks the advertisement inquiry object 504, the end user's browser 500 appears to be directed to the listing display web page 300 listing discrete traffic blocks of ad placements on the web page 502.

In other aspects, the listing search tool may include processes of identifying the potential buyer and/or identifying other advertising campaign objectives of the buyer for purposes of better being able to populate the listing display web page 300.

Reporting Tools

Returning to FIG. 6, as discussed, the management system 10 may further include reporting tools 41 which provide workflows for executing buyer and/or seller defined queries against the data relationships discussed herein for purposes of accessing and evaluating historical data.

Exemplary reporting may include access historical transaction data by advertisement placement, individual listing and/or by seller in general with respect to (i) past winning bid prices (both for such individual buyer and all other buyers), (ii) fulfillment of open orders following the closing of an auction for a listing with a winning bid (both for such individual buyer and all other buyers), (iii) average CPM, CPC, CPL, CPA or other transactional unit winning bid prices per listing (both for such individual buyer and all other buyers), (iv) historical conversion data, including, among others, click-through rate (i.e., total click-throughs received per thousand impressions), acquisition rate (i.e., total sales or completion of other actions per thousand impressions), average value of a conversion (e.g., average dollar amount of a sale in a CPA transaction) (both for such individual buyer and all other buyers), and (v) relative comparisons of (i) through (iv) above among other sellers of similar listings (based on listing attributes provided by sellers at the time of creation of a listing). Further, an embodiment of the present invention will allow the additional sorting and narrowing of the historical transaction data available above by reference to either such individual buyer's campaign(s), or all buyers' campaigns that (i) are associated with a particular offering (e.g., performance of cell phone offers), (ii) have particular attributes associated with such buyer campaigns (e.g., performance of a seller with respect to women aged 18 to 34 years old), and/or (iii) are compared to an individual campaign created by a buyer.

Other historical transaction data with respect to buyers relating to (i) past winning bid prices, (ii) average CPM, CPC, CPL, CPA or other transactional unit winning bid prices per buyer creative ad unit or campaign, (iii) historical conversion data, including, among others, click-through rate, acquisition rate, average value of a conversion (both for individual buyers and all buyers in the aggregate), and (iv) relative comparisons of (i) through (iii) above among other buyers of similar listings (based on product or service offerings or the creative ad unit provided by buyers at the time of creation of a campaign). Further, an embodiment of the present invention will advantageously allow the additional sorting and narrowing of the historical transaction data available above by reference to either such individual buyer's campaign(s), or all buyers' campaigns, (i) associated with a particular offering (e.g., performance of cell phone offers), (ii) having particular attributes associated with such buyer campaigns (e.g., performance of a seller with respect to women aged 18 to 34 years old), and (iii) by comparison to an individual campaign created by a buyer.

Although the invention has been shown and described with respect to certain exemplary embodiments, it is obvious that equivalents and modifications will occur to others skilled in the art upon the reading and understanding of the specification. For example, the data relationships represented in various figures are exemplary only. Those skilled in the art will appreciate that database design for implementation may utilize other data relationships to achieve the objectives of the present invention. The present invention includes all such equivalents and modifications, and is limited only by the scope of the following claims.

What is claimed is:

1. A management system comprising a processor executing computer code encoded to a non transitory computer readable media for brokering, between a seller and a buyer, sale of at least a portion of the seller's inventory of advertisement impressions that the seller is able to render within an advertisement placement within a web page of internet traffic, the computer code comprising:

a traffic block definition tool adapted to define traffic block parameters for at least two discrete traffic blocks of the advertisement placement, the traffic block parameters for each discrete traffic block comprising:

a volume parameter defining a volume of at least two salable events included in the discrete traffic block;

at least one duration parameter defining an active time period during which the volume of salable events included in the discrete traffic block will be provided;

a sales management tool adapted to:

associate, for each discrete traffic block, a compensation value defining a buyer compensation parameter associated with each salable event included in the discrete traffic block; and associate buyer defined advertisement content with each discrete traffic block;

an order fulfillment system for directing placement of selected advertisement content within the advertisement placement, the order fulfillment system comprising:

an advertisement content threshold module adapted to determine, for each discrete traffic block, a minimum fulfillment threshold, the minimum fulfillment threshold being a function of at least the volume of salable events included in the discrete traffic block divided by the active time period of the discrete traffic block and multiplied by a portion of the active time period that has elapsed;

an effective revenue module adapted to:

determine, for each discrete traffic block, expected revenue associated with placement of the buyer defined advertisement content within the advertisement placement, the expected revenue being the buyer compensation parameter multiplied by a probability that placement of the buyer defined advertisement content will yield a salable event; and determine the highest yielding advertisement content, the highest yielding advertisement content being the buyer defined advertisement content of the discrete traffic block that is associated with the highest expected revenue; and a placement direction module adapted to: i) direct placement of the highest yielding advertisement content within the advertisement placement if, for each discrete traffic block, a delivered volume of sales events is higher than the minimum fulfillment threshold; and ii) if, any discrete traffic block is a below pace discrete traffic block, direct placement of the buyer defined advertisement content associated with the below pace discrete traffic block within the advertisement placement, wherein the below pace discrete traffic block is a discrete traffic block wherein its delivered volume of saleable events is lower than its minimum fulfillment threshold.

2. The management system of claim 1, wherein the minimum fulfillment threshold for each discrete traffic block is further a function of: i) the volume of salable events included in the discrete traffic block divided by the active time period of the discrete traffic block; ii) multiplied by a portion of the active time period that has elapsed; and iii) multiplied by a function of the portion of the active time period that has elapsed that yields a value between zero and one for the entire duration of the active time period and approaches one at termination of the active time period.

3. The management system of claim 1, wherein:
for at least one discrete traffic block, the salable event comprises placement of the buyer defined advertisement content and the expected revenue equals the buyer compensation parameter; and
for at least a second discrete traffic block, the salable event comprises an end user to which the buyer defined advertisement content is rendered, selecting the buyer defined advertisement content for linking to a separate web page associated with the buyer defined advertisement content and the expected revenue equals the buyer compensation parameter multiplied by an expected portion of the end users, to which the buyer defined advertisement content is rendered, that select the buyer defined advertisement content for linking to a web page associated with the buyer defined advertisement content.

4. The management system of claim 1, wherein:
the effective revenue module is further adapted to determine, for each of a plurality of filler advertisement content options, which are distinct from the buyer defined content of each discrete traffic block, expected revenue associated with placement of filler advertisement content within the advertisement placement, the expected revenue being a filler advertisement compensation value multiplied by a probability that placement of the filler advertisement content will yield an event generating revenue of the filler advertisement compensation value; and
wherein the highest yielding advertisement content is the one of: i) the highest yielding buyer defined advertisement content; and ii) if greater, the filler advertisement content that is associated with the highest expected revenue.

5. The management system of claim 4:
further comprising an ad network interface adapted to, if for each discrete traffic block its delivered volume of sales events is higher than its minimum fulfillment threshold:
generate a request to a remote ad network, the request comprising at least one text tag classifying subject matter of the web page within which the advertisement placement exists;
receive, in response to the request, an indication of a placement fee; and
wherein for at least one filler advertisement content option: i) the filler advertisement content comprises ad content provided by the remote ad network; and ii) the expected revenue associated with the filler advertisement content comprises the placement fee.

6. The management system of claim 5:
wherein the ad network interface comprises a plurality of data sets, each data set associating one of the text tags with the indication of the placement fee received from the remote ad network; and
the ad network periodically generates the request, and upon receipt of an updated placement fee, updates the data set to associate the text tag with the updated placement fee, the updated placement fee being a placement fee different than a placement fee received in response to a previous request.

7. A management system comprising a processor executing computer code encoded to non transitory computer readable media for brokering, between a seller and a buyer, sale of at least a portion of the seller's inventory of advertisement impressions that the seller can render within a web page of internet traffic, the computer code comprising:
a traffic block definition tool adapted to define traffic block parameters for at least two discrete traffic blocks of the advertisement placement, the traffic block parameters for each discrete traffic block comprising:
a volume parameter defining a volume of at least two salable events included in the discrete traffic block;
at least one duration parameter defining an active time period during which the volume of salable events included in the discrete traffic block will be provided;
a sales management tool adapted to:
associate, for each discrete traffic block, a buyer compensation parameter with each salable event included in the discrete traffic block; and
associate buyer defined advertisement content with each discrete traffic block;
an order fulfillment system for directing placement of selected advertisement content within the advertisement placement, the order fulfillment system comprising:
an advertisement content threshold module adapted to determine, for each discrete traffic block, a minimum fulfillment threshold and a maximum fulfillment threshold:
the minimum fulfillment threshold being a function of at least the volume of salable events included in the discrete traffic block divided by the active time period of the discrete traffic block and multiplied by a portion of the active time period that has elapsed; and
the maximum fulfillment threshold being a threshold value greater than the minimum fulfillment threshold;
an effective revenue module adapted to, for each discrete traffic block wherein a delivered volume of salable events is greater than the minimum fulfillment threshold and less than the maximum fulfillment threshold, determine an expected revenue associated with placement of the buyer defined advertisement content within the advertisement placement, the expected revenue being the buyer compensation parameter multiplied by a probability that placement of the buyer defined advertisement content will yield a salable event; and
determine the highest yielding advertisement content, the highest yielding advertisement content being the buyer defined advertisement content of the discrete traffic block that is associated with the highest expected revenue: and
a placement direction module adapted to:
direct placement of the highest yielding advertisement content within the advertisement placement if, for each discrete traffic block, its delivered volume of sales events is higher than its minimum fulfillment threshold less than its maximum fulfillment threshold; and if, for any discrete traffic block, its delivered volume of salable events is less than its minimum fulfillment threshold, direct placement of the buyer defined advertisement content associated with that discrete traffic block within the advertisement placement.

8. The management system of claim 7, wherein:

the minimum fulfillment threshold is further a function of: i) the volume of salable events included in the discrete traffic block divided by the active time period of the discrete traffic block; ii) multiplied by a portion of the active time period that has elapsed; and iii) multiplied by a function of the portion of the active time period that has elapsed that yields a value between zero and one for the entire duration of the active time period and approaches one at termination of the active time period; and the maximum fulfillment threshold is a function of: i) the volume of salable events included in the discrete traffic block divided by the active time period of the discrete traffic block; ii) multiplied by a portion of the active time period that has elapsed; and iii) multiplied by a function of the portion of the active time period that has elapsed that yields a value between one and zero and one for the entire duration of the active time period and approaches zero at termination of the active time period.

9. The management system of claim 7, wherein:

for at least one discrete traffic block, the salable event comprises placement of the buyer defined advertisement content and the expected revenue equals the buyer compensation parameter; and for at least a second discrete traffic block, the salable event comprises an end user to which the buyer defined advertisement content is rendered, selecting the buyer defined advertisement content for linking to a separate web page associated with the buyer defined advertisement content and the expected revenue equals the buyer compensation parameter multiplied by an expected portion of the end users, to which the buyer defined advertisement content is rendered, that select the buyer defined advertisement content for linking to a web page associated with the buyer defined advertisement content.

10. The management system of claim 7, wherein:

the effective revenue module is further adapted to determine, for each of a plurality of filler advertisement content options, which are distinct from each discrete traffic block, expected revenue associated with placement of filler advertisement content within the advertisement placement, the expected revenue being a filler advertisement compensation value multiplied by a probability that placement of the filler advertisement content will yield an event generating revenue of filler advertisement compensation value; and wherein the highest yielding advertisement content is the one of: i) the highest yielding buyer defined advertisement content; and ii) if greater, the filler advertisement content that is associated with the highest expected revenue.

11. The management system of claim 10:

further comprising an ad network interface adapted to, if for each discrete traffic block a delivered volume of sales events is higher than its minimum fulfillment threshold:

generate a request to a remote ad network, the request comprising at least one text tag classifying subject matter of the web page within which the advertisement placement exists;

receive, in response to the request, an indication of a placement fee; and wherein for at least one filler advertisement content option: i) the filler advertisement content comprises ad content provided by the remote ad network; and ii) the expected revenue associated with the filler advertisement content comprises the placement fee.

12. The management system of claim 11:

wherein the ad network interface comprises a plurality of data sets, each data set associating one of the text tags with the indication of the placement fee received from the remote ad network; and the ad network periodically generates the request, and upon receipt of an updated placement fee, updates the data set to associated the text tag with the updated placement fee, the updated placement fee being a placement fee different than a placement fee received in response to a previous request.

13. A method of operating a computer system for brokering, between a seller and a buyer, sale of at least a portion of the seller's inventory of advertisement impressions that the seller can render within a web page of internet traffic, the method comprising using a processor to perform the following steps:

defining, for each of at least two discrete traffic blocks of the advertisement impressions:
 a volume parameter defining a volume of at least two salable events included in the discrete traffic block;
 at least one duration parameter defining an active time period during which the volume of salable events included in the discrete traffic block will be provided;
 a compensation value defining a buyer compensation parameter associated with each salable event included in the discrete traffic block; and
 buyer defined advertisement content;

determining, for each discrete traffic block, a minimum fulfillment threshold, the minimum fulfillment threshold being a function of at least the volume of salable events included in the discrete traffic block divided by the active time period of the discrete traffic block and multiplied by a portion of the active time period that has elapsed;

determining, for each discrete traffic block, expected revenue associated with placement of the buyer defined advertisement content within the advertisement placement, the expected revenue being the buyer compensation parameter multiplied by a probability that placement of the buyer defined advertisement content will yield a salable event;

determining the highest yielding advertisement content, the highest yielding advertisement content being the buyer defined advertisement content of the discrete traffic block that is associated with the highest expected revenue;

directing placement of the highest yielding advertisement content within the advertisement placement if, for each discrete traffic block, its delivered volume of sales events is higher than its minimum fulfillment threshold; and directing placement of the buyer defined advertisement content associated with an under volume discrete traffic block within the advertisement placement if one of the discrete traffic blocks is an under volume discrete traffic block, wherein an under volume discrete traffic block is a discrete traffic block where its delivered volume of saleable events is lower than its minimum fulfillment threshold.

14. The method of claim 13, wherein the minimum fulfillment threshold is further a function of: i) the volume of salable events included in the discrete traffic block divided by the active time period of the discrete traffic block; ii) multiplied by a portion of the active time period that has elapsed; and iii) multiplied by a function of the portion of the active time period that has elapsed that yields a value between zero and one for the entire duration of the active time period and approaches one at termination of the active time period.

15. The method of claim 13, wherein:
for at least one discrete traffic block, the salable event comprises placement of the buyer defined advertisement content and the expected revenue equals the buyer compensation parameter; and
for at least a second discrete traffic block, the salable event comprises an end user to which the buyer defined advertisement content is rendered, selecting the buyer defined advertisement content for linking to a separate web page associated with the buyer defined advertisement content and the expected revenue equals the buyer compensation parameter multiplied by an expected portion of the end users, to which the buyer defined advertisement content is rendered, that select the buyer defined advertisement content for linking to a web page associated with the buyer defined advertisement content.

16. The method of claim 13, further comprising:
determining, for each of a plurality of filler advertisement content options, which are distinct from each discrete traffic block, expected revenue associated with placement of filler advertisement content within the advertisement placement, the expected revenue being a filler advertisement compensation value multiplied by a probability that placement of the filler advertisement content will yield an event generating revenue of filler advertisement compensation value; and
wherein the highest yielding advertisement content is the one of i) the highest yielding buyer defined advertisement content; and ii) if greater, the filler advertisement content that is associated with the highest expected revenue.

17. The method of claim 16:
further comprising, if for each discrete traffic block a delivered volume of sales events is higher than its minimum fulfillment threshold:
generating a request to a remote ad network, the request comprising at least one text tag classifying subject matter of the web page within which the advertisement placement exists; and
receiving, in response to the request, an indication of a placement fee; and
wherein for at least one filler advertisement content option: i) the filler advertisement content comprises ad content provided by the remote ad network; and ii) the expected revenue associated with the filler advertisement content comprises the placement fee.

18. The method of claim 17:
further comprising, storing a plurality of data sets, each data set associating one of the text tags with the indication of the placement fee received from the remote ad network; and
periodically generating the request, and upon receipt of an updated placement fee, updates the data set to associated the text tag with the updated placement fee, the updated placement fee being a placement fee different than a placement fee received in response to a previous request.

19. A method of operating a computer system for brokering, between a seller and a buyer, sale of at least a portion of the seller's inventory of advertisement impressions that the seller can render within an advertisement placement of the seller's web page of internet traffic, the method comprising using a processor to perform the following steps:
defining, for each of at feast two discrete traffic blocks of the advertisement placement:
a volume parameter defining a volume of at least two salable events included in the discrete traffic block;
at least one duration parameter defining an active time period during which the volume of salable events included in the discrete traffic block will be provided;
a compensation value defining a buyer compensation parameter associated with each salable event included in the discrete traffic block; and
buyer defined advertisement content;
determining, for each discrete traffic block, a minimum fulfillment threshold, the minimum fulfillment threshold being a function of at least the volume of salable events included in the discrete traffic block divided by the active time period of the discrete traffic block and multiplied by a portion of the active time period that has elapsed;
determining, for each discrete traffic block, a maximum fulfillment threshold, the maximum fulfillment threshold being a threshold value greater than the minimum fulfillment threshold;
determining, for each discrete traffic block wherein a delivered volume of salable events is greater than its minimum fulfillment threshold and less than the maximum fulfillment threshold, an expected revenue associated with placement of the buyer defined advertisement content within the advertisement placement, the expected revenue being the buyer compensation parameter multiplied by a probability that placement of the buyer defined advertisement content will yield a salable event;
determining the highest yielding advertisement content, the highest yielding advertisement content being the buyer defined advertisement content of the discrete traffic block that is associated with the highest expected revenue;
directing placement of the highest yielding advertisement content within the advertisement placement if, for each discrete traffic block, its delivered volume of sales events is higher than its minimum fulfillment threshold; and
if, for any discrete traffic block, its delivered volume of saleable events is less than its minimum fulfillment threshold, direct placement of the buyer defined advertisement content associated with that discrete traffic block within the advertisement placement.

20. The method of claim 19, wherein:
the minimum fulfillment threshold is further a function of: i) the volume of salable events included in the discrete traffic block divided by the active time period of the discrete traffic block; ii) multiplied by a portion of the active time period that has elapsed; and iii) multiplied by a function of the portion of the active time period that has elapsed that yields a value between zero and one for the entire duration of the active time period and approaches one at termination of the active time period; and
the maximum fulfillment threshold is a function of: i) the volume of salable events included in the discrete traffic block divided by the active time period of the discrete traffic block; ii) multiplied by a portion of the active time period that has elapsed; and iii) multiplied by a function of the portion of the active time period that has elapsed that yields a value between zero and one for the entire duration of the active time period and approaches zero at termination of the active time period.

21. The method of claim 19, wherein:
for at least one discrete traffic block, the salable event comprises placement of the buyer defined advertisement content and the expected revenue equals the buyer compensation parameter; and
for at least a second discrete traffic block, the salable event comprises an end user to which the buyer defined advertisement content is rendered, selecting the buyer defined advertisement content for linking to a separate web page associated with the buyer defined advertisement content and the expected revenue equals the buyer compensation parameter multiplied by an expected portion of the end users, to which the buyer defined advertisement content is rendered, that select the buyer defined advertisement content for linking to a web page associated with the buyer defined advertisement content.

22. The method of claim 19, further comprising:
determining, for each of a plurality of filler advertisement content options, which are distinct from each discrete traffic block, expected revenue associated with placement of filler advertisement content within the advertisement placement, the expected revenue being a filler advertisement compensation value multiplied by a probability that placement of the filler advertisement content will yield an event generating revenue of filler advertisement compensation value; and
wherein the highest yielding advertisement content is the one of: i) the highest yielding buyer defined advertisement content; and ii) if greater, the filler advertisement content that is associated with the highest expected revenue.

23. The method of claim 22:
further comprising, if for each discrete traffic block a delivered volume of sales events is higher than its minimum fulfillment threshold:
generating a request to a remote ad network, the request comprising at least one text tag classifying subject matter of the web page within which the advertisement placement exists; and
receiving, in response to the request, an indication of a-placement fee; and
wherein for at least one filler advertisement content option: i) the filler advertisement content comprises ad content provided by the remote ad network; and ii) the expected revenue associated with the filler advertisement content comprises the placement fee.

24. The method of claim 23:
further comprising, storing a plurality of data sets, each data set associating one of the text tags with the indication of the placement fee received from the remote ad network; and
periodically generating the request, and upon receipt of an updated placement fee, updates the data set to associate the text tag with the updated placement fee, the updated placement fee being a placement fee different than a placement fee received in response to a previous request.

25. A management system comprising a processor executing computer code encoded to a non transitory computer readable media for brokering, between a seller and each of a first buyer and a second buyer, sale of at least a portion of the seller's inventory of advertisement impressions that the seller is able to render within an advertisement placement within a web page of internet traffic wherein a portion of the content of the web page is periodically altered between a first classification of web content and a second classification of web content, the data structures and computer code comprising:
a traffic block definition tool adapted to define traffic block parameters for at least two discrete traffic blocks of the advertisement placement:
the traffic block parameters for the first discrete traffic block comprising a first context parameter associating the first discrete traffic block with the first classification of web content;
the traffic block parameters for the second discrete traffic block comprising a second context parameter associating the second discrete traffic block with the second classification of web content; and
an order fulfillment system adapted to direct placement of selected advertisement content within the advertisement placement, the selected advertisement content being:
first buyer defined advertisement content designated by the first buyer when the advertisement placement is rendered when the web page when the portion of the content of the web page is the first classification of content; and
second buyer defined advertisement content designed by the second buyer when the advertisement placement is rendered when the portion of the content of the web page is the second classification of content; and
the order fulfillment system further comprises a content determination system, the content determination system being adapted to:
periodically establishes a connection to a URL associated with the web page and obtaining the portion of the content of the web page that is periodically altered;
determine that the portion of the content of the web page that is periodically altered is the first classification of web content when the portion of the content that is periodically altered associates with a first recognition criteria; and
determine that the portion of the content of the web page that is periodically altered is the second classification of web content when the portion of the content that is periodically altered associates with a second recognition criteria; and
wherein the selected advertisement content is:
the first buyer defined advertisement content during a time period following a determination that the portion of the content of the web page that is periodically altered is the first classification of web content and before a subsequent determination that the portion of the content of the web page that is periodically altered is the second classification of web content; and
the second buyer defined advertisement content during a time period following a determination that the portion of the content of the web page that is periodically altered is the second classification of web content and before a subsequent determination that the portion of the content of the web page that is periodically altered is the first classification of web content.

26. A management system comprising a processor executing computer code encoded to non transitory a computer readable media for brokering, between a seller and each of a first buyer and a second buyer, sale of at least a portion of the seller's inventory of advertisement impressions that the seller is able to render within an advertisement placement within a web page of internet traffic wherein a portion of the content of the web page is periodically altered between a first classification of web content and a second classification of web content, the computer code comprising:
  a traffic block definition tool adapted to define traffic block parameters for at least two discrete traffic blocks of the advertisement placement:
    the traffic block parameters for the first discrete traffic block comprising a first context parameter associating the first discrete traffic block with the first classification of web content;
    the traffic block parameters for the second discrete traffic block comprising a second context parameter associating the second discrete traffic block with the second classification of web content; and
  an order fulfillment system adapted to direct placement of selected advertisement content within the advertisement placement, the selected advertisement content being:
    first buyer defined advertisement content designated by the first buyer when the advertisement placement is rendered when the web page when the portion of the content of the web page is the first classification of content; and
    second buyer defined advertisement content designed by the second buyer when the advertisement placement is rendered when the portion of the content of the web page is the second classification of content;
  wherein:
    the traffic block parameters for the first discrete traffic block further comprise:
      a first volume parameter defining a volume of at least two salable events included in the first discrete traffic block;
      at least one first duration parameter defining an active time period during which the volume of salable events included in the first discrete traffic block will be provided;
    the traffic block parameters for the second discrete traffic block further comprise:
      a second volume parameter defining a volume of at least two salable events included in the second discrete traffic block;
      at least one second duration parameter defining an active time period during which the volume of salable events included in the second discrete traffic block will be provided;
    the system further comprises a sales management tool for:
      associating a first buyer compensation parameter with each salable event included in the first discrete traffic block; and
      associating a second buyer compensation parameter with each salable event included in the second discrete traffic block.

27. The management system of claim 26, wherein:
  a first fulfillment pace is the aggregate quantity of salable events generated by placement of the first buyer defined advertisement content;
  a first minimum fulfillment threshold is a function of the total quantity of salable events included in the first discrete traffic block divided by the active time period of the discrete block and multiplied by the portion of the active time period that has elapsed; and
  the order fulfillment system is further adapted to direct placement of selected filler advertisement content within the advertisement placement if, during the time period following determining that the portion of the content of the web page that is periodically altered is the first classification of web content, the placement of first buyer defined advertisement content is at a fulfillment pace that is ahead of a minimum fulfillment threshold, the selected filler advertisement placement being advertisement content designated by a third buyer.

28. The management system of claim 27:
  further comprising an ad network interface adapted to, if placement of first buyer defined advertisement content is at fulfillment pace that is ahead of the minimum fulfillment threshold:
    generate a request to at least two remote ad networks, each request comprising at least one text tag associated with the first classification of web content;
    receive, in response to each request, an indication of a placement fee; and
  the selected filler advertisement content is filler advertisement content associated with a greatest of the placement fees.

29. A method of operating a computer system for brokering, between a seller and each of a first buyer and a second buyer, sale of at least a portion of the seller's inventory of advertisement impressions that the seller is able to render within an advertisement placement within a web page of internet traffic, wherein a portion of content of the web page is periodically altered between a first classification of web content and a second classification of web content, the method comprising using a processor to perform the following steps:
  defining, for a first of at least two discrete traffic blocks of the advertisement placement, first traffic block parameters comprising:
    a first context parameter associating the first discrete traffic block with the first classification of web content;
  defining, for a second of at least two discrete traffic blocks of the advertisement placement, second traffic block parameters comprising:
    a first context parameter associating the second discrete traffic block with the second classification of web content;
  directing placement of selected advertisement content within the advertisement placement, the selected advertisement content being:
    first buyer defined advertisement content designated by the first buyer when the advertisement placement is rendered when the portion of the content of the web page is the first classification of content; and
    the second buyer defined advertisement content designed by the second buyer when the advertisement placement is rendered when the portion of the content of the web page is the second classification of content;
  periodically establishing a connection to a URL associated with the web page and obtaining the portion of the content of the web page that is periodically altered;
  determine that the portion of the content of the web page that is periodically altered is the first classification of web content when words within the portion of the content that is periodically altered associates with a first recognition criteria; and
  determine that the portion of the content of the web page that is periodically altered is the second classification of web content when words within the portion of the content that is periodically altered associates with a second recognition criteria; and
  wherein the selected advertisement content is:
    the first buyer defined advertisement content during a time period following a determination that the portion of the content of the web page that is periodically altered is the first classification of web content and before a subsequent determination that the portion of the content of the web page that is periodically altered is the second classification of web content; and the second buyer defined advertisement content during a time period following a determination that the portion of the content of the web page that is periodically altered is the second classification of web content and before a subsequent determination that the portion of the content of the web page that is periodically altered is the first classification of web content.

30. A method of operating a computer system for brokering, between a seller and each of a first buyer and a second buyer, sale of at least a portion of the seller's inventory of advertisement impressions that the seller is able to render within an advertisement placement within a web page of internet traffic, wherein a portion of content of the web page is periodically altered between a first classification of web content and a second classification of web content, the method comprising using processor to perform the following steps:

defining, for a first of at least two discrete traffic blocks of the advertisement placement, first traffic block parameters comprising:
a first context parameter associating the first discrete traffic block with the first classification of web content;

defining, for a second of at least two discrete traffic blocks of the advertisement placement, second traffic block parameters comprising:
a first context parameter associating the second discrete traffic block with the second classification of web content;

directing placement of selected advertisement content within the advertisement placement, the selected advertisement content being:
first buyer defined advertisement content designated by the first buyer when the advertisement placement is rendered when the portion of the content of the web page is the first classification of content: and
the second buyer defined advertisement content designed by the second buyer when the advertisement placement is rendered when the portion of the content of the web page is the second classification of content;

wherein:
the first traffic block parameters for the first discrete traffic block further comprise:
a first volume parameter defining a volume of at least two salable events included in the first discrete traffic block;
at least one first duration parameter defining an active time period during which the volume of salable events included in the first discrete traffic block will be provided;

the second traffic block parameters for the second discrete traffic block further comprise:
a second volume parameter defining a volume of at least two salable events included in the second discrete traffic block;
at least one second duration parameter defining an active time period during which the volume of salable events included in the second discrete traffic block will be provided; and the method further comprises:
determining a first buyer compensation parameter associated with each salable event included in the first discrete traffic block; and
determining a second buyer compensation parameter associated with each salable event included in the second discrete traffic block.

31. The method of claim 30, wherein:
a first fulfillment pace is the aggregate quantity of salable events generated by placement of the first buyer defined advertisement content; and
a minimum fulfillment threshold is a function of the total quantity of salable events included in the first discrete traffic block divided by the active time period of the discrete block and multiplied by the portion of the active time period that has elapsed; and
the method further comprises directing placement of selected filler advertisement content within the advertisement placement if, during the time period following determining that the portion of the content of the web page that is periodically altered is the first classification of web content, the placement of first buyer defined advertisement content is at a fulfillment pace that is ahead of a minimum fulfillment threshold, the selected filler advertisement placement being advertisement content designated by a third buyer.

32. The method of claim 31:
further comprising, if for the first discrete traffic block, its delivered volume of sales events is higher than its minimum fulfillment threshold:
generating a request to at least two remote ad networks, each request comprising at least one text tag identifying the first classification of web content;
receiving, in response to each request, an indication of a placement fee; and
the selected filler advertisement content is filler advertisement content associated with a greatest of the placement fees.

33. A management system comprising data structures coded to a non transitory computer readable media and a processor for executing computer code encoded to a non transitory computer readable media for brokering, between a seller and a plurality of buyers, sale of at least a portion of the seller's inventory of advertisement impressions that the seller is able to render within an advertisement placement within a web page of the seller's internet traffic, the data structures and computer code comprising:
a database identifying, for the portion of the seller's inventory of advertisement impressions, projected available inventory for each of a plurality of sequential days;
a listing tool adapted to:
if both: i) projected available inventory is greater than a minimum daily pace threshold for each of a predetermined number of sequential days; and ii) the predetermined number of sequential days is greater than a minimum duration, define a discrete traffic block of the portion of the seller's inventory by generating traffic block parameters, the traffic block parameters comprising at least:
a volume parameter defining a volume of salable events included in the discrete traffic block;
at least one duration parameter defining an active time period during which the volume of salable events included in the discrete traffic block will be provided; and
upon definition of a discrete traffic block, generating a notice of the discrete traffic block to a selected one of the seller and the at least one buyer;
a historical database associating, for each of a plurality of previously sold discrete traffic blocks: i) a sales price; ii) an indication of a volume of salable events included in the previously sold discrete traffic block; and ii) an indication of the duration during which the value of salable events of the previously sold discrete traffic block was delivered; and wherein the listing tool is further adapted to:
determine a portion of the previously sold discrete traffic blocks that are optimal, the portion of the previously sold discrete traffic blocks that are optimal being a group of the previously sold discrete traffic blocks with the highest ratio of sales price divided by the volume of salable events;
set the volume parameter as a function of the volume of salable events included in the portion of the previously sold discrete traffic blocks that are optimal; and
set the duration parameter as a function of the duration of the portion of the previously sold discrete traffic blocks that optimal.

34. The management system of claim 33, wherein:
the historical database further associates, for each previously sold discrete traffic block, a position within a calendar cycle of its start date of the duration in which the volume of salable events was delivered; and
sets a start date for the duration of the discrete traffic block to a date with the same position within the calendar cycle as at least one previously sold discrete traffic block that is optimal.

35. A management system comprising data structures coded to a non transitory computer readable media and a processor executing computer code encoded to a non transitory computer readable media for brokering, between a seller and a plurality of buyers, sale of at least a portion of the seller's inventory of advertisement impressions that the seller is able to render within an advertisement placement within a web page of the seller's internet traffic, the data structures and computer code comprising:
a database identifying, for the portion of the seller's inventory of advertisement impressions, projected available inventory for each of a plurality of sequential days;
a listing tool adapted to:
if both: i) projected available inventory is greater than a minimum daily pace threshold for each of a predetermined number of sequential days; and ii) the predetermined number of sequential days is greater than a minimum duration, define a discrete traffic block of the portion of the seller's inventory by generating traffic block parameters, the traffic block parameters comprising at least:
a volume parameter defining a volume of salable events included in the discrete traffic block;
at least one duration parameter defining an active time period during which the volume of salable events included in the discrete traffic block will be provided; and
upon definition of a discrete traffic block, generating a notice of the discrete traffic block to a selected one of the seller and the at least one buyer;
a database associating, for each of a plurality of currently listed discrete traffic blocks: i) a current bid price; ii) an indication of a volume of salable events included in the currently listed discrete traffic block; and ii) an indication of the duration of the currently listed discrete traffic block; and
wherein the listing tool is further adapted to:
determine a portion of the currently listed discrete traffic blocks that are optimal, the portion of the currently listed discrete traffic blocks that are optimal being a group of the currently listed discrete traffic blocks with the highest ratio of sales price divided by the volume of salable events;
set the volume parameter as a function of the volume of salable events included in the portion of the currently listed discrete traffic blocks that are optimal; and
set the duration parameter as a function of the duration of the portion of the currently listed discrete traffic blocks that optimal.

36. A management system comprising data structures coded to a non transitory computer readable media and a processor executing computer code encoded to a non transitory computer readable media for brokering, between a seller and a plurality of buyers, sale of at least a portion of the seller's inventory of advertisement impressions that the seller is able to render within an advertisement placement within a web page of the seller's internet traffic, the data structures and computer code comprising:
a database identifying, for the portion of the seller's inventory of advertisement impressions, projected available inventory for each of a plurality of sequential days;
a listing tool adapted to:
if both: i) projected available inventory is greater than a minimum daily pace threshold for each of a predetermined number of sequential days; and ii) the predetermined number of sequential days is greater than a minimum duration, define a discrete traffic block of the portion of the seller's inventory by generating traffic block parameters, the traffic block parameters comprising at least:
a volume parameter defining a volume of salable events included in the discrete traffic block;
at least one duration parameter defining an active time period during which the volume of salable events included in the discrete traffic block will be provided; and
upon definition of a discrete traffic block, generating a notice of the discrete traffic block to a selected one of the seller and the at least one buyer;
a database associating, for each of a plurality of open advertisement campaigns:
i) a target volume; and ii) a target duration; and
wherein the listing tool is further adapted to:
set the volume parameter as a function of the target volume of at least a portion of the plurality of open advertisement campaigns; and
set the duration parameter as a function of the target volume of at least a portion of the plurality of open advertisement campaigns.

37. The management system of claim 36:
further comprising a historical database associating, for each of a plurality of previously sold discrete traffic blocks: i) a sales price; and ii) an indication of a volume of salable events included in the previously sold discrete traffic block; and
wherein the listing tool is further adapted to define a selling price for the discrete traffic block, the selling price being a function of at least: i) the sales price of the previously sold discrete traffic blocks multiplied by; ii) a ratio of the volume parameter divided by the indication of the volume of salable events included in the previously sold discrete traffic blocks and multiplied by; iii) a seller factor reflecting the desirability to advertise within the sellers web site versus a web site associated with the previously sold discrete traffic blocks.

38. A management system comprising data structures coded to a non transitory computer readable media and a processor executing computer code encoded to a non transitory computer readable media for brokering, between a seller and a plurality of buyers, sale of at least a portion of the seller's inventory of advertisement impressions that the seller is able to render within an advertisement placement within a web page of the seller's internet traffic, the data structures and computer code comprising:

an inventory database storing a plurality of listed discrete traffic blocks, each listed discrete traffic block comprising:
- an identification of the advertisement placement;
- a volume parameter defining a volume of salable events included, in the discrete traffic block;
- at least one duration parameter defining an active time period during which the volume of traffic included in the discrete traffic block will be provided;
- an auction parameter defining an expiration time before which buyers submit offers to purchase the discrete traffic block;
- a bid parameter defining a high bid for the discrete traffic block;

a buyer management tool adapted to:
- determine, for a designated buyer, a target event budget;
- determine, for each listed discrete traffic block:
  - an expected target event yield, the expected target event yield represents the portion of impressions of the advertisement content rendered within the advertisement placement that are expected to yield the target event;
  - a current target event price, the current target event price comprising the high bid divided by: i) the quantity of salable events included in the discrete traffic block; and ii) the portion of salable events that are expected to yield the target event; and
  - a maximum bid, the maximum bid being the target event budget multiplied by: i) the quantity of salable events included in the discrete traffic block; and ii) the portion of salable events expected to yield the target event; and
- for at least one selected discrete traffic block where the high bid is both: i) of another buyer; and ii) less than the maximum bid, enter a bid for the buyer.

39. The management system of claim 38, wherein the at least one selected discrete traffic block is a listed discrete traffic block with a lower current target event price than remaining listed discrete traffic blocks.

40. The management system of claim 38, wherein the buyer management tool is further adapted to determine, for the designated buyer, a campaign budget; and
determine the aggregate bid price on all discrete traffic blocks for which the management system has entered a bid for the buyer and for which the buyer remains high bidder;
and only enter a new bid on a new selected discrete traffic block if the aggregate bid price plus a price of the new bid is less than the campaign budget.

41. A method of operating a computer system for brokering, between a seller and a plurality of buyers, sale of at least a portion of the seller's inventory of advertisement impressions that the seller is able to render within an advertisement placement within a web page of the seller's internet traffic, the method comprising using a processor to perform the following steps:

storing a data sets representing at least two listed discrete traffic blocks, each data set:
- identifying the advertisement placement;
- identifying a volume parameter defining a volume of salable events included in the discrete traffic block;
- identifying at least one duration parameter defining an active time period during which the volume of traffic included in the discrete traffic block will be provided;
- identifying an auction parameter defining an expiration time before which buyers submit offers to purchase the discrete traffic block; and
- identifying a bid parameter defining a high bid for the discrete traffic block;

determining, for a designated buyer, a target event budget;
determining, for each listed discrete traffic block:
- an expected target event yield, the expected target event yield represents the portion of impressions of the advertisement content rendered within the advertisement placement that are expected to yield the target event;
- a current target event price, the current target event price comprising the high bid divided by: i) the quantity of salable events included in the discrete traffic block; and ii) portion of salable events that are expected to yield the target event; and
- a maximum bid, the maximum bid being the target event budget multiplied by: i) the quantity of salable events included in the discrete traffic block; and ii) the portion of salable events expected to yield the target event; and for at least one selected discrete traffic block where the high bid is both: i) of another buyer; and ii) less than the maximum bid, entering a bid for the buyer.

42. The method of claim 41, wherein the at least one selected discrete traffic block is a listed discrete traffic block with a lower current target event price than remaining listed discrete traffic blocks.

43. The method of claim 41, further comprising:
determining for the designated buyer, a campaign budget; and
determining the aggregate bid price on all discrete traffic blocks for which the management system has entered a bid for the buyer and for which the buyer remains high bidder;
and only entering a new bid on a new selected discrete traffic block if the aggregate bid price plus a price of the new bid is less than the campaign budget.

\* \* \* \* \*